United States Patent [19]
Takeo et al.

[11] Patent Number: 6,125,215
[45] Date of Patent: Sep. 26, 2000

[54] IMAGE PROCESSING METHOD AND APPARATUS

[75] Inventors: Hideya Takeo; Masahiko Yamada; Nobuyoshi Nakajima, all of Kanagawa-ken, Japan

[73] Assignee: Fuji Photo Film Co., Ltd., Kanagawa-ken, Japan

[21] Appl. No.: 09/299,231

[22] Filed: Apr. 26, 1999

Related U.S. Application Data

[62] Division of application No. 08/623,223, Mar. 26, 1996.

[30] Foreign Application Priority Data

| Mar. 29, 1995 | [JP] | Japan | 7-71774 |
|---|---|---|---|
| Mar. 30, 1995 | [JP] | Japan | 7-73433 |
| Mar. 30, 1995 | [JP] | Japan | 7-73497 |
| Apr. 20, 1995 | [JP] | Japan | 7-94672 |
| Aug. 9, 1995 | [JP] | Japan | 7-203205 |
| Aug. 9, 1995 | [JP] | Japan | 7-203206 |
| Aug. 10, 1995 | [JP] | Japan | 7-204250 |

[51] Int. Cl.$^7$ .............. G06K 9/00; G06K 9/42; G06K 9/56; H04N 1/393

[52] U.S. Cl. .............. 382/308; 382/128; 382/132; 382/256; 382/257; 382/264; 382/276; 358/451

[58] Field of Search .................. 382/128, 132, 382/173, 276, 282, 307, 308, 264, 257, 256; 358/451

[56] References Cited

U.S. PATENT DOCUMENTS

| 4,315,318 | 2/1982 | Kato et al. | 382/264 |
|---|---|---|---|
| 4,317,179 | 2/1982 | Kato et al. | 382/264 |
| 4,571,635 | 2/1986 | Mahmoodi et al. | 358/510 |
| 5,212,637 | 5/1993 | Saxena | 382/132 |
| 5,557,687 | 9/1996 | Hara | 382/132 |
| 5,646,741 | 7/1997 | Horiuchi et al. | 382/308 |
| 5,666,434 | 9/1997 | Nishikawa et al. | 382/128 |

FOREIGN PATENT DOCUMENTS

| 0 357 842 | 9/1988 | European Pat. Off. | G06F 15/66 |
|---|---|---|---|
| 0 638 874 A1 | 2/1995 | European Pat. Off. | G06T 5/40 |
| 90/07751 | 7/1990 | WIPO | G06F 15/68 |

OTHER PUBLICATIONS

Systems and Computers in Japan, vol. 24, No. 11, 1993, USA, pp. 66–74, XP000447455, Jin H.R. & Kobatake H.: "Extraction of Microcalcifications on Mammograms using Morphological Filter with Multiple Structuring Elements".

Computers and Biomedical Research, vol. 25, No. 3, Jun. 1992, USA, pp. 218–357, XP000574508, Shun Leung NG & Bischof W F: "Automated Detection and Classification of Breast Tumors", p. 225.

Medical Imaging Technology vol. 12, No. 1, Jan. 1994. "Extraction of Small Calcified Patterns with a Morphology Filter Using a Multiply Structure Element", vol. J75–D–II, No. 7, pp. 1170–1176 1992.

"Detection of Tumor Patternsin DR Images (Iris Filter)", vol. J75–D–II, No. 3, pp. 663–670 1992.

Spiesberger "Mammogram Inspection by Computer" IEEE, vol. BME–26, No. 4, Apr. 1979.

*Primary Examiner*—Leo H. Boudreau
*Assistant Examiner*—Daniel G. Mariam
*Attorney, Agent, or Firm*—Sughrue, Mion, Zinn, Macpeak & Seas, PLLC

[57] ABSTRACT

An operation of an iris filter is carried out on an original image signal representing an image, and the degree of centralization of gradients of the original image signal with respect to a picture element is thereby calculated, each of picture elements constituting the image being taken as the picture element. An image portion, which is associated with a high degree of centralization, in the image is detected in accordance with the calculated degree of centralization. Image emphasis processing is then selectively carried out on the detected image portion. Alternatively, a morphology operation is carried out on an original image signal Dorg by using a multiply structure element Bi and a scale factor λ, and a morphology signal Dmor is thereby obtained. The morphology signal Dmor represents whether each of picture elements constituting the image is or is not the one corresponding to an image portion, at which the original image signal Dorg fluctuates in a spatially narrower range than the multiply structure element Bi. Image emphasis processing is then carried out on the original image signal Dorg and in accordance with the morphology signal Dmor.

10 Claims, 44 Drawing Sheets

GRADIENT VECTOR

GRADIENT VECTOR

| $f_7$ | $f_6$ | $f_5$ | $f_4$ | $f_3$ |
|---|---|---|---|---|
| $f_8$ | | | | $f_2$ |
| $f_9$ | | | | $f_1$ |
| $f_{10}$ | | | | $f_{16}$ |
| $f_{11}$ | $f_{12}$ | $f_{13}$ | $f_{14}$ | $f_{15}$ |

PICTURE ELEMENT j

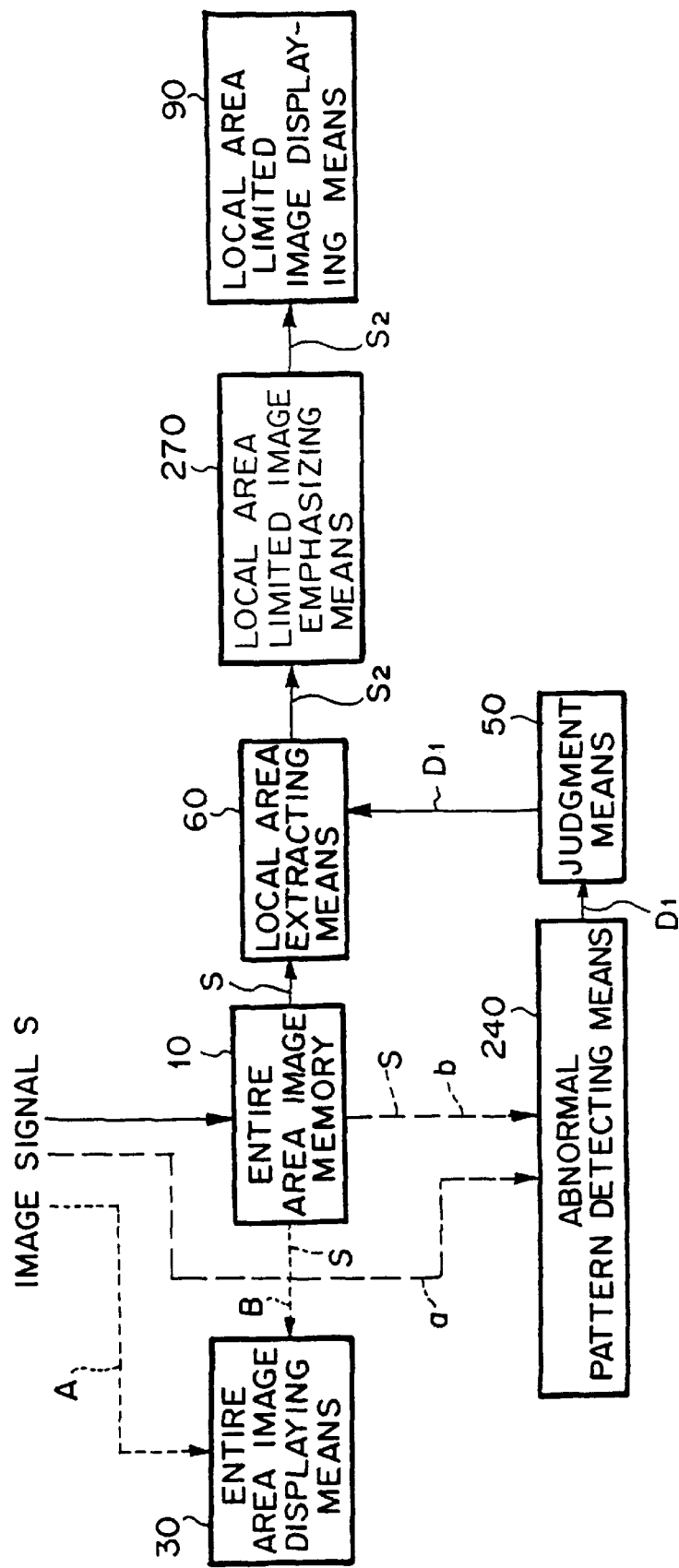

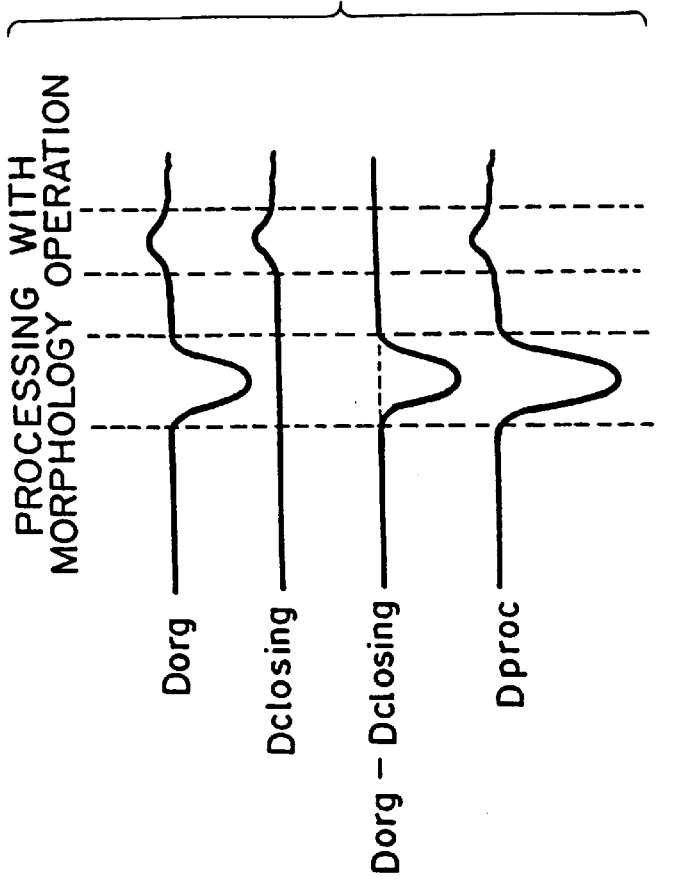
FIG. 18B PROCESSING WITH MORPHOLOGY OPERATION
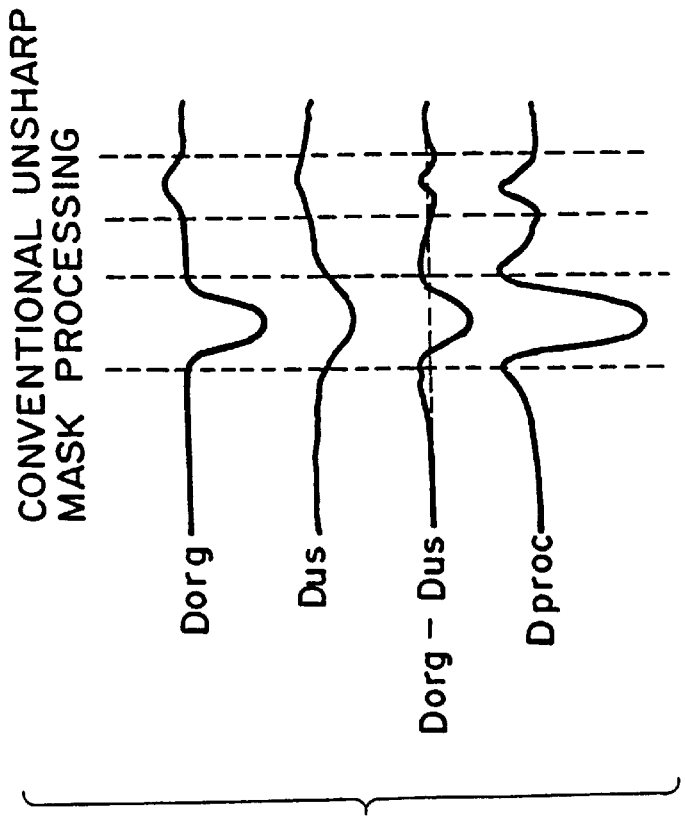
FIG. 18A CONVENTIONAL UNSHARP MASK PROCESSING

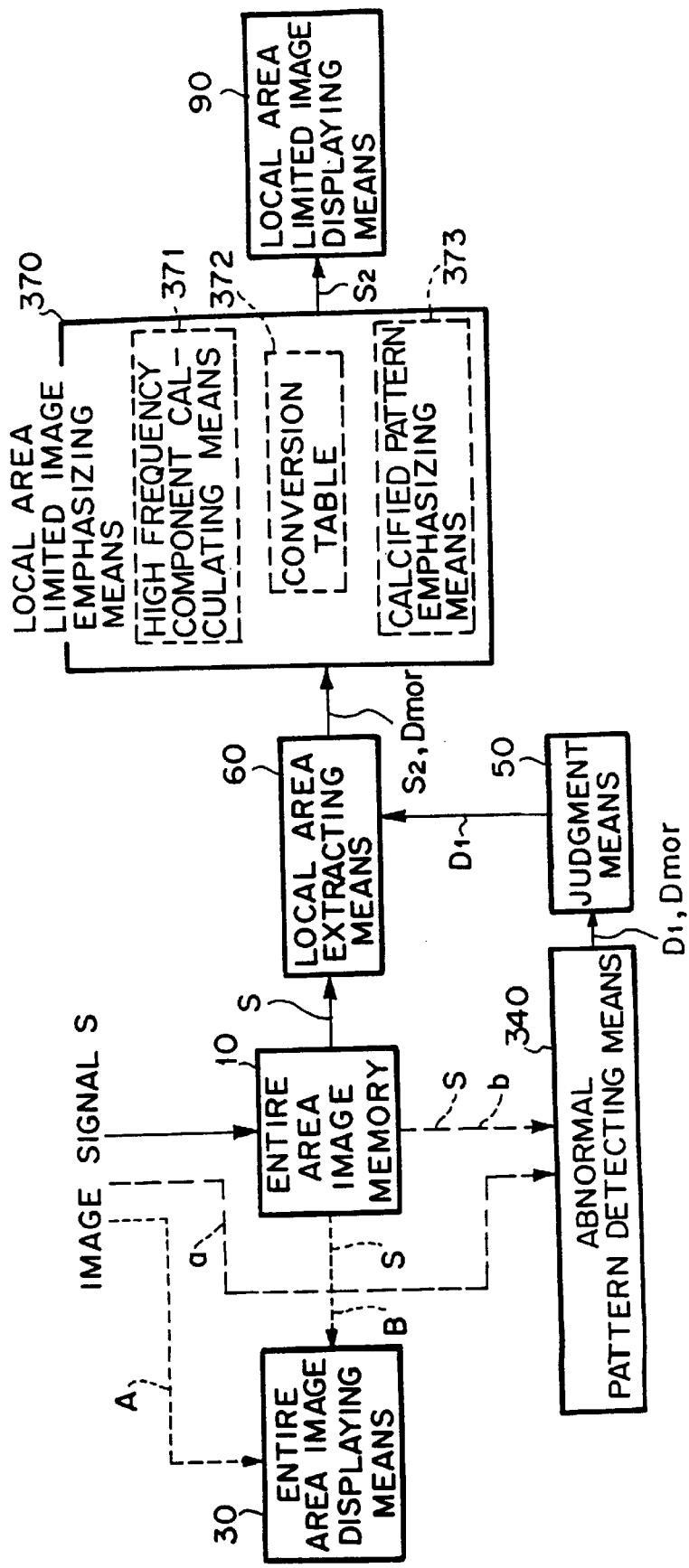
F I G. 21

F I G. 24
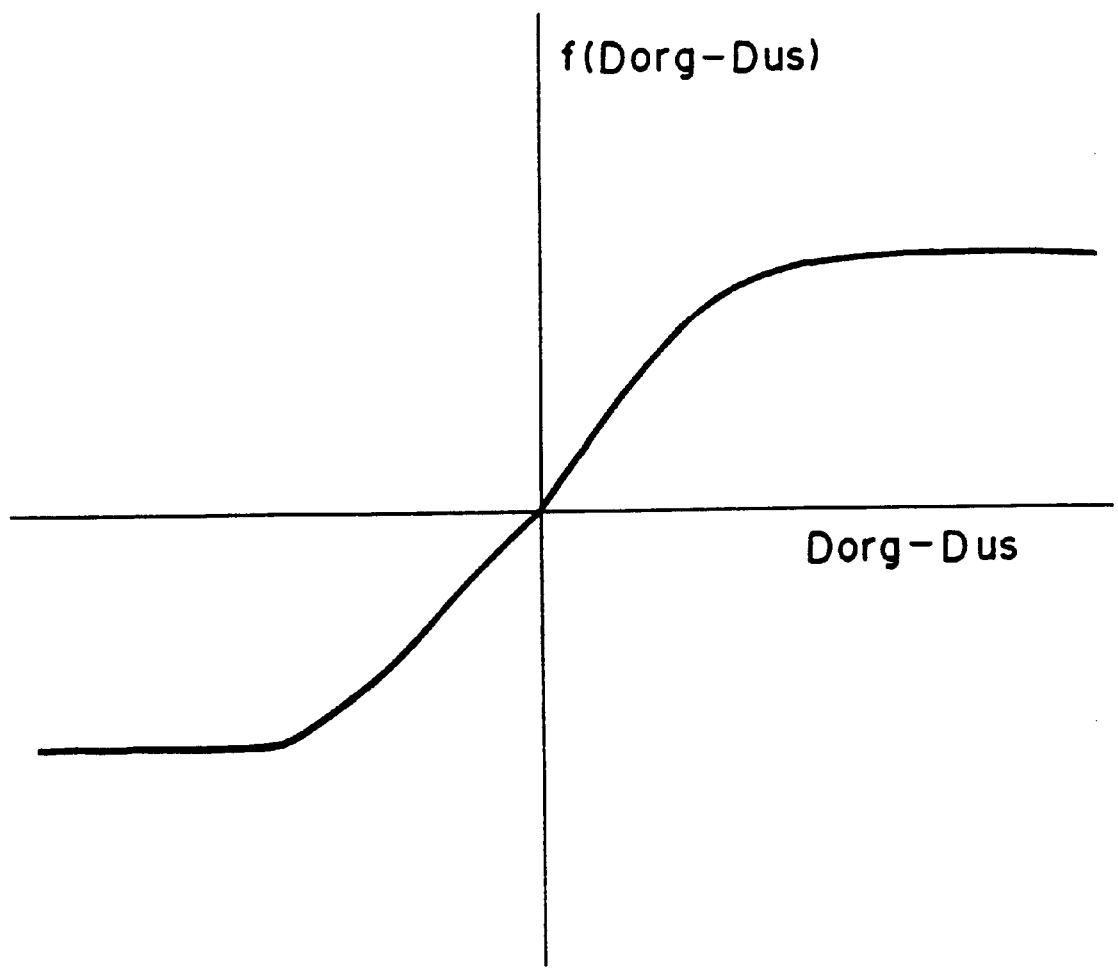

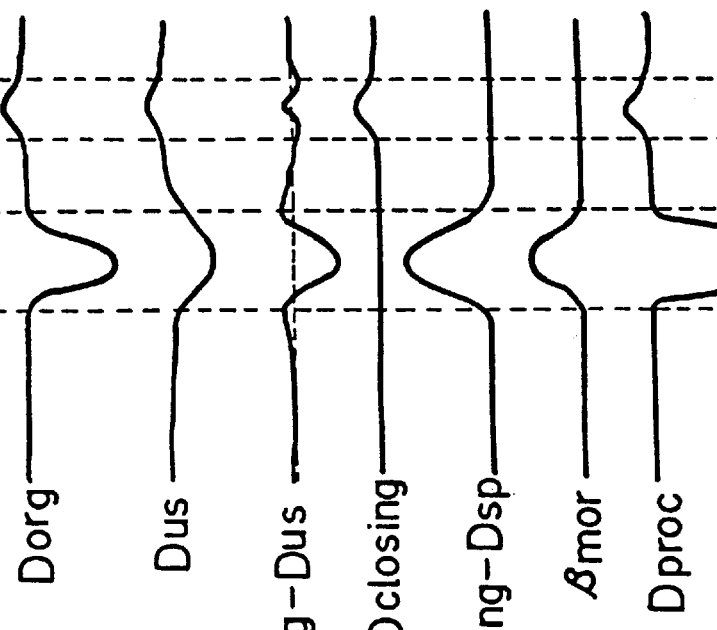
FIG. 25A CONVENTIONAL UNSHARP MASK PROCESSING
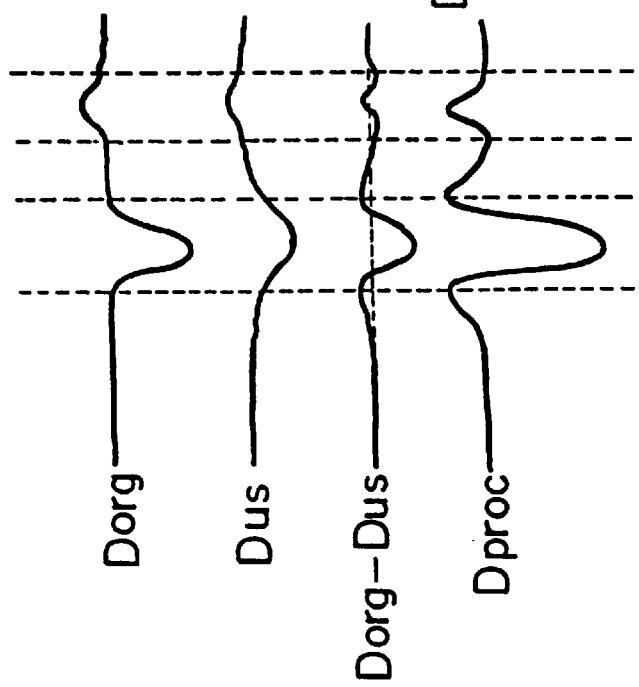
FIG. 25B PROCESSING WITH MORPHOLOGY OPERATION

MIDDLE PICTURE ELEMENT

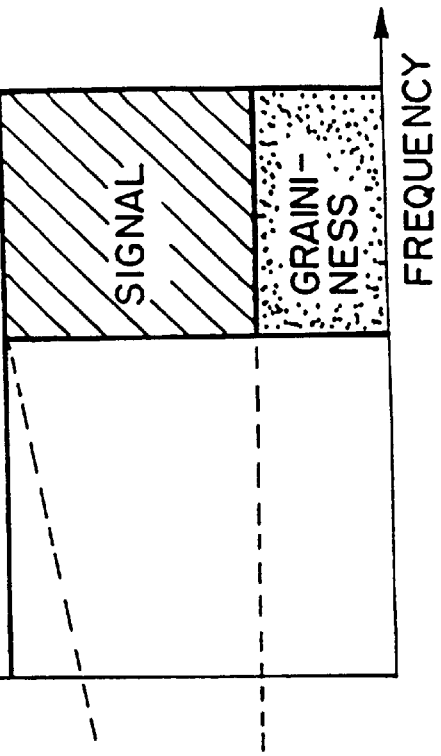
F I G. 32A
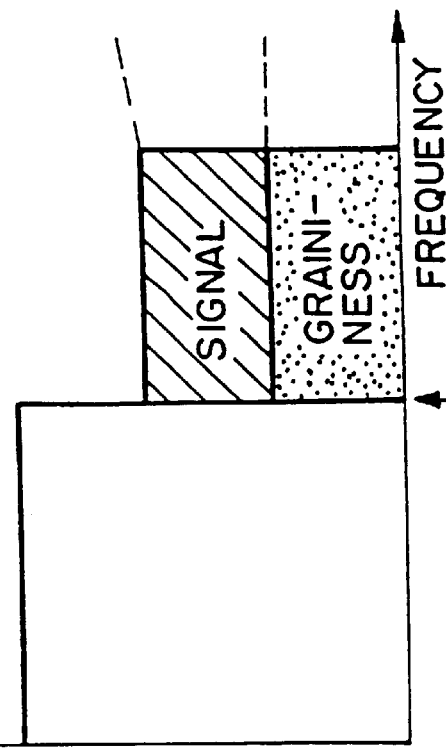
F I G. 32B

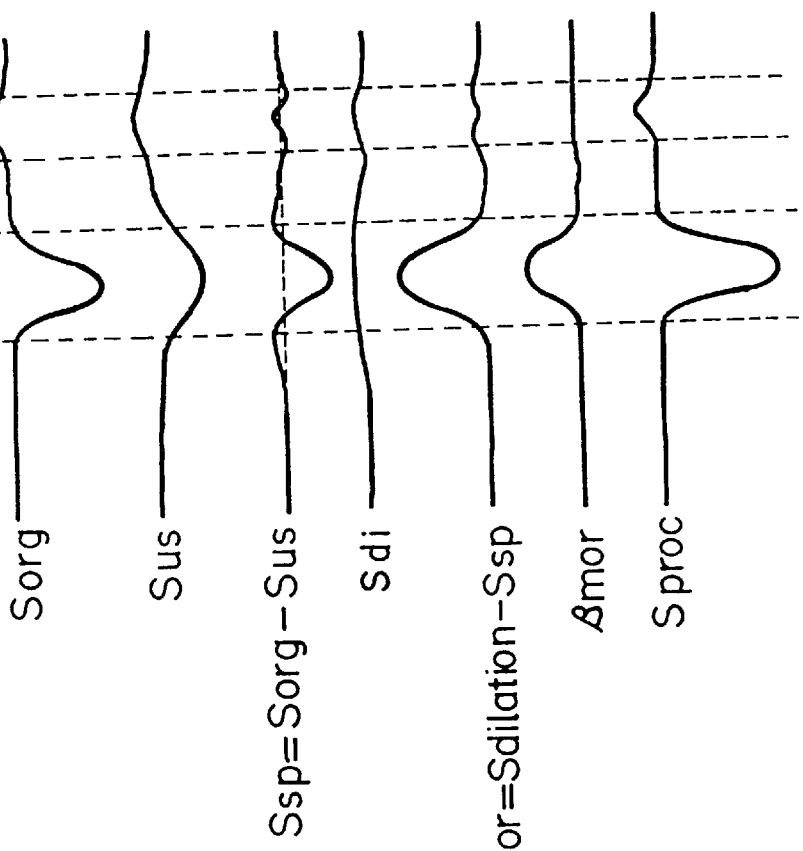
FIG. 33A CONVENTIONAL UNSHARP MASK PROCESSING
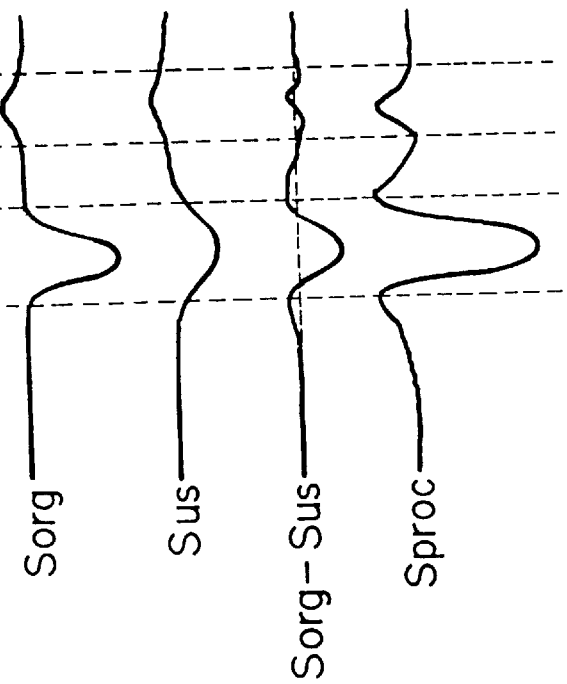
FIG. 33B PROCESSING WITH MORPHOLOGY OPERATION

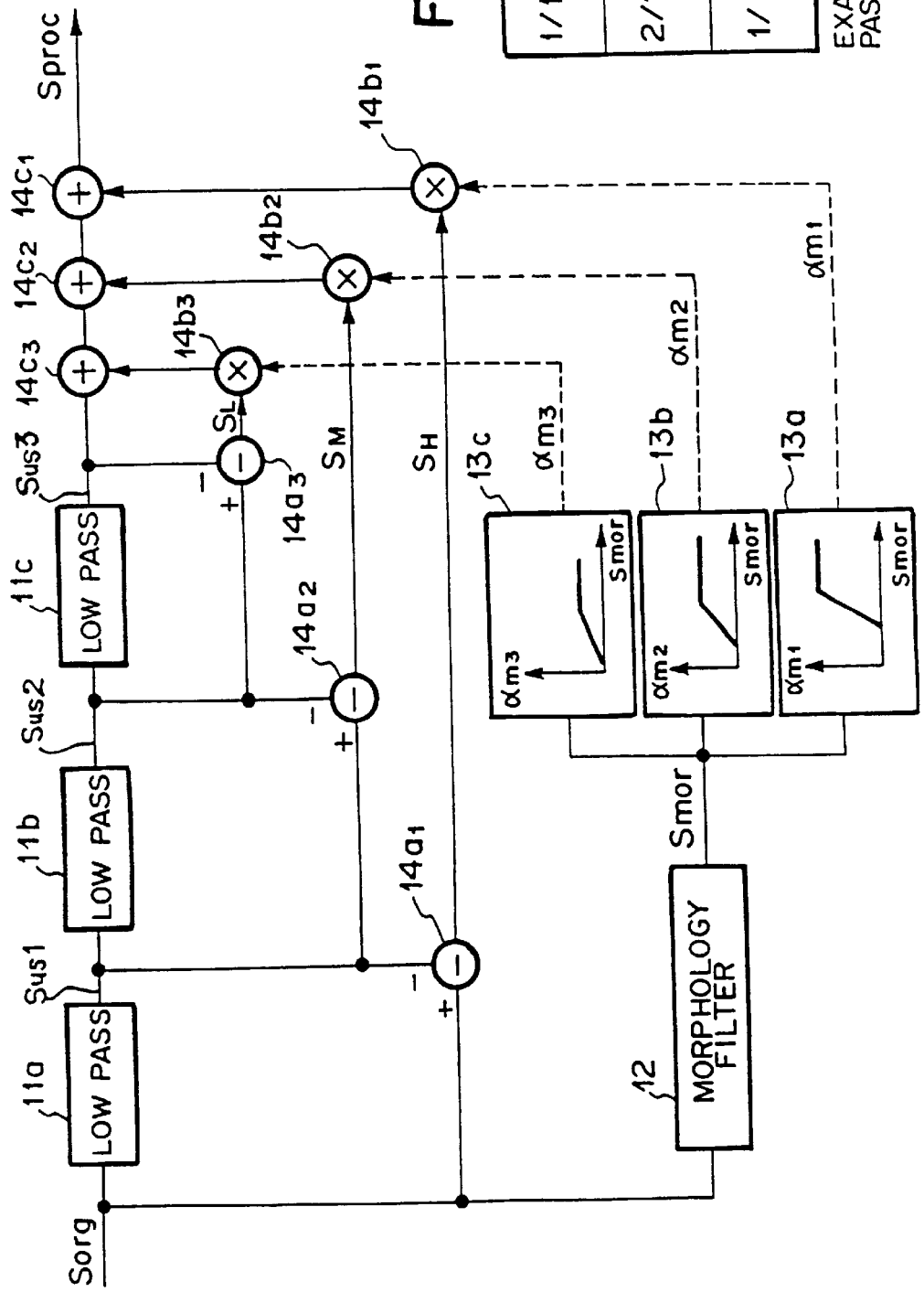

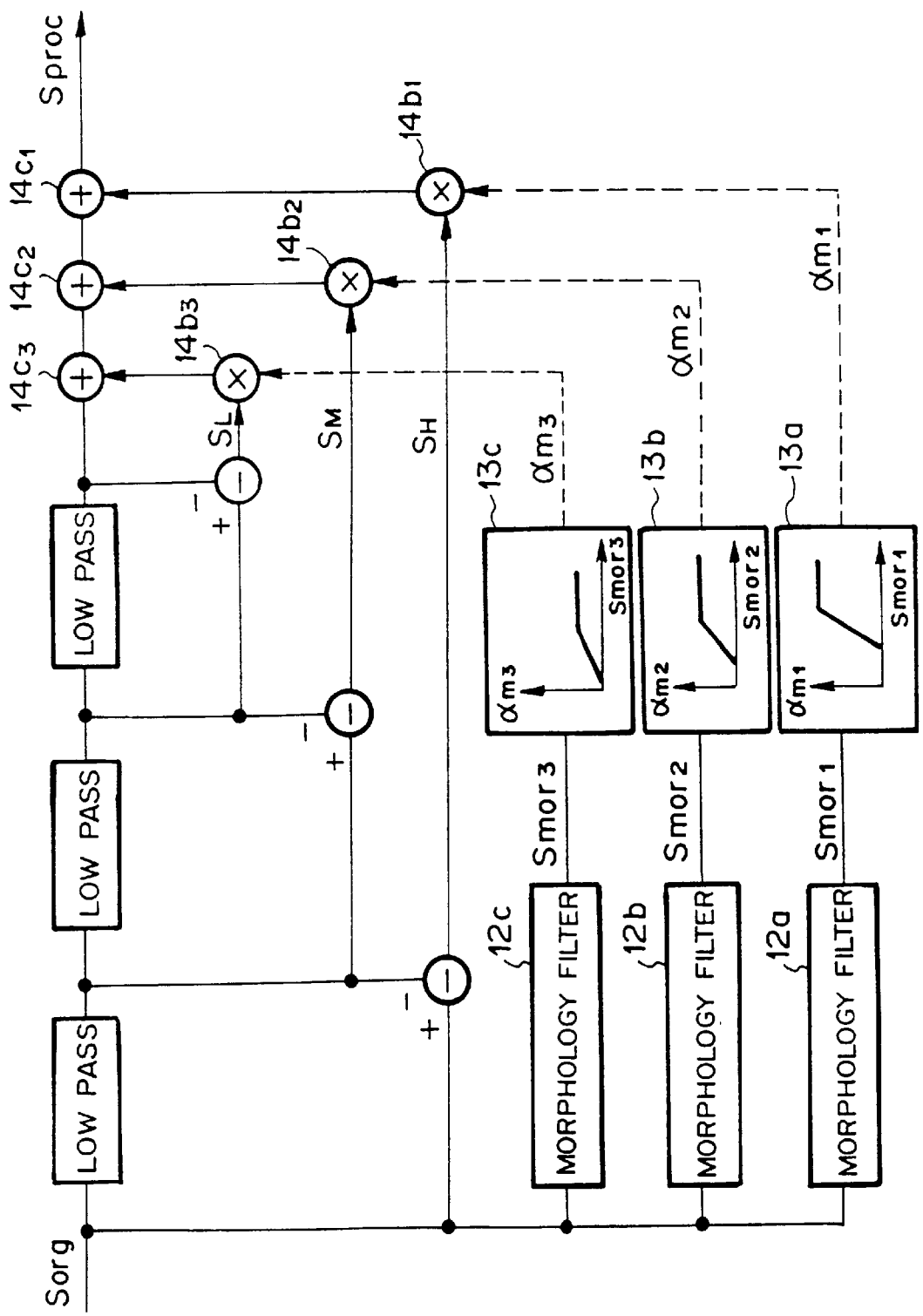
F I G. 36

F I G. 41
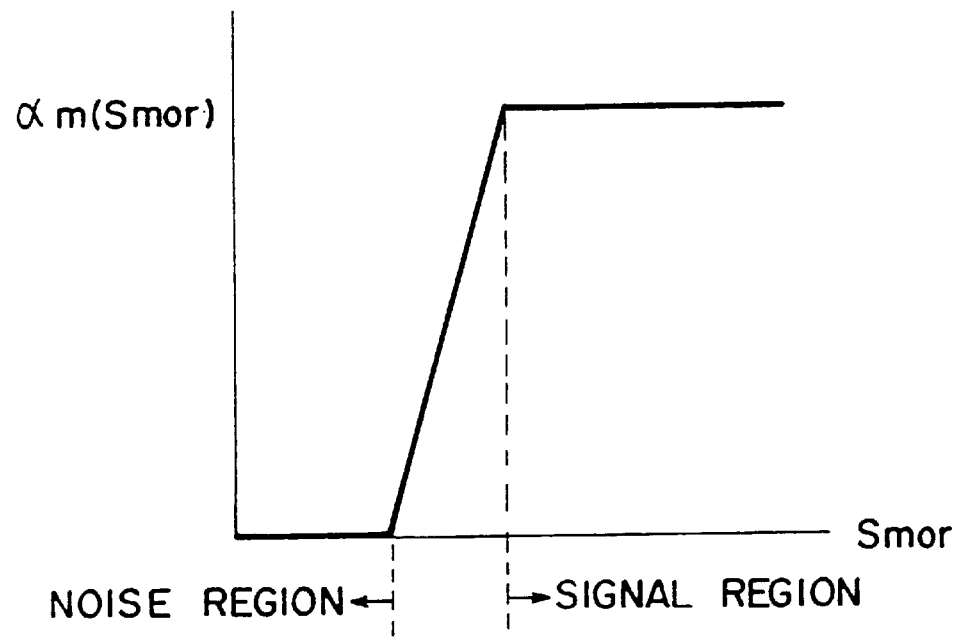
F I G. 42
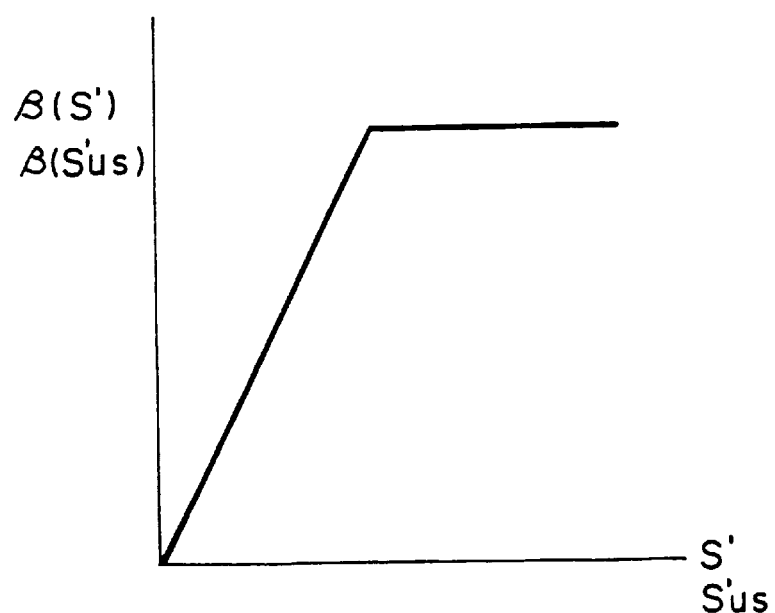

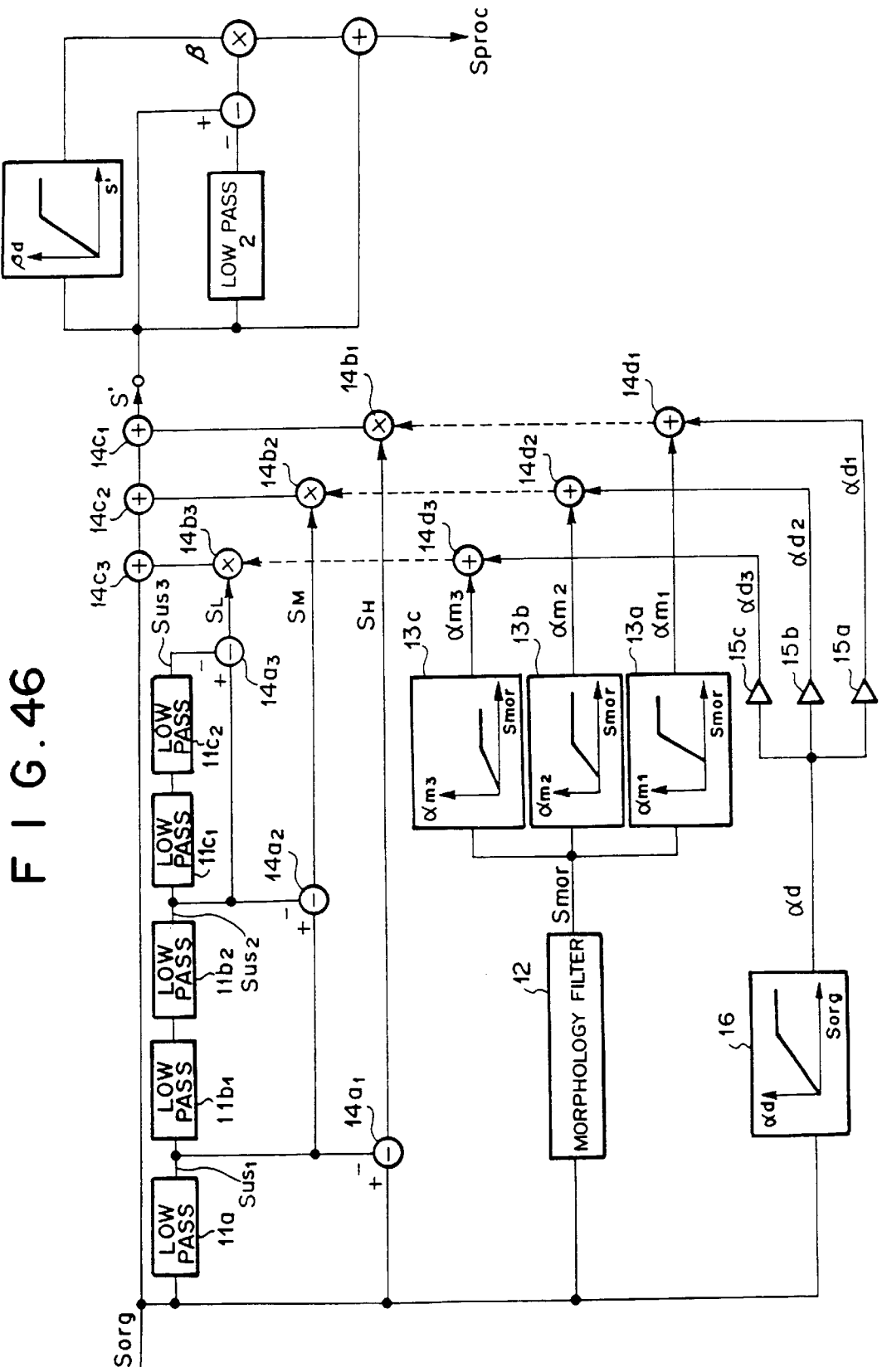
F I G. 46

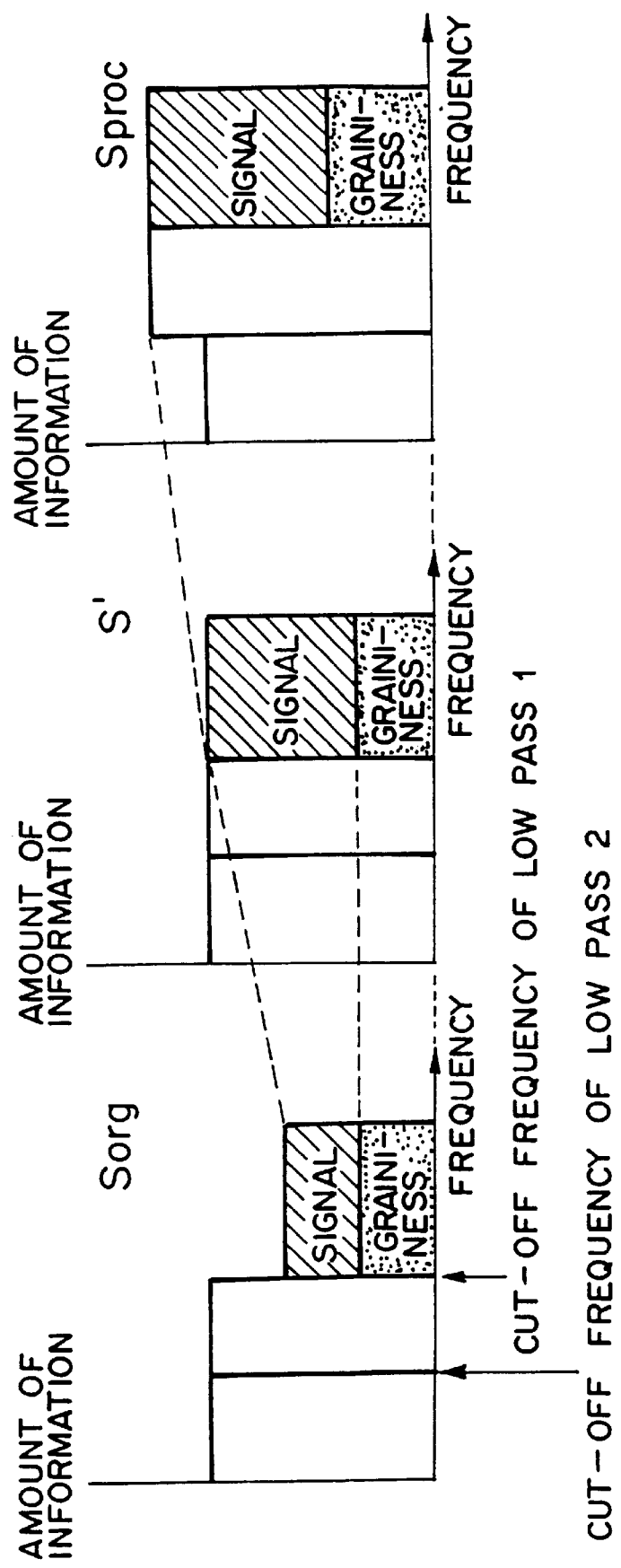

IMAGE PROCESSING METHOD AND APPARATUS

This is a divisional of Application Ser. No. 08/623,223 filed Mar. 26, 1996, the disclosure of which is incorporated herein by reference.

BACKGROUND OF THE INVENTION

1. Field of the Invention

This invention relates to an image processing method and apparatus. This invention particularly relates to an image processing method and apparatus, wherein a specific image portion, such as an abnormal pattern or a high-contrast image portion, which is embedded in an image, is emphasized selectively.

2. Descriotion of the Prior Art

Image processing, such as gradation processing or frequency processing, has heretofore been carried out on an image signal, which represents an image and has been obtained with one of various image obtaining methods, such that a visible image having good image quality can be reproduced and used as an effective tool in, particularly, the accurate and efficient diagnosis of an illness. Particularly, in the field of medical images, such as radiation images of human bodies serving as objects, it is necessary for specialists, such as doctors, to make an accurate diagnosis of an illness or an injury of the patient in accordance with the obtained image. Therefore, it is essential to carry out the image processing in order that a visible image having good image quality can be reproduced and used as an effective tool in the accurate and efficient diagnosis of an illness.

As one of the image processing, frequency emphasis processing has been disclosed in, for example, Japanese Unexamined Patent Publication No. 61(1986)-169971. With the disclosed frequency emphasis processing, an image signal (i.e., an original image signal) Dorg representing the image density value of an original image is converted into an image signal Dproc with Formula (36).

$$Dproc = Dorg + \beta \times (Dorg - Dus) \quad (36)$$

wherein $\beta$ represents the frequency emphasis coefficient, and Dus represents the unsharp mask signal. The unsharp mask signal Dus comprises super-low frequency components obtained by setting a mask, i.e. an unsharp mask, constituted of a picture element matrix, which has a size of N columns×N rows (wherein N represents an odd number) and has its center at the picture element represented by the original image signal Dorg, in a two-dimensional array of picture elements. The unsharp mask signal Dus is calculated with, for example, Formula (37).

$$Dus = (\Sigma Dorg)/N^2 \quad (37)$$

wherein $\Sigma Dorg$ represents the sum of the image signal values representing the picture elements located within the unsharp mask.

The value of (Dorg–Dus) in the parenthesis of the second term of Formula (36) is obtained by subtracting the unsharp mask signal, which represents the super-low frequency components, from the original image signal. Therefore, comparatively high frequency components can be extracted selectively by subtracting the super-low frequency components from the original image signal. The comparatively high frequency components are then multiplied by the frequency emphasis coefficient $\beta$, and the obtained product is added to the original image signal. In this manner, the comparatively high frequency components can be emphasized.

Also, iris filter processing (hereinbelow often referred to as the operation of the iris filter) has heretofore been known as the operation processing for selectively extracting only a specific image portion, such as an abnormal pattern, from an image. [Reference should be made to "Detection of Tumor Patterns in DR Images (Iris Filter)," Obata, et al., Collected Papers of The Institute of Electronics and Communication Engineers of Japan, D-II, Vol. J75-D-II, No. 3, pp. 663–670, March 1992.] The iris filter processing has been studied as a technique efficient for detecting, particularly, a tumor pattern, which is one of characteristic forms of mammary cancers. However, the image to be processed with the iris filter is not limited to the tumor pattern in a mammogram, and the iris filter processing is applicable to any kind of image having the characteristics such that the gradients of the image signal representing the image are centralized.

How the processing for detecting the image portion with the iris filter is carried out will be described hereinbelow by taking the processing for the detection of the tumor pattern as an example.

It has been known that, for example, in a radiation image recorded on a negative X-ray film (i.e., an image yielding an image signal of a high signal level for a high image density), the density values of a tumor pattern are slightly smaller than the density values of the surrounding image areas. The density values of the tumor pattern are distributed such that the density value becomes smaller from the periphery of an approximately circular tumor pattern toward the center point of the tumor pattern. Therefore, in the tumor pattern, gradients of the density values can be found in local areas, and the gradient lines (i.e., gradient vectors) centralize in the directions heading toward the center point of the tumor pattern.

With the iris filter, the gradients of image signal values, which are represented by the density values, are calculated as gradient vectors, the degree of centralization of the gradient vectors is calculated, and a tumor pattern is detected in accordance with the calculated degree of centralization of the gradient vectors. Specifically, the gradient vector at an arbitrary picture element in a tumor pattern is directed to the vicinity of the center point of the tumor pattern. On the other hand, in an elongated pattern, such as a blood vessel pattern, gradient vectors do not centralize upon a specific point. Therefore, the distributions of the directions of the gradient vectors in local areas may be evaluated, and a region, in which the gradient vectors centralize upon a specific point, may be detected. The thus detected region may be taken as a prospective tumor pattern, which is considered as being a tumor pattern. The processing with the iris filter is based on such fundamental concept. Steps of algorithms of the iris filter will be described hereinbelow.

(Step 1) Calculation of Gradient Vectors

For each picture element j among all of the picture elements constituting a given image, the direction $\theta$ of the gradient vector of the image signal representing the image is calculated with Formula (38).

$$\theta = \tan^{-1}(f_3 + f_4 + f_5 + f_6 + f_7) - \frac{(f_{11} + f_{12} + f_{13} + f_{14} + f_{15})}{(f_1 + f_2 + f_3 + f_{15} + f_{16}) - (f_7 + f_8 + f_9 + f_{10})} \quad (38)$$

As illustrated in FIG. 5, $f_1$ through $f_{16}$ in Formula (38) represent the density values (i.e., the image signal values) corresponding to the picture elements located at the peripheral areas of a mask, which has a size of five picture elements (located along the column direction of the picture element array)× five picture elements (located along the row direction of the picture element array) and which has its center at the picture element j.

(Step 2) Calculation of the Degree of Centralization of Gradient Vectors

Thereafter, for each picture element among all of the picture elements constituting the given image, the picture element is taken as a picture element of interest, and the degree of centralization C of the gradient vectors with respect to the picture element of interest is calculated with Formula (39).

$$C = (1/N) \sum_{j=1}^{N} \cos\theta_j \quad (39)$$

As illustrated in FIG. 6, in Formula (39), N represents the number of the picture elements located in the region inside of a circle, which has its center at the picture element of interest and has a radius R, and θj represents the angle made between the straight line, which connects the picture element of interest and each picture element j located in the circle, and the gradient vector at the picture element j, which gradient vector has been calculated with Formula (38). Therefore, in cases where the directions of the gradient vectors of the respective picture elements j centralize upon the picture element of interest, the degree of centralization C represented by Formula (39) takes a large value.

The gradient vector of each picture element j, which is located in the vicinity of a tumor pattern, is directed approximately to the center portion of the tumor pattern regardless of the level of the contrast of the tumor pattern. Therefore, it can be regarded that the picture element of interest associated with the degree of centralization C, which takes a large value, is the picture element located at the center portion of the tumor pattern. On the other hand, in a linear pattern, such as a blood vessel pattern, the directions of the gradient vectors are biased to a certain direction, and therefore the value of the degree of centralization C is small. Accordingly, a tumor pattern can be detected by taking each of all picture elements, which constitute the image, as the picture element of interest, calculating the value of the degree of centralization C with respect to the picture element of interest, and rating whether the value of the degree of centralization C is or is not larger than a predetermined threshold value. Specifically, the processing with the iris filter has the features over an ordinary difference filter in that the processing with the iris filter is not apt to be adversely affected by blood vessel patterns, mammary gland patterns, or the like, and can efficiently detect tumor patterns.

In actual processing, such that the detection performance unaffected by the sizes and shapes of tumor patterns may be achieved, it is contrived to adaptively change the size and the shape of the filter. FIG. 7 shows an example of the filter. The filter is different from the filter shown in FIG. 6. With the filter of FIG. 7, the degree of centralization is rated only with the picture elements, which are located along radial lines extending radially from a picture element of interest in M kinds of directions at 2π/M degree intervals. (In FIG. 7, by way of example, 32 directions at 11.25 degree intervals are shown.)

In cases where the picture element of interest has the coordinates (k, l), the coordinates ([x], [y]) of the picture element, which is located along an i'th radial line and is the n'th picture element as counted from the picture element of interest, are given by Formulas (40) and (41).

$$x = k + n \cos\{2\pi(i-1)/M\} \quad (40)$$

$$y = l + n \sin\{2\pi(i-1)/M\} \quad (41)$$

wherein [x] represents the maximum integer, which does not exceed x, and [y] represents the maximum integer, which does not exceed y.

Also, for each of the radial lines, the output value obtained for the picture elements ranging from the picture element of interest to a picture element, which is located along the radial line and at which the maximum degree of centralization is obtained, is taken as the degree of centralization with respect to the direction of the radial line. The mean value of the degrees of centralization, which have been obtained for all of the radial lines, is then calculated. The mean value of the degrees of centralization having thus been calculated is taken as the degree of centralization C of the gradient vector group with respect to the picture element of interest.

Specifically, the degree of centralization Ci(n), which is obtained for the picture elements ranging from the picture element of interest to the n'th picture element located along the i'th radial line, is calculated with Formula (42).

$$Ci(n) = \sum_{l=1}^{n} \{\cos\theta_{il}/i\},\ R\min \leq n \leq R\max \quad (42)$$

wherein Rmin and Rmax respectively represent the minimum value and the maximum value having been set for the radius of the tumor pattern, which is to be detected.

The calculation of the degree of centralization Ci(n) may be carried out by using Formula (42') in lieu of Formula (42).

$$Ci(n) = \frac{1}{n - R\min + 1} \sum_{l=R\min}^{n} \cos\theta_{il},\ R\min \leq n \leq R\max \quad (42')$$

Specifically, with Formula (42'), the degree of centralization Ci(n) is obtained for the picture elements, which are located along the i'th radial line and fall within the range from an Rmin'th picture element, that corresponds to the minimum value Rmin, as counted from the picture element of interest, to an n'th picture element, that falls within the range from the Rmin'th picture element to an Rmax'th picture element corresponding to the maximum value Rmax, as counted from the picture element of interest.

Thereafter, the degree of centralization C of the gradient vector group is calculated with Formulas (43) and (44).

$$Ci_{\max} = \max_{R\min \leq n \leq R\max} Ci(n) \quad (43)$$

$$C = (1/M) \sum_{i=1}^{M} Ci_{\max} \quad (44)$$

Formula (43) represents the maximum value of the degree of centralization Ci(n) obtained for each of the radial lines with Formula (42) or (42'). Therefore, the region from the picture element of interest to the picture element associated with the degree of centralization Ci(n), which takes the maximum value, may be considered as being the region of the prospective tumor pattern. By the detection of such regions for all of the radial lines with Formula (43), it is possible to judge the shape of the peripheral edge of the region, which may be regarded as the prospective tumor pattern.

With Formula (43), the maximum values of the degrees of centralization within the aforesaid regions are calculated for all directions of the radial lines. Thereafter, with Formula (44), the mean value of the maximum values of the degrees of centralization within the aforesaid regions, which maximum values have been given by Formula (43) for all directions of the radial lines, is calculated. The calculated mean value is compared with a predetermined threshold value T. From the results of the comparison, a judgment is made as to whether there is or is not a probability that the region having its center at the picture element of interest will be the abnormal pattern.

The region, in which the degree of centralization C of the gradient vector group with Formula (44) is rated, is similar to the iris of the human's eye, which expands or contracts in accordance with the brightness of the external field. The size and the shape of the region is changed adaptively in accordance with the distribution of the gradient vectors. Therefore, the filter used is referred to as the iris filter.

(Step 3) Rating of the Shape and Form of the Tumor Pattern

In general, patterns of malignant tumors have the characteristics of the shapes and forms described below.

1) The side edges are irregular.
2) The shape is close to an ellipse.
3) The region inside of the pattern has a convex or concave density distribution.

Therefore, a judgment is made as to the shape and form by considering these characteristics such that patterns of normal tissues may be eliminated from the detected prospective pattern, and such that only the pattern considered as being a tumor pattern, can be detected. The characteristic measures used in making the judgment include the spreadness, the elongation, the roughness of side edges, the circularity, and the degree of convexity or concavity (i.e., the entropy) of the density distribution in the region inside of the pattern.

For example, the circularity may be employed as the characteristic measure for the shape judgment. In such cases, when the degrees of centralization are binarized, the distribution of the binarized degrees of centralization corresponding to the tumor pattern ordinarily takes a shape close to a circle. The diameter of the circle having the same area as the area of the region obtained from the binary conversion is represented by Le. Also, the lengths of the longitudinal side and the lateral side of a square, which has the minimum area capable of accommodating the region, are respectively represented by a and b. In such cases, the circularity $d_{circ}$ is defined by Formula (45)

$$d_{circ}=Le/(a+b) \text{ wherein } Le=2(S/\pi)^{1/2} \qquad (45)$$

In cases where the value of the circularity is smaller than a predetermined threshold value, it is judged that the region is not a tumor pattern, and the region is not detected as the tumor pattern. In cases where the value of the circularity is not smaller than the predetermined threshold value, it is judged that the region is a tumor pattern, and the region is detected as the tumor pattern.

By carrying out the steps described above, the iris filter can efficiently detect a tumor pattern from a radiation image.

Further, processing based upon the algorithm of morphology (hereinbelow referred to as the morphology operation or the morphology processing) has heretofore been known as the operation processing for selectively extracting only a specific image portion, such as an abnormal pattern, from an image.

The morphology processing has been studied as a technique efficient for detecting, particularly, a small calcified pattern, which is one of characteristic forms of mammary cancers. However, the image to be processed with the morphology processing is not limited to the small calcified pattern in a mammogram, and the morphology processing is applicable to any kind of image, in which the size and the shape of a specific image portion (i.e., an abnormal pattern, or the like) to be detected are known previously.

The morphology processing is carried out by using a multi-scale $\lambda$ and a structure element (i.e., a mask) B. The morphology processing has the features in that, for example, (1) it is efficient for extracting a calcified pattern itself, (2) it is not affected by complicated background information, and (3) the extracted calcified pattern does not become distorted.

Specifically, the morphology processing is advantageous over ordinary differentiation processing in that it can more accurately detect the geometrical information concerning the size, the shape, and the density distribution of the calcified pattern. How the morphology processing is carried out will be described hereinbelow by taking the detection of a small calcified pattern in a mammogram as an example.

(Fundamental Operation of Morphology Processing)

In general, the morphology processing is expanded as the theory of sets in an N-dimensional space. As an aid in facilitating the intuitive understanding, the morphology processing will be described hereinbelow with reference to a two-dimensional gray level image.

The gray level image is considered as a space, in which a point having coordinates (x, y) has a height corresponding to a density value f(x, y). In this case, it is assumed that the image signal representing the density value f(x, y) is a high luminance-high signal level type of image signal, in which a low density (i.e., a high luminance when the image is displayed on a CRT display device) is represented by a high image signal level.

Firstly, as an aid in facilitating the explanation, a one-dimensional function f(x) corresponding to the cross section of the two-dimensional gray level image is considered. It is assumed that structure element g used in the morphology operation is a symmetric function of Formula (46), which is symmetric with respect to the origin.

$$g^s(X)=g(-X) \qquad (46)$$

It is also assumed that the value is 0 in a domain of definition G, which is represented by Formula (47).

$$G=\{-m, -m+1, \ldots, -1, 0, 1, \ldots, m-1, m\} \qquad (47)$$

In such cases, the fundamental forms of the morphology operation are very simple operations carried out with Formulas (48), (49), (50), and (51).

$$\text{dilation; } [f \oplus G^s](i) = \max\{f(i-m), \ldots, f(i), \ldots, f(i+m)\} \qquad (48)$$

$$\text{erosion; } [f \ominus G^s](i) = \min\{f(i-m), \ldots, f(i), \ldots, f(i+m)\} \qquad (49)$$

$$\text{opening; } f_g = (f \ominus g^s) \oplus g \qquad (50)$$

$$\text{closing; } f^g = (f \oplus g^s) \ominus g \qquad (51)$$

Specifically, as illustrated in FIG. 14A, the dilation processing is the processing for retrieving the maximum value in the range of a width of ±m (which is the value determined in accordance with a structure element B and corresponding to the mask size shown in FIG. 14A) having its center at a picture element of interest. As illustrated in FIG. 14B, the erosion processing is the processing for retrieving the minimum value in the range of the width of ±m having its center at the picture element of interest.

The signal (indicated by the broken line in FIG. 14A), which is obtained from the dilation processing, or the signal (indicated by the broken line in FIG. 14B), which is obtained from the erosion processing, may then be subtracted from the original image signal. In this manner, as indicated by the portions hatched in FIG. 14A or FIG. 14B, it is possible to obtain a morphology signal Dmor having values other than zero only for an image edge portion, at which the signal value changes sharply, and an image portion, at which the signal values fluctuate within a range spatially smaller than the structure element.

The opening processing is equivalent to the processing in which the dilation processing is carried out after the erosion processing, i.e., the processing in which the maximum value is searched after the searching of the minimum value. Also, the closing processing is equivalent to the processing in which the erosion processing is carried out after the dilation processing, i.e., the processing in which the minimum value is searched after the searching of the maximum value.

More specifically, as illustrated in FIG. 14C, the opening processing is equivalent to the processing for smoothing the density curve f(x) from the low luminance side, and removing a convex density fluctuating portion (i.e., the portion at which the luminance is higher than that of the surrounding portions), which fluctuates in a range spatially narrower than the mask size of 2 m. Also, as illustrated in FIG. 14D, the closing processing is equivalent to the processing for smoothing the density curve f(x) from the high luminance side, and removing a concave density fluctuating portion (i.e., the portion at which the luminance is lower than that of the surrounding portions), which fluctuates in the range spatially narrower than the mask size of 2 m.

The signal (indicated by the broken line in FIG. 14C), which is obtained from the opening processing, or the signal (indicated by the broken line in FIG. 14D), which is obtained from the closing processing, may then be subtracted from the original image signal. In this manner, as indicated by the portions hatched in FIG. 14C or FIG. 14D, it is possible to obtain a morphology signal Dmor having values other than zero only for a characteristic image portion, at which the signal values fluctuate within a range spatially smaller than the structure element.

In cases where the structure element g is not symmetric with respect to the origin, the dilation operation with Formula (48) is referred to as the Minkowski sum, and the erosion operation with Formula (49) is referred to as the Minkowski difference.

In cases where the image signal representing the density value f(x) is a high density-high signal level type of image signal, in which a high density is represented by a high image signal level, the relationship between the density value f(x) and the image signal value becomes reverse to the relationship between the density value f(x) and the image signal value in the high luminance-high image signal level type of image signal. Therefore, the dilation processing, which is carried out on the high density-high signal level type of image signal, coincides with the erosion processing, which is carried out on the high luminance-high signal level type of image signal as shown in FIG. 14B. The erosion processing, which is carried out on the high density-high signal level type of image signal, coincides with the dilation processing, which is carried out on the high luminance-high signal level type of image signal as shown in FIG. 14A. The opening processing, which is carried out on the high density-high signal level type of image signal, coincides with the closing processing, which is carried out on the high luminance-high signal level type of image signal as shown in FIG. 14D. Also, the closing processing, which is carried out on the high density-high signal level type of image signal, coincides with the opening processing, which is carried out on the high luminance-high signal level type of image signal as shown in FIG. 14C.

The morphology processing is herein described with respect to the high luminance-high signal level type of image signal.

(Application to detection of calcified patterns)

In order for a calcified pattern to be detected, it is considered to employ a difference method, in which a smoothed image signal is subtracted from the original image signal. However, with a simple smoothing method, it is difficult to discriminate the calcified pattern from an elongated non-calcified pattern (for example, a pattern of the mammary gland, a blood vessel, mammary gland supporting tissues, or the like). Therefore, Obata of Tokyo University of Agriculture and Technology, et al. have proposed a morphology filter, which is represented by Formula (52) and is based upon the opening operation using a multiply structure element. [Reference should be made to "Extraction of Small Calcified Patterns with A Morphology Filter Using A Multiply Structure Element," Collected Papers of The Institute of Electronics and Communication Engineers of Japan, D-II, Vol. J75-D-II, No. 7, pp. 1170–1176, July 1992; and "Fundamentals of Morphology and Its Application to Mammogram Processing," Medical Imaging Technology, Vol. 12, No. 1, January 1994.]

$$P = f - \max\{(f \ominus Bi) \oplus Bi\} i \epsilon (1, \ldots, M) = f - \max\{f_{Bi}\} i \epsilon (1, \ldots, M) \quad (52)$$

In Formula (52), Bi (wherein i=1, 2, ..., M) represents M number of linear structure elements (M=4 in the example shown in FIG. 12). (The M number of structure elements, as a whole, will hereinbelow be referred to as the multiply structure element. Also, the multiply structure element will often be simply referred to as the structure element, including the cases where i=1.) In cases where the structure element Bi is set to be larger than the calcified pattern to be detected, a calcified pattern, which is a convex signal change portion finer than the structure element Bi (i.e., which is an image portion fluctuating in a spatially narrow range) and has luminance values larger than the luminance values of the surrounding portions, is removed in the opening processing. On the other hand, an elongated non-calcified pattern is longer than the structure element Bi. Therefore, in cases where the inclination of the non-calcified pattern (i.e, the direction along which the non-calcified pattern extends) coincides with one of the directions of the four structure elements Bi, the non-calcified pattern remains unremoved after the opening processing, i.e. the operation of the second term of Formula (52), has been carried out. Therefore, when the smoothed image signal obtained from the opening processing (i.e. the signal representing the image, from which only the calcified pattern has been removed) is subtracted from the original image signal f, an image can be obtained which contains only the small calcified pattern. This is the concept behind Formula (52).

As described above, in cases where the image signal is of the high density-high signal level type, the density value of the calcified pattern is smaller than the density values of the surrounding image portions, and the calcified pattern constitutes a concave signal change portion with respect to the surrounding portions. Therefore, the closing processing is applied in lieu of the opening processing, and Formula (53) is applied in lieu of Formula (52).

$$P = f - \min\{(f \oplus Bi) \ominus Bi\} i \epsilon (1, \ldots, M) = f - \min\{f^{Bi}\} i \epsilon (1, \ldots, M) \quad (53)$$

As described above, in order that a visible image having good image quality can be reproduced and used as an effective tool in, particularly, the accurate and efficient diagnosis of an illness, it is essential to carry out the image processing on the given image. However, in cases where the image processing is carried out for the entire area of the image as in the conventional techniques or in cases where the emphasis processing merely depending on the image density is carried out as disclosed in, for example, Japanese Unexamined Patent Publication No. 2(1990)-1078, components adversely affecting the image quality, such as radiation noise components in a mammogram, are also emphasized. As a result, the image quality of the image and its capability of serving as an effective tool in, particularly, the efficient and accurate diagnosis of an illness become low.

Also, as disclosed in, for example, Japanese Patent Publication No. 60(1985)-192482, Japanese Unexamined Patent Publication No. 2(1990)-120985, and Japanese Patent Application Publication No. 3(1991)-502975, in cases where emphasis processing depending upon the value of variance of an image signal is carried out, an image portion having a locally large change in density is emphasized to a high extent. Therefore, the problems occur in that undershooting and overshooting become relatively perceptible in the vicinity of the image portion. Particularly, as for X-ray images, an artifact is apt to occur on the high density side.

SUMMARY OF THE INVENTION

The primary object of the present invention is to provide an image processing method, wherein components unnecessary for a diagnosis, or the like, such as noise components, are not emphasized, and only a specific image portion of interest is emphasized efficiently.

Another object of the present invention is to provide an image processing method, wherein components unnecessary for a diagnosis, or the like, such as noise components, are not emphasized, only a specific image portion of interest is emphasized efficiently, and the occurrence of an artifact is restricted.

The specific object of the present invention is to provide an apparatus for carrying out the image processing method.

The present invention provides a first image processing method comprising the steps of:

i) carrying out an operation of an iris filter on an original image signal, which represents an image, the degree of centralization of gradients of the original image signal with respect to a picture element being thereby calculated, each of picture elements constituting the image being taken as the picture element, ii) detecting an image portion, which is associated with a high degree of centralization, in the image in accordance with the calculated degree of centralization, and iii) selectively carrying out image emphasis processing on the detected image portion.

The term "image portion associated with a high degree of centralization" as used herein for the first image processing method in accordance with the present invention means specifically the image portion, which is obtained from the operation of the iris filter carrying out the processing of Step 1 to Step 3 described above.

Specifically, in the first image processing method in accordance with the present invention, in cases where the iris filter processing of Step 1 to Step 3 described above is represented by a function $f(x)$, the operation of the iris filter is carried out with Formula (54) on the original image signal Dorg representing the image.

$$\text{Diris} = f(\text{Dorg}) \quad (54)$$

Thereafter, the image portion, which has been detected by the operation of the iris filter, is selectively emphasized with the operation, which is carried out with Formula (55).

$$\text{Dproc} = \text{Dorg} + \alpha \cdot \text{Diris} \quad (55)$$

wherein $\alpha$ represents an emphasis coefficient.

The present invention also provides a second image processing method comprising the steps of:

i) carrying out an operation of an iris filter on an original image signal Dorg, which represents an image, the degree of centralization of gradients of the original image signal Dorg with respect to a picture element being thereby calculated, each of picture elements constituting the image being taken as the picture element, ii) detecting an image portion, which is associated with a high degree of centralization, in the image in accordance with the calculated degree of centralization, iii) obtaining an iris filter signal Giris, which represents whether each of the picture elements constituting the image is or is not the one corresponding to the image portion, iv) calculating an unsharp mask signal Dus, which corresponds to super-low frequency, from the original image signal Dorg, and v) carrying out an operation with Formula (1)

$$\text{Dproc} = \text{Dorg} + \beta(\text{Giris}) \times (\text{Dorg} - \text{Dus}) \quad (1)$$

on the original image signal Dorg by using a function $\beta$ (Giris), which is in accordance with the iris filter signal Giris, and the unsharp mask signal Dus, whereby image emphasis processing is selectively carried out on the image portion.

The term "image portion associated with a high degree of centralization" as used herein for the second image processing method in accordance with the present invention means specifically the image portion, which is obtained from the operation of the iris filter carrying out the processing of Step 1 to Step 3 described above.

Also, in the second image processing method in accordance with the present invention, the function $\beta$ (Giris) is set such that the output in accordance with the signal, which represents that a picture element is the one corresponding to the image portion described above, may be fed out as a value larger than the output in accordance with the signal, which represents that a picture element is not the one corresponding to the image portion described above.

By way of example, as the iris filter signal Giris, which represents whether each of the picture elements constituting the image is or is not the one corresponding to the image portion described above, it is possible to employ a signal in accordance with the degree of centralization C of the gradients of the original image signal Dorg, which degree is calculated with Formula (44).

In the second image processing method in accordance with the present invention, the operation, wherein the iris filter processing of Step 1 to Step 3 described above is carried out on the original image signal Dorg and wherein processing is carried out in order to obtain the iris filter signal Giris representing whether each of the picture elements constituting the image is or is not the one corresponding to the specific image portion detected with the iris filter processing, is often represented by a function f(Dorg).

In such cases, the operation is represented by Formula (56).

$$Giris = f(Dorg) \tag{56}$$

The present invention further provides a third image processing method comprising the steps of:

i) carrying out a morphology operation on an original image signal Dorg, which represents an image, by using a multiply structure element Bi and a scale factor λ, a morphology signal Dmor being thereby obtained, the morphology signal Dmor representing whether each of picture elements constituting the image is or is not the one corresponding to an image portion, at which the original image signal Dorg fluctuates in a spatially narrower range than the multiply structure element Bi, and ii) carrying out image emphasis processing on the original image signal Dorg and in accordance with the morphology signal Dmor.

In the third image processing method in accordance with the present invention, the image emphasis processing in accordance with the morphology signal Dmor may be carried out with Formula (2).

$$Dproc = Dorg + \alpha \cdot f(Dmor) \tag{2}$$

wherein α represents the emphasis coefficient, and f(Dmor) represents the function of Dmor.

As illustrated in FIG. 13, the function f(Dmor) should preferably be set to convert such that the output f(Dmor) may be kept to be equal to 0 (zero) with respect to a region C1, in which the value of the morphology signal |Dmor| is small, such that the output f(Dmor) may be monotonously increased with respect to |Dmor| for a region C2, in which the value of the morphology signal |Dmor| is comparatively large, and such that the output f(Dmor) may be kept to be equal to the upper limit value with respect to a region C3, in which the value of the morphology signal |Dmor| is very large. In such cases, in the region C1, in which the value of Dmor is small, high-frequency radiation noise detected by the morphology filter can be reduced. Also, in the region C3 having a certain extent of contrast, excessive emphasis processing can be prevented from being carried out. In this manner, the image quality of a reproduced visible image and its capability of serving as an effective tool in, particularly, the efficient and accurate diagnosis of an illness can be kept high.

Also, as the structure element B which constitutes the multiply structure element Bi, by way of example, a bisymmetric element having a form of a square, a rectangle, a circle, an ellipse, a rhombus, or the like, is preferable. This is because the image signal is actually distributed in two-dimensional directions.

Further, as the function f(Dmor) in accordance with the morphology signal Dmor, as represented by Formula (3), the morphology signal Dmor itself may be employed.

$$f(Dmor) = Dmor \tag{3}$$

However, as represented by Formula (4), an unsharp mask signal corresponding to super-low frequency of the morphology signal Dmor should preferably be utilized as the function f(Dmor).

$$f(Dmor) = (\Sigma\Sigma Dmor)/N^2 \tag{4}$$

wherein ρΣDmor represents the sum of the morphology signal values with respect to the picture elements located within a picture element matrix, which has a size of N columns×N rows (where N represents an odd number) and has its center at the picture element, that is associated with the morphology signal Dmor, in a two-dimensional array of picture elements.

Specifically, as described above, the value of the morphology signal Dmor sharply becomes large when the signal change portion in a spatially narrower range than the size of the structure element B is detected selectively. Therefore, the morphology signal Dmor takes on the form of a pulsed signal. If the pulsed signal itself is multiplied by the emphasis coefficient α, in cases where the degree of emphasis is high, i.e. in cases where the value of the emphasis coefficient α is large, there will be the risk that the signal value changes sharply at an image area, which connects the signal change portion in a spatially narrower range than the size of the structure element B and the other portions with each other, and that a processed image signal Dproc is obtained which represents an unnatural image.

For example, as illustrated in FIG. 19, in cases where the processed image signal Dproc is obtained by carrying out the calculation with Formula (3) on the original image signal Dorg and the morphology signal Dmor, the value of the processed image signal Dproc changes sharply at the image area, which connects the signal change portion in a spatially narrower range than the size of the structure element B and the other portions with each other. Therefore, there often occurs the risk that an artifact occurs at the connecting image area.

However, in cases where the function of Formula (4) is employed as the function f(Dmor) in accordance with the morphology signal Dmor, the morphology signal Dmor is converted to a signal representing the arithmetic mean value of the morphology signal values with respect to the picture elements located within a picture element matrix, which has a size of N columns×N rows and has its center at the picture element, that is associated with the morphology signal Dmor. Therefore, the pulsed characteristics of the morphology signal Dmor become unsharp. As a result, a processed image signal Dproc in accordance with the function f(Dmor) can be obtained such that it may represent an image, in which the occurrence of an artifact has been reduced and which gives a natural feeling.

Also, as the image emphasis processing in accordance with the morphology signal Dmor, in lieu of the processing carried out with Formula (2), the processing carried out with Formula (5) or Formula (6) may be employed.

$$Dproc = Dorg + \beta(Dorg) \times (Dorg - Dmor) \tag{5}$$

wherein β(Dorg) represents the function of Dorg.

$$Dproc = Dorg + \beta(Dmor) \times (Dorg - Dmor) \tag{6}$$

wherein β(Dmor) represents the function of Dmor.

In cases where the image emphasis processing in accordance with the morphology signal Dmor is carried out with Formula (5), the function β(Dorg) should preferably be set in the manner described below.

(i) In cases where the image emphasis processing is to be carried out for an image portion (for example, a calcified pattern represented by the high luminance-high signal level type of image signal), in which the value of the original image signal Dorg is larger than the image signal values representing the surrounding image areas (i.e., the image portion is convex) and at which the image signal fluctuates in a spatially narrower range than the multiply structure element Bi, as illustrated in FIG. 15A, the function β(Dorg) should preferably be set to be a function monotonously increasing with respect to Dorg. Also, (ii) in cases where the image emphasis processing is to be carried out for an image portion (for example, a calcified pattern represented by the high density-high signal level type of image signal), in which the value of the original image signal Dorg is smaller than the image signal values representing the surrounding image areas (i.e., the image portion is concave) and at which the image signal fluctuates in a spatially narrower range than the multiply structure element Bi, as illustrated in FIG. 15B, the function β(Dorg) should preferably be set to be a function monotonously decreasing with respect to Dorg.

As illustrated in FIG. 16, in cases where the image emphasis processing in accordance with the morphology signal Dmor is carried out with Formula (6), the function β(Dmor) should preferably be set to be a function monotonously increasing with respect to Dmor.

The aforesaid morphology operation may be carried out with Formula (7) shown below. In such cases, an image portion, at which the original image signal Dorg fluctuates in a spatially narrower range than the multiply structure element Bi and in which the value of the original image signal Dorg is larger than the image signal values representing the surrounding image areas, can be extracted, and the extracted image portion can be selectively subjected to the image emphasis processing.

$$Dmor=Dorg-max\{(Dorg\ominus\lambda Bi)\oplus\lambda Bi\} \quad (7)$$

i=1, ... ,n
wherein the expression $X\ominus\lambda Y$ represents that λ times of calculations for finding the Minkowski difference are carried out with the structure element Y on the image signal X, and the expression $X\oplus\lambda Y$ represents that λ times of calculations for finding the Minkowski sum are carried out with the structure element Y on the image signal X.

Alternatively, the aforesaid morphology operation may be carried out with Formula (8) shown below. In such cases, an image portion, at which the original image signal Dorg fluctuates in a spatially narrower range than the multiply structure element Bi and in which the value of the original image signal Dorg is smaller than the image signal values representing the surrounding image areas, can be extracted, and the extracted image portion can be selectively subjected to the image emphasis processing.

$$Dmor=Dorg-min\{(Dorg\oplus\lambda Bi)\ominus\lambda Bi\} \quad (8)$$

i=1, ... ,n
wherein the expression $X\oplus\lambda Y$ represents that λ times of calculations for finding the Minkowski sum are carried out with the structure element Y on the image signal X, and the expression $X\ominus\lambda Y$ represents that λ times of calculations for finding the Minkowski difference are carried out with the structure element Y on the image signal X.

As another alternative, the aforesaid morphology operation may be carried out with Formula (7') shown below. In such cases, an image portion, at which the original image signal Dorg fluctuates in a spatially narrower range than the multiply structure element Bi and in which the value of the original image signal Dorg is larger than the image signal values representing the surrounding image areas, can be extracted, and the extracted image portion can be selectively subjected to the image emphasis processing.

$$Dmor=Dorg-min(Dorg\ominus\lambda Bi) \quad (7')$$

i=1, ... ,n
wherein the expression $X\ominus\lambda Y$ represents that λ times of calculations for finding the Minkowski difference are carried out with the structure element Y on the image signal X.

As a further alternative, the aforesaid morphology operation may be carried out with Formula (8') shown below. In such cases, an image portion, at which the original image signal Dorg fluctuates in a spatially narrower range than the multiply structure element Bi and in which the value of the original image signal Dorg is smaller than the image signal values representing the surrounding image areas, can be extracted, and the extracted image portion can be selectively subjected to the image emphasis processing.

$$Dmor=Dorg-max(Dorg\oplus\lambda Bi) \quad (8')$$

i=1, ... ,n
wherein the expression $X\oplus\lambda Y$ represents that λ times of calculations for finding the Minkowski sum are carried out with the structure element Y on the image signal X.

The present invention still further provides a fourth image processing method comprising the steps of:

i) carrying out a morphology operation on an original image signal Dorg, which represents an image, by using a multiply structure element Bi and a scale factor λ, a morphology signal Dmor being thereby obtained, the morphology signal Dmor representing whether each of picture elements constituting the image is or is not the one corresponding to an image portion, at which the original image signal Dorg fluctuates in a spatially narrower range than the multiply structure element Bi, ii) calculating an unsharp mask signal Dus, which corresponds to super-low frequency, from the original image signal Dorg, and iii) carrying out an operation with Formula (9)

$$Dproc=Dorg+\beta(Dmor)\times f(Dorg-Dus) \quad (9)$$

on the original image signal Dorg by using a function β (Dmor), which is in accordance with the morphology signal Dmor, and a function f(Dorg–Dus), which is in accordance with a difference signal (Dorg–Dus) between the original image signal Dorg and the unsharp mask signal Dus, whereby image emphasis processing is selectively carried out on the image portion.

As illustrated in FIG. 22A or FIG. 22B, the function β(Dmor) is a function, wherein the output is restricted to a small value with respect to the region, in which the value of |Dmor| is mall.

Also, in the fourth image processing method in accordance with the present invention, as the structure element B which constitutes the multiply structure element Bi, by way of example, a bisymmetric element having a form of a square, a rectangle, a circle, an ellipse, a rhombus, or the like, is preferable.

Further, in the fourth image processing method in accordance with the present invention, as the morphology operation, one of various operations carried out with Formulas (7), (8), and (10) to (14) shown below may be employed.

$$Dmor=Dorg-max\{(Dorg\ominus\lambda Bi)\oplus\lambda Bi\} \quad (7)$$

i=1, ... ,n
wherein the expression $X\ominus\lambda Y$ represents that λ times of calculations for finding the Minkowski difference are carried out with the structure element Y on the image signal X, and the expression $X\oplus\lambda Y$ represents that λ times of calculations for finding the Minkowski sum are carried out with the structure element Y on the image signal X.

$$Dmor=Dorg-min\{(Dorg\oplus\lambda Bi)\ominus\lambda Bi\} \quad (8)$$

wherein the expression X⊕λY represents that λ times of calculations for finding the Minkowski sum are carried out with the structure element Y on the image signal X, and the expression X⊖λY represents that λ times of calculations for finding the Minkowski difference are carried out with the structure element Y on the image signal X.

$$Dmor = Dorg - \max(Dorg \ominus \lambda Bi) \quad (10)$$

i=1, . . . ,n
wherein the expression X⊖λY represents that λ times of calculations for finding the Minkowski difference are carried out with the structure element Y on the image signal X.

$$Dmor = Dorg - \min_{i=1,\ldots,n}(Dorg \oplus \lambda Bi) \quad (11)$$

i=1, . . . ,n
wherein the expression X⊕λY represents that λ times of calculations for finding the Minkowski sum are carried out with the structure element Y on the image signal X.

$$Dmor = \bigcup_{\lambda=0}^{N} \left\{ \max_{i=1,\ldots,n}(Dorg \ominus \lambda Bi) - \max_{i=1,\ldots,n}(Dorg \ominus \lambda Bi)_B \right\} \quad (12)$$

wherein the expression X⊖λY represents that λ times of calculations for finding the Minkowski difference are carried out with the structure element Y on the image signal X, the expression $(X \ominus \lambda Y)_Y$ represents that the opening operation with the structure element Y is carried out on the image signal (X⊖λY), and $$\bigcup_{\lambda=0}^{N}$$

represents the sum of sets of λ=0, 1, . . . , N.

$$Dmor = \bigcup_{\lambda=0}^{N} \left\{ \min_{i=1,\ldots,n}(Dorg \oplus \lambda Bi) - \min_{i=1,\ldots,n}(Dorg \oplus \lambda Bi)^B \right\} \quad (13)$$

wherein the expression X⊕λY represents that λ times of calculations for finding the Minkowski sum are carried out with the structure element Y on the image signal X, the expression $(X \oplus \lambda Y)^Y$ represents that the closing operation with the structure element Y is carried out on the image signal (X+λY), and $$\bigcup_{\lambda=0}^{N}$$

represents the sum of sets of λ=0, 1, . . . , N.

$$Dmor = \left| \min_{i=1,\ldots,n}(Dorg \oplus \lambda Bi) - \max_{i=1,\ldots,n}(Dorg \ominus \lambda Bi) \right| \quad (14)$$

wherein the expression X⊕λY represents that λ times of calculations for finding the Minkowski sum are carried out with the structure element Y on the image signal X, and the expression X⊖λY represents that λ times of calculations for finding the Minkowski difference are carried out with the structure element Y on the image signal X.

Specifically, by the application of the morphology operation carried out with Formula (7), it is possible to extract, as the morphology signal Dmor, a signal representing the picture elements constituting an image portion, in which the value of the original image signal Dorg is larger than the image signal values representing the surrounding image areas, and at which the image signal fluctuates in a spatially narrower range than the multiply structure element Bi (for example, the calcified pattern in cases where the image signal is of the high luminance-high signal level type). Therefore, the extracted image portion can be efficiently processed with the image emphasis processing.

Also, by the application of the morphology operation carried out with Formula (8), it is possible to extract, as the morphology signal Dmor, a signal representing the picture elements constituting an image portion, in which the value of the original image signal Dorg is smaller than the image signal values representing the surrounding image areas, and at which the image signal fluctuates in a spatially narrower range than the multiply structure element Bi (for example, the calcified pattern in cases where the image signal is of the high density-high signal level type). Therefore, the extracted image portion can be efficiently processed with the emphasis processing.

Further, by the application of the morphology operation carried out with Formula (10), it is possible to extract, as the morphology signal Dmor, a signal representing the picture elements constituting an image portion, in which the value of the original image signal Dorg is larger than the image signal values representing the surrounding image areas, and at which the image signal fluctuates in a spatially narrower range than the multiply structure element Bi, and an image edge portion at which the luminance (or the density) changes sharply. Therefore, the extracted image portion can be efficiently processed with the emphasis processing.

By the application of the morphology operation carried out with Formula (11), it is possible to extract, as the morphology signal Dmor, a signal representing the picture elements constituting an image portion, in which the value of the original image signal Dorg is smaller than the image signal values representing the surrounding image areas, and at which the image signal fluctuates in a spatially narrower range than the multiply structure element Bi, and an image edge portion at which the luminance (or the density) changes sharply. Therefore, the extracted image portion can be efficiently processed with the emphasis processing.

By the application of the morphology operation carried out with Formula (12), it is possible to extract, as the morphology signal Dmor, a signal representing the picture elements constituting an image portion, in which the value of the original image signal Dorg is larger than the image signal values representing the surrounding image areas, and at which the image signal fluctuates in a spatially narrower range than the multiply structure element Bi and a change in the density (or a change in the luminance) is large (for example, a skeleton pattern in the image represented by the original image signal Dorg). Therefore, the extracted image portion (for example, the skeleton pattern) can be efficiently processed with the emphasis processing. FIG. 23 shows an example of the skeleton processing carried out with Formula (12). As illustrated in FIG. 23, a calculation is made to find a difference signal between a signal representing an image, which has been obtained by carrying out the erosion processing on an original image X with a structure element B (in this case, a circular structure having a radius of r), and a signal representing an image, which has been obtained by carrying out the opening processing on the image obtained from the erosion processing. The sum of sets of the difference signals obtained from the λ number of operations (wherein λ=1, 2, . . . , N) represents a skeleton patterns a and b.

By the application of the morphology operation carried out with Formula (13), it is possible to extract, as the morphology signal Dmor, a signal representing the picture elements constituting an image portion, in which the value of the original image signal Dorg is smaller than the image signal values representing the surrounding image areas, and at which the image signal fluctuates in a spatially narrower range than the multiply structure element Bi and a change in the density (or a change in the luminance) is large (for example, a skeleton pattern in the image represented by the original image signal Dorg). Therefore, the extracted image portion (for example, the skeleton pattern) can be efficiently processed with the emphasis processing.

The morphology operation carried out with Formula (12) or (13) is ordinarily referred to as the skeleton processing. With the skeleton processing, particularly in cases where it is applied to an image signal representing a bone trabecula pattern in an image, only the skeleton element can be selectively and efficiently emphasized.

In cases where the morphology operation is carried out with one of Formulas (7), (8), and (10) to (13), the function f(Dorg−Dus) may be set such that f(Dorg−Dus)=Dorg−Dus.

By the application of the morphology operation carried out with Formula (14), it is possible to extract, as the morphology signal Dmor, a signal representing the picture elements constituting an image portion, in which a local change in the luminance (or a change in the density) is large. Therefore, the extracted image portion can be efficiently processed with the emphasis processing.

In cases where the morphology operation is carried out with Formula (14), in order for the undershooting and overshooting to be restricted, the function f(Dorg−Dus) should be set to be, for example, a function as shown in FIG. 24, which restricts the output with respect to the range of the Dorg values not larger than a predetermined value or with respect to the range of the Dorg values not smaller than a predetermined value.

The present invention also provides a fifth image processing method comprising the steps of:

i) calculating an unsharp mask signal Sus, which corresponds to a predetermined frequency, from an original image signal Sorg, which represents an image, ii) carrying out a morphology operation on a difference signal Ssp, which represents the difference between the unsharp mask signal Sus and the original image signal Sorg, by using a structure element Bi and a scale factor $\lambda$, a morphology signal Smor being thereby obtained, the morphology signal Smor representing a characteristic output with respect to an image portion, at which the difference signal Ssp fluctuates in a spatially narrower range than the structure element Bi, and/or an image portion, at which a change in the difference signal Ssp is sharp, and iii) carrying out image emphasis processing on the difference signal Ssp and in accordance with the morphology signal Smor such that the image portion may be emphasized.

In the fifth image processing method in accordance with the present invention, as the structure element B which constitutes the structure element Bi, by way of example, a bisymmetric element having a form of a square, a rectangle, a circle, an ellipse, a linear shape, a rhombus, or the like, is preferable. This also applies to the first image processing apparatus in accordance with the present invention, which will be described below.

Also, as the image emphasis processing in accordance with the morphology signal Smor, the image emphasis processing carried out with Formula (15) may be employed.

$$\text{Sproc}=\text{Sorg}+\beta(\text{Smor})\times \text{Ssp} \qquad (15)$$

wherein $\beta(\text{Smor})$ represents the emphasis coefficient in accordance with the morphology signal Smor.

As the emphasis coefficient $\beta(\text{Smor})$, for example, the function illustrated in FIG. 28A or FIG. 28B should preferably be employed. Specifically, the function illustrated in FIG. 28A is set such that the output may be restricted to a low level with respect to a region, in which the value of the morphology signal Smor is small, i.e. the radiation noise region (the grainy region), such that the output may be kept to be equal to the upper limit value of $\beta(\text{Smor})$ with respect to a region, in which the value of the morphology signal Smor is very large, i.e. the region corresponding to the desired image portion, such as the calcified pattern, and such that the output may be monotonously increased in accordance with an increase in the morphology signal Smor with respect to an intermediate region. Also, the function illustrated in FIG. 28B is set such that the output may be kept to be equal to zero with respect to a region, in which the value of the morphology signal Smor is small, i.e. the radiation noise region (the grainy region), such that the output may be kept to be equal to the upper limit value of $\beta(\text{Smor})$ with respect to a region, in which the value of the morphology signal Smor is large, i.e. the region corresponding to the desired image portion, such as the calcified pattern, and such that the value of $\beta(\text{Smor})$ may be restricted to a low level with respect to a region, in which the value of the morphology signal Smor is very large. In this manner, the function is set such that, even if extreme emphasis is carried out, the occurrence of the undershooting and overshooting can be restricted.

Further, in the fifth image processing method in accordance with the present invention, as the morphology operation, one of various operations carried out with Formulas (16) to (20) shown below may be employed.

$$\text{Smor}=|\text{Ssp}-\min(\text{Ssp}\oplus \lambda Bi)| \qquad (16)$$

$i=1,\ldots,n$ $$\text{Smor}=|\text{Ssp}-\max(\text{Ssp}\ominus \lambda Bi)| \qquad (17)$$

$i=1,\ldots,n$ $$\text{Smor}=|\text{Ssp}-\max\{(\text{Ssp}\ominus \lambda Bi)\oplus \lambda Bi\}| \qquad (18)$$

$i=1,\ldots,n$ $$\text{Smor}=|\text{Ssp}-\min\{(\text{Ssp}\oplus \lambda Bi)\ominus \lambda Bi\}| \qquad (19)$$

$i=1,\ldots,n$ $$\text{Smor}=|\text{Ssp}\oplus \lambda Bi-\text{Ssp}\ominus \lambda Bi| \qquad (20)$$

In Formulas (16) to (20), the expression $X \ominus \lambda Y$ represents that $\lambda$ times of calculations for finding the Minkowski difference are carried out with the structure element Y on the image signal X, and the expression $X \oplus \lambda Y$ represents that $\lambda$ times of calculations for finding the Minkowski sum are carried out with the structure element Y on the image signal X.

In cases where the morphology operation is carried out with Formula (20), as the image emphasis processing in accordance with the morphology signal Smor, the processing carried out with Formula (21) should preferably be employed.

$$\text{Sproc}=\text{Sorg}+\beta(\text{Smor})\times f(\text{Ssp}) \qquad (21)$$

wherein f(Ssp) represents the function in accordance with Ssp, the function restricting the output with respect to the region, in which the value of |Ssp| is large.

The function f(Ssp) should preferably be set to be, for example, a function as illustrated in FIG. 30, the output of which is kept to be equal to a predetermined value with respect to the range of the values of the difference signal Ssp not larger than a predetermined value or with respect to the range of the values of the difference signal Ssp not smaller than a predetermined value. In such cases, even if extreme emphasis is carried out, the occurrence of the undershooting and overshooting can be restricted.

In cases where the morphology operation carried out with Formula (16) or Formula (17) is applied, it is possible to extract, as the morphology signal Smor, a signal representing the picture elements constituting an image portion, at which the difference signal Ssp fluctuates in a spatially narrower range than the structure element Bi, and an image edge portion at which the luminance (or the density) changes sharply. Therefore, the extracted image portion can be efficiently processed with the emphasis processing.

Also, by the application of the morphology operation carried out with Formula (18), it is possible to extract, as the morphology signal Smor, a signal representing the picture elements constituting an image portion, in which the value of the difference signal Ssp is larger than the signal values with respect to the surrounding image areas, and at which the difference signal Ssp fluctuates in a spatially narrower range than the structure element Bi (for example, the calcified pattern in cases where the image signal is of the high luminance-high signal level type). Therefore, the extracted image portion can be efficiently processed with the image emphasis processing.

Further, by the application of the morphology operation carried out with Formula (19), it is possible to extract, as the morphology signal Smor, a signal representing the picture elements constituting an image portion, in which the value of the difference signal Ssp is smaller than the signal values with respect to the surrounding image areas, and at which the difference signal Ssp fluctuates in a spatially narrower range than the structure element Bi (for example, the calcified pattern in cases where the image signal is of the high density-high signal level type). Therefore, the extracted image portion can be efficiently processed with the emphasis processing.

Furthermore, by the application of the morphology operation carried out with Formula (20), it is possible to extract, as the morphology signal Smor, a signal representing the picture elements constituting an image portion, at which the difference signal Ssp fluctuates in a spatially narrower range than the structure element Bi, and an image edge portion at which the luminance (or the density) changes sharply. Therefore, the extracted image portion can be efficiently processed with the emphasis processing.

The present invention further provides a first image processing apparatus comprising:
i) an unsharp mask signal operation means for calculating an unsharp mask signal Sus, which corresponds to a predetermined frequency, from an original image signal Sorg, which represents an image,
ii) a morphology signal operation means for carrying out a morphology operation on a difference signal Ssp, which represents the difference between the unsharp mask signal Sus and the original image signal Sorg, by using a structure element Bi and a scale factor $\lambda$, a morphology signal Smor being thereby obtained, the morphology signal Smor representing a characteristic output with respect to an image portion, at which the difference signal Ssp fluctuates in a spatially narrower range than the structure element Bi, and/or an image portion, at which a change in the difference signal Ssp is sharp, and
iii) an image emphasis means for carrying out image emphasis processing on the difference signal Ssp and in accordance with the morphology signal Smor such that the image portion may be emphasized.

In the first image processing apparatus in accordance with the present invention, as the image emphasis processing in accordance with the morphology signal Smor, the image emphasis processing carried out with Formula (15) may be employed.

Also, as in the fifth image processing method in accordance with the present invention, as the emphasis coefficient $\beta$(Smor), for example, the function illustrated in FIG. 28A or FIG. 28B should preferably be employed.

Further, in the first image processing apparatus in accordance with the present invention, as the morphology operation, one of various operations carried out with Formulas (16) to (20) may be employed. In cases where the morphology operation is carried out with Formula (20), as the image emphasis processing in accordance with the morphology signal Smor, the processing carried out with Formula (21) should preferably be employed.

The structure element Bi, wherein i=1, 2, ..., M, is a set of M number of structure elements B, which extend in different directions in a two-dimensional plane. In cases where M=1, the structure element Bi is a bisymmetric element. In the fifth image processing method and the first image processing apparatus in accordance with the present invention, the set of structure elements is referred to as the structure element Bi, including the cases where i≧2 and the cases where i=1. Also, the scale factor $\lambda$ represents the number of the operations for finding the Minkowski sum and the operations for finding the Minkowski difference. As the number of the operations becomes large, the extent of smoothing becomes higher.

The present invention further provides a sixth image processing method comprising the steps of:
i) carrying out a morphology operation on an original image signal Sorg, which represents an image, by using a structure element Bi and a scale factor $\lambda$, a morphology signal Smor being thereby obtained, the morphology signal Smor representing a characteristic output with respect to an image portion, at which the original image signal Sorg fluctuates in a spatially narrower range than the structure element Bi, and/or an image portion, at which a change in the original image signal Sorg is sharp,
ii) dividing the original image signal Sorg into frequency components $S_n$ falling within a plurality of different frequency bands, and
iii) carrying out image emphasis processing on the frequency components, which fall within at least a single frequency band and are among the frequency components $S_n$ falling within the plurality of the different frequency bands, and in accordance with the morphology signal Smor, a processed image signal Sproc being thereby obtained.

The term "frequency components $S_n$ falling within a plurality of different frequency bands" as used herein does not necessarily mean only the frequency components divided such that a frequency band, within which certain frequency components fall, may not overlap upon a frequency band, within which the other frequency components fall. It is only necessary that a certain frequency band, within which certain frequency components fall, to be different from a frequency band, within which the other frequency components fall.

In the sixth image processing method in accordance with the present invention, as the morphology operation, one of various operations carried out with Formulas (57) to (60) shown below may be employed. This also applies to a seventh image processing method and second and third image processing apparatuses in accordance with the present invention, which will be described below.

$$Smor=|Sorg-max\{(Sorg\ominus\lambda Bi)\oplus\lambda Bi\}| \qquad (57)$$

i=1, . . . ,n $$Smor=|Sorg-min\{(Sorg\oplus\lambda Bi)\ominus\lambda Bi\}| \qquad (58)$$

i=1, . . . ,n $$Smor=|Sorg-max(Sorg\ominus\lambda Bi)| \qquad (59)$$

i=1, . . . ,n $$Smor=|Sorg-min(Sorg\oplus\lambda Bi)| \qquad (60)$$

i=1, . . . ,n

Also, in the sixth image processing method in accordance with the present invention, as the structure element B which constitutes the structure element Bi, by way of example, a bisymmetric element having a form of a square, a rectangle, a circle, an ellipse, a linear shape, a rhombus, or the like, is preferable.

Further, as the image emphasis processing in accordance with the morphology signal Smor, it is possible to employ the image emphasis processing, which is carried out with Formula (22) or Formula (22') shown below in accordance with an output of a conversion table for feeding out an emphasis coefficient $\alpha m_n(Smor)$ in accordance with the morphology signal Smor, the emphasis coefficient having been previously set for each of the different frequency bands, within which the frequency components $S_n$ fall.

$$Sproc=\Sigma\{S_n \times \alpha m_n(Smor)\} \qquad (22)$$

wherein $\alpha m_n(Smor)$ represents the emphasis coefficient in accordance with the morphology signal Smor.

$$Sproc=Sorg+\Sigma\{S_n \times \alpha m_n(Smor)\} \qquad (22')$$

By way of example, the original image signal Sorg may be divided into high frequency components $S_H$ falling within a high frequency band $f_H$, middle frequency components $S_M$ falling within a middle frequency band $f_M$, and low frequency components $S_L$ falling within a low frequency band $f_L$. In such cases, as the emphasis coefficient $\alpha m_n(Smor)$, for example, the functions illustrated in FIGS. 35A, 35B, and 35C should preferably be employed. Specifically, as illustrated in FIG. 35A, an emphasis coefficient $\alpha m_H(Smor)$ corresponding to the high frequency components $S_H$ is set to be a function such that the output $\alpha m_H(Smor)$ may be monotonously increased in accordance with an increase in the morphology signal Smor with respect to a region, in which the value of the morphology signal Smor is comparatively small, and such that the output $\alpha m_H(Smor)$ may be kept to be equal to a predetermined value with respect to a region, in which the value of the morphology signal Smor is comparatively large. Also, as illustrated in FIG. 35B, an emphasis coefficient $\alpha m_M(Smor)$ corresponding to the middle frequency components $S_M$ is set to be a function such that the output $\alpha m_M(Smor)$ may be monotonously decreased in accordance with an increase in the morphology signal Smor with respect to a region, in which the value of the morphology signal Smor is comparatively small, and such that the output $\alpha m_M(Smor)$ may be kept to be equal to zero with respect to a region, in which the value of the morphology signal Smor is comparatively large. Further, as illustrated in FIG. 35C, an emphasis coefficient $\alpha m_L(Smor)$ corresponding to the low frequency components $S_L$ is set to be a function such that the output $\alpha m_L(Smor)$ may be approximately kept at a predetermined value (=1).

In cases where the functions shown in FIGS. 35A, 35B, and 35C are employed, the signal components of the low frequency band $f_L$ can be emphasized, noise (i.e., grainy components) of the middle frequency band $f_M$ can be restricted, and the signal components of the high frequency band $f_H$ can be emphasized even further. Grainy components of the high frequency band $f_H$ are the same as those of the original image signal Sorg. However, as a result of the emphasis of the signal components, the grainy components of the high frequency band $f_H$ can be restricted relatively.

By the application of the morphology operation carried out with Formula (57), it is possible to extract, as the morphology signal Smor, a signal representing the picture elements constituting an image portion, in which the image signal value is larger than the image signal values representing the surrounding image areas, and at which the image signal fluctuates in a spatially narrower range than the structure element Bi (for example, the calcified pattern in cases where the image signal is of the high luminance-high signal level type). Therefore, the extracted image portion can be efficiently processed with the image emphasis processing.

Also, by the application of the morphology operation carried out with Formula (58), it is possible to extract, as the morphology signal Smor, a signal representing the picture elements constituting an image portion, in which the image signal value is smaller than the image signal values representing the surrounding image areas, and at which the image signal fluctuates in a spatially narrower range than the structure element Bi (for example, the calcified pattern in cases where the image signal is of the high density-high signal level type). Therefore, the extracted image portion can be efficiently processed with the emphasis processing.

Further, by the application of the morphology operation carried out with Formula (59) or Formula (60), it is possible to extract, as the morphology signal Smor, a signal representing the picture elements constituting an image portion, at which the image signal fluctuates in a spatially narrower range than the structure element Bi, and an image edge portion at which the luminance (or the density) changes sharply. Therefore, the extracted image portion can be efficiently processed with the emphasis processing.

In a seventh image processing method in accordance with the present invention, the sixth image processing method in accordance with the present invention is modified such that, in lieu of the single kind of the structure element Bi, a plurality of kinds of structure elements $Bi_n$ having different sizes may be utilized in the morphology operations carried out on the original image signal Sorg.

Specifically, the present invention still further provides a seventh image processing method comprising the steps of:

i) carrying out morphology operations on an original image signal Sorg, which represents an image, by using a plurality of kinds of structure elements $Bi_n$, which have different sizes and correspond respectively to a plurality of different frequency bands, and a scale factor $\lambda$, a plurality of morphology signals $Smor_n$ being thereby obtained, each of the morphology signals $Smor_n$ representing a characteristic output with respect to an image portion, at which the original image signal Sorg fluctuates in a spatially narrower range than the corresponding one of the structure elements $Bi_n$, and/or an image portion, at which a change in the original image signal Sorg is sharp, ii) dividing the original image signal Sorg into frequency components $S_n$ falling within the plurality of the different frequency bands, which respectively correspond to the sizes of the plurality of kinds of the structure elements $Bi_n$, and iii) carrying out image emphasis processing on the frequency components, which fall within at least a single frequency band and are among the frequency components $S_n$ falling within the plurality of the different frequency bands, and in accordance with the corresponding one of the morphology signals $Smor_n$, which has been obtained from the morphology operation carried out with one of the structure elements $Bi_n$, the one of the structure elements $Bi_n$ having the size corresponding to the at least single frequency band, within which the frequency components subjected to the image emphasis processing fall, a processed image signal Sproc being thereby obtained.

In the seventh image processing method in accordance with the present invention, as the image emphasis processing in accordance with one of the morphology signal $Smor_n$, it is possible to employ the image emphasis processing, which is carried out with Formula (23) or Formula (23') shown below in accordance with an output of a conversion table for feeding out an emphasis coefficient $\alpha m_n(Smor_n)$ in accordance with the one of the morphology signal $Smor_n$, the emphasis coefficient having been previously set for each of the different frequency bands, within which the frequency components $S_n$ fall.

$$Sproc = \Sigma \{S_n \times \alpha m_n(Smor_n)\} \qquad (23)$$

wherein $\alpha m_n(Smor_n)$ represents the emphasis coefficient in accordance with the morphology signal $Smor_n$.

$$Sproc = Sorg + \Sigma \{S_n \times \alpha m_n(Smor_n)\} \qquad (23')$$

In the sixth or seventh image processing method in accordance with the present invention, image emphasis processing in accordance with the original image signal Sorg may further be carried out on the frequency components falling within at least a single frequency band, which are subjected to the image emphasis processing in accordance with the morphology signal Smor.

Specifically, for example, the emphasis coefficient $\alpha m_n$ (Smor) in accordance with the morphology signal Smor [or the emphasis coefficient $\alpha m_n(Smor_n)$ in the seventh image processing method in accordance with the present invention] and an emphasis coefficient $\alpha d_n(Sorg)$ in accordance with the original image signal Sorg may be multiplied by each other or added to each other. The resulting value may be taken as a new emphasis coefficient $\alpha_n$ and applied to Formula (22) or (22') or to Formula (23) or (23'). By way of example, the operation may be carried out with Formula (61) or Formula (62).

$$Sproc = \Sigma \{S_n \times \alpha d_n(Sorg) \times \alpha m_n(Smor)\} \qquad (61)$$

$$Sproc = \Sigma [S_n \times \{\alpha d_n(Sorg) + \alpha m_n(Smor)\}] \qquad (62)$$

wherein $\alpha m_n(Smor)$ represents the emphasis coefficient in accordance with the morphology signal Smor, and $\alpha d_n$ (Sorg) represents the emphasis coefficient in accordance with the original image signal Sorg.

The present invention also provides a second image processing apparatus comprising:

i) a morphology signal operation means for carrying out a morphology operation on an original image signal Sorg, which represents an image, by using a structure element Bi and a scale factor $\lambda$, a morphology signal Smor being thereby obtained, the morphology signal Smor representing a characteristic output with respect to an image portion, at which the original image signal Sorg fluctuates in a spatially narrower range than the structure element Bi, and/or an image portion, at which a change in the original image signal Sorg is sharp, ii) a frequency band dividing means for dividing the original image signal Sorg into frequency components $S_n$ falling within a plurality of different frequency bands, and iii) an image emphasis means for carrying out image emphasis processing on the frequency components, which fall within at least a single frequency band and are among the frequency components $S_n$ falling within the plurality of the different frequency bands, and in accordance with the morphology signal Smor, a processed image signal Sproc being thereby obtained.

In the second image processing apparatus in accordance with the present invention, as the image emphasis processing in accordance with the morphology signal Smor, it is possible to employ the image emphasis processing, which is carried out with Formula (22) or Formula (22') shown above in accordance with an output of a conversion table for feeding out an emphasis coefficient $\alpha m_n(Smor)$ in accordance with the morphology signal Smor, the emphasis coefficient having been previously set for each of the different frequency bands, within which the frequency components $S_n$ fall.

The present invention further provides a third image processing apparatus comprising:

i) a morphology signal operation means for carrying out morphology operations on an original image signal Sorg, which represents an image, by using a plurality of kinds of structure elements $Bi_n$, which have different sizes and correspond respectively to a plurality of different frequency bands, and a scale factor $\lambda$, a plurality of morphology signals $Smor_n$ being thereby obtained, each of the morphology signals $Smor_n$ representing a characteristic output with respect to an image portion, at which the original image signal Sorg fluctuates in a spatially narrower range than the corresponding one of the structure elements $Bi_n$, and/or an image portion, at which a change in the original image signal Sorg is sharp, ii) a frequency band dividing means for dividing the original image signal Sorg into frequency components $S_n$ falling within the plurality of the different frequency bands, which respectively correspond to the sizes of the plurality of kinds of the structure elements $Bi_n$, and iii) an image emphasis means for carrying out image emphasis processing on the frequency components, which fall within at least a single frequency band and are among the frequency components $S_n$ falling within the plurality of the different frequency bands, and in accordance with the corresponding one of the morphology signals $Smor_n$, which has been obtained from the morphology operation carried out with one of the structure elements $Bi_n$, the one of the structure elements $Bi_n$ having the size corresponding to the at least single frequency band, within which the frequency components subjected to the image emphasis processing fall, a processed image signal Sproc being thereby obtained.

In the third image processing apparatus in accordance with the present invention, as the image emphasis processing in accordance with one of the morphology signal $Smor_n$, it is possible to employ the image emphasis processing, which is carried out with Formula (23) or Formula (23') shown above in accordance with an output of a conversion table for feeding out an emphasis coefficient $\alpha m_n(Smor_n)$ in accordance with the one of the morphology signal $Smor_n$, the emphasis coefficient having been previously set for each of the different frequency bands, within which the frequency components $S_n$ fall.

In the second or third image processing apparatus in accordance with the present invention, image emphasis processing in accordance with the original image signal Sorg may further be carried out on the frequency components falling within at least a single frequency band, which are subjected to the image emphasis processing in accordance with the morphology signal Smor. By way of example, the operation may be carried out with Formula (61) or Formula (62) shown above.

The structure element Bi, wherein i=1, 2, ..., M, is a set of M number of structure elements B, which extend in different directions in a two-dimensional plane. In cases where M=1, the structure element Bi is a bisymmetric element. In the sixth and seventh image processing methods and the second and third image processing apparatuses in accordance with the present invention, the set of structure elements is referred to as the structure element Bi, including the cases where i≧2 and the cases where i=1. Also, the scale factor λ represents the number of the operations for finding the Minkowski sum and the operations for finding the Minkowski difference. As the number of the operations becomes large, the extent of smoothing becomes higher.

The present invention still further provides an eighth image processing method comprising the steps of:
 i) carrying out a morphology operation on an original image signal Sorg, which represents an image, by using a structure element Bi and a scale factor λ, a morphology signal Smor being thereby obtained, the morphology signal Smor representing whether each of picture elements constituting the image is or is not the one corresponding to an image portion, at which the original image signal Sorg fluctuates in a spatially narrower range than the structure element Bi, and/or an image portion, at which a change in the original image signal Sorg is sharp,
 ii) carrying out first image emphasis processing on the original image signal Sorg and in accordance with the morphology signal Smor such that the image portion may be emphasized, a first processed image signal S' being thereby obtained, and
 iii) carrying out second image emphasis processing on the first processed image signal S' and in accordance with the first processed image signal S' such that an image portion, which corresponds to a desired frequency band among the frequency bands of the first processed image signal S', may be emphasized.

In the eighth image processing method in accordance with the present invention, as the structure element B which constitutes the structure element Bi, by way of example, a bisymmetric element having a form of a square, a rectangle, a circle, an ellipse, a linear shape, a rhombus, or the like, is preferable. This also applies to the image processing methods and apparatuses, which will be described later.

Also, in the eighth image processing method in accordance with the present invention, the frequency band, which is subjected to the first image emphasis processing, and the frequency band, which is subjected to the second image emphasis processing, should preferably be different from each other. In such cases, each of the different frequency bands of the image can be emphasized. However, the frequency band, which is subjected to the first image emphasis processing, and the frequency band, which is subjected to the second image emphasis processing, need not necessarily be different from each other. The same frequency band may be subjected to the first image emphasis processing and the second image emphasis processing, or frequency bands, portions of which overlap one upon the other, may be subjected thereto.

The present invention also provides a ninth image processing method comprising the steps of:
 i) carrying out a morphology operation on an original image signal Sorg, which represents an image, by using a structure element Bi and a scale factor λ, a morphology signal Smor being thereby obtained, the morphology signal Smor representing whether each of picture elements constituting the image is or is not the one corresponding to an image portion, at which the original image signal Sorg fluctuates in a spatially narrower range than the structure element Bi, and/or an image portion, at which a change in the original image signal Sorg is sharp,
 ii) calculating an unsharp mask signal Sus, which corresponds to a first predetermined frequency, from the original image signal Sorg,
 iii) carrying out a first image emphasis processing with Formula (24)

$$S'=Sorg+\alpha m(Smor)\times(Sorg-Sus) \qquad (24)$$

on the original image signal Sorg by using an emphasis coefficient αm(Smor), which is in accordance with the morphology signal Smor, a first processed image signal S' being thereby obtained,
 iv) calculating an unsharp mask signal S'us, which corresponds to a second predetermined frequency, from the first processed image signal S', and
 v) carrying out a second image emphasis processing with Formula (25)

$$Sproc=S'+\beta(S')\times(S'-S'us) \qquad (25)$$

on the first processed image signal S' by using an emphasis coefficient β(S'), which is in accordance with the first processed image signal S', a second processed image signal Sproc being thereby obtained, or
 v') carrying out a second image emphasis processing with Formula (26)

$$Sproc=S'+\beta(S'us)\times(S'-S'us) \qquad (26)$$

on the first processed image signal S' by using an emphasis coefficient β(S'us), which is in accordance with the unsharp mask signal S'us calculated from the first processed image signal S', a second processed image signal Sproc being thereby obtained.

In the ninth image processing method in accordance with the present invention, the unsharp mask signals Sus and S'us should preferably be calculated by using the unsharp masks having different sizes. In such cases, each of the different frequency bands of the image can be emphasized. However, the sizes of the unsharp masks need not necessarily be different from each other. This also applies to the image processing methods and apparatuses, which will be described later.

Also, in the ninth image processing method in accordance with the present invention, as the emphasis coefficient $\alpha m(Smor)$, for example, the function illustrated in FIG. 41 should preferably be employed. Specifically, the function illustrated in FIG. 41 is set such that the output may be kept to be equal to zero with respect to a region, in which the value of the morphology signal Smor is small, i.e. the radiation noise region (the grainy region), such that the output may be kept to be equal to the upper limit value of $\alpha m(Smor)$ with respect to a region, in which the value of the morphology signal Smor is very large, i.e. the region corresponding to the desired image portion, such as the calcified pattern, and such that the output may be monotonously increased in accordance with an increase in the morphology signal Smor with respect to an intermediate region.

Further, in the ninth image processing method in accordance with the present invention, as the emphasis coefficient $\beta(S')$ and the emphasis coefficient $\beta(S'us)$, for example, the function illustrated in FIG. 42 should preferably be employed. This also applies to the image processing methods and apparatuses, which will be described later.

Further, in the eighth and ninth image processing methods in accordance with the present invention and the image processing methods and apparatuses in accordance with the present invention, which will be described later, as the morphology operation, one of various operations carried out with Formulas (30) to (35) shown below may be employed.

$$Smor = Sorg - \max_{i=1,\ldots,n}\{(Sorg \ominus \lambda Bi) \oplus \lambda Bi\} \quad (30)$$

$$Smor = Sorg - \min_{i=1,\ldots,n}\{(Sorg \oplus \lambda Bi) \ominus \lambda Bi\} \quad (31)$$

$$Smor = Sorg - \max_{i=1,\ldots,n}(Sorg \ominus \lambda Bi) \quad (32)$$

$$Smor = Sorg - \min_{i=1,\ldots,n}(Sorg \oplus \lambda Bi) \quad (33)$$

$$Smor = \bigcup_{\lambda=0}^{N}\left\{\max_{i=1,\ldots,n}(Sorg \ominus \lambda Bi) - \max_{i=1,\ldots,n}(Sorg \ominus \lambda Bi)_B\right\} \quad (34)$$

$$Smor = \bigcup_{\lambda=0}^{N}\left\{\min_{i=1,\ldots,n}(Sorg [+] \lambda Bi) - \min_{i=1,\ldots,n}(Sorg [+] \lambda Bi)^B\right\} \quad (35)$$

In Formulas (30) to (35), the expression $X \ominus \lambda Y$ represents that $\lambda$ times of calculations for finding the Minkowski difference are carried out with the structure element Y on the image signal X, and the expression $X \oplus \lambda Y$ represents that $\lambda$ times of calculations for finding the Minkowski sum are carried out with the structure element Y on the image signal X. Also, the expression $(X \ominus \lambda Y)_Y$ represents that the opening operation with the structure element Y is carried out on the image signal $(X \ominus \lambda Y)$, the expression $(X \oplus \lambda Y)^Y$ represents that the closing operation with the structure element Y is carried out on the image signal $(X \oplus \lambda Y)$, and $$\bigcup_{\lambda=0}^{N}$$

represents the sum of sets of $\lambda = 0, 1, \ldots, N$.

Specifically, by the application of the morphology operation carried out with Formula (30), it is possible to extract, as the morphology signal Smor, a signal representing the picture elements constituting an image portion, in which the value of the original image signal Sorg is larger than the image signal values representing the surrounding image areas, and at which the image signal fluctuates in a spatially narrower range than the structure element Bi (for example, the calcified pattern in cases where the image signal is of the high luminance-high signal level type). Therefore, the extracted image portion can be efficiently processed with the image emphasis processing.

Also, by the application of the morphology operation carried out with Formula (31), it is possible to extract, as the morphology signal Smor, a signal representing the picture elements constituting an image portion, in which the value of the original image signal Sorg is smaller than the image signal values representing the surrounding image areas, and at which the image signal fluctuates in a spatially narrower range than the structure element Bi (for example, the calcified pattern in cases where the image signal is of the high density-high signal level type). Therefore, the extracted image portion can be efficiently processed with the emphasis processing.

Further, by the application of the morphology operation carried out with Formula (32), it is possible to extract, as the morphology signal Smor, a signal representing the picture elements constituting an image portion, in which the value of the original image signal Sorg is larger than the image signal values representing the surrounding image areas, and at which the image signal fluctuates in a spatially narrower range than the structure element Bi, and an image edge portion at which the luminance (or the density) changes sharply. Therefore, the extracted image portion can be efficiently processed with the emphasis processing.

By the application of the morphology operation carried out with Formula (33), it is possible to extract, as the morphology signal Smor, a signal representing the picture elements constituting an image portion, in which the value of the original image signal Sorg is smaller than the image signal values representing the surrounding image areas, and at which the image signal fluctuates in a spatially narrower range than the structure element Bi, and an image edge portion at which the luminance (or the density) changes sharply. Therefore, the extracted image portion can be efficiently processed with the emphasis processing.

By the application of the morphology operation carried out with Formula (34), it is possible to extract, as the morphology signal Smor, a signal representing the picture elements constituting an image portion, in which the value of the original image signal Sorg is larger than the image signal values representing the surrounding image areas, and at which the image signal fluctuates in a spatially narrower range than the structure element Bi and a change in the density (or a change in the luminance) is large (for example, a skeleton pattern in the image represented by the original image signal Sorg). Therefore, the extracted image portion (for example, the skeleton pattern) can be efficiently processed with the emphasis processing.

FIG. 23 shows an example of the skeleton processing carried out with Formula (34). As illustrated in FIG. 23, a calculation is made to find a difference signal between a signal representing an image, which has been obtained by carrying out the erosion processing on an original image X with a structure element B (in this case, a circular structure having a radius of r), and a signal representing an image, which has been obtained by carrying out the opening processing on the image obtained from the erosion processing. The sum of sets of the difference signals obtained from the λ number of operations (wherein λ=1, 2, . . . , N) represents a skeleton patterns a and b.

By the application of the morphology operation carried out with Formula (35), it is possible to extract, as the morphology signal Smor, a signal representing the picture elements constituting an image portion, in which the value of the original image signal Sorg is smaller than the image signal values representing the surrounding image areas, and at which the image signal fluctuates in a spatially narrower range than the structure element Bi and a change in the density (or a change in the luminance) is large (for example, a skeleton pattern in the image represented by the original image signal Sorg). Therefore, the extracted image portion (for example, the skeleton pattern) can be efficiently processed with the emphasis processing. This also applies to the image processing methods and apparatuses, which will be described later.

The morphology operation carried out with Formula (34) or (35) is ordinarily referred to as the skeleton processing. With the skeleton processing, particularly in cases where it is applied to an image signal representing a bone trabecula pattern in an image, only the skeleton element can be selectively and efficiently emphasized.

The present invention further provides a tenth image processing method comprising the steps of:

i) carrying out a morphology operation on an original image signal Sorg, which represents an image, by using a structure element Bi and a scale factor λ, a morphology signal Smor being thereby obtained, the morphology signal Smor representing whether each of picture elements constituting the image is or is not the one corresponding to an image portion, at which the original image signal Sorg fluctuates in a spatially narrower range than the structure element Bi, and/or an image portion, at which a change in the original image signal Sorg is sharp, ii) dividing the original image signal Sorg into frequency components $S_n$ falling within a plurality of different frequency bands, iii) carrying out a first image emphasis processing with Formula (27)

$$S'=Sorg+\Sigma\{\alpha m_n(Smor) \times S_n\} \qquad (27)$$

on the original image signal Sorg by using a plurality of different emphasis coefficients $\alpha m_n(Smor)$ corresponding respectively to the different frequency bands, within which the frequency components $S_n$ fall, a first processed image signal S' being thereby obtained, and iv) carrying out a second image emphasis processing with Formula (25) shown above on the first processed image signal S' by using an emphasis coefficient β(S'), which is in accordance with the first processed image signal S', a second processed image signal Sproc being thereby obtained, or iv') carrying out a second image emphasis processing with Formula (26) shown above on the first processed image signal S' by using an emphasis coefficient β(S'us), which is in accordance with an unsharp mask signal S'us having been calculated from the first processed image signal S', a second processed image signal Sproc being thereby obtained.

The subscript "n" used for the frequency components $S_n$ and the emphasis coefficients $\alpha m_n(Smor)$ corresponds to the number of the different frequency bands, within which the frequency components $S_n$ fall.

The present invention still further provides an eleventh image processing method comprising the steps of:

i) carrying out morphology operations on an original image signal Sorg, which represents an image, by using a plurality of kinds of structure elements $Bi_n$, which have different sizes and/or different shapes, and a scale factor λ, a plurality of morphology signals $Smor_n$ being thereby obtained, each of the morphology signals $Smor_n$ representing whether each of picture elements constituting the image is or is not the one corresponding to an image portion, at which the original image signal Sorg fluctuates in a spatially narrower range than the corresponding one of the structure elements $Bi_n$, and/or an image portion, at which a change in the original image signal Sorg is sharp, ii) dividing the original image signal Sorg into frequency components $S_n$ falling within a plurality of different frequency bands, iii) carrying out a first image emphasis processing with Formula (28)

$$S'=Sorg+\Sigma\{\alpha m(Smor_n) \times S_n\} \qquad (28)$$

on the original image signal Sorg by using emphasis coefficients $\alpha m(Smor_n)$, each of which is in accordance with one of the morphology signals $Smor_n$, a first processed image signal S' being thereby obtained, iv) calculating an unsharp mask signal S'us, which corresponds to a predetermined frequency, from the first processed image signal S', and v) carrying out a second image emphasis processing with Formula (25) shown above on the first processed image signal S' by using an emphasis coefficient β(S'), which is in accordance with the first processed image signal S', a second processed image signal Sproc being thereby obtained, or v') carrying out a second image emphasis processing with Formula (26) shown above on the first processed image signal S' by using an emphasis coefficient β(S'us), which is in accordance with the unsharp mask signal S'us having been calculated from the first processed image signal S', a second processed image signal Sproc being thereby obtained.

The subscript "n" used for the structure elements $Bi_n$ and the morphology signals $Smor_n$ corresponds to the number of the different frequency bands, within which the frequency components $S_n$ fall.

The present invention also provides a twelfth image processing method comprising the steps of:

i) carrying out morphology operations on an original image signal Sorg, which represents an image, by using a plurality of kinds of structure elements $Bi_n$, which have different sizes and/or different shapes, and a scale factor λ, a plurality of morphology signals $Smor_n$ being thereby obtained, each of the morphology signals $Smor_n$ representing whether each of picture elements constituting the image is or is not the one corresponding to an image portion, at which the original image signal Sorg fluctuates in a spatially narrower range than the corresponding one of the structure elements $Bi_n$, and/or an image portion, at which a change in the original image signal Sorg is sharp, ii) dividing the original image signal Sorg into frequency components $S_n$ falling within a plurality of different frequency bands, iii) carrying out a first image emphasis processing with Formula (29)

$$S'=Sorg+\Sigma\{\alpha m_n(Smor_n) \times S_n\} \quad (29)$$

on the original image signal Sorg by using a plurality of different emphasis coefficients $\alpha m_n(Smor_n)$ corresponding respectively to the different frequency bands, within which the frequency components $S_n$ fall, the different emphasis coefficients being respectively in accordance with the morphology signals $Smor_n$, a first processed image signal S' being thereby obtained, and iv) carrying out a second image emphasis processing with Formula (25) shown above on the first processed image signal S' by using an emphasis coefficient β(S'), which is in accordance with the first processed image signal S', a second processed image signal Sproc being thereby obtained, or iv') carrying out a second image emphasis processing with Formula (26) shown above on the first processed image signal S' by using an emphasis coefficient β(S'us), which is in accordance with an unsharp mask signal S'us having been calculated from the first processed image signal S', a second processed image signal Sproc being thereby obtained.

The present invention further provides a fourth image processing apparatus comprising:

i) a morphology signal operation means for carrying out a morphology operation on an original image signal Sorg, which represents an image, by using a structure element Bi and a scale factor λ, a morphology signal Smor being thereby obtained, the morphology signal Smor representing whether each of picture elements constituting the image is or is not the one corresponding to an image portion, at which the original image signal Sorg fluctuates in a spatially narrower range than the structure element Bi, and/or an image portion, at which a change in the original image signal Sorg is sharp, ii) a first image emphasis means for carrying out first image emphasis processing on the original image signal Sorg and in accordance with the morphology signal Smor such that the image portion may be emphasized, a first processed image signal S' being thereby obtained, and iii) a second image emphasis means for carrying out second image emphasis processing on the first processed image signal S' and in accordance with the first processed image signal S' such that an image portion, which corresponds to a desired frequency band among the frequency bands of the first processed image signal S', may be emphasized.

The present invention still further provides a fifth image processing apparatus comprising:

i) a morphology signal operation means for carrying out a morphology operation on an original image signal Sorg, which represents an image, by using a structure element Bi and a scale factor λ, a morphology signal Smor being thereby obtained, the morphology signal Smor representing whether each of picture elements constituting the image is or is not the one corresponding to an image portion, at which the original image signal Sorg fluctuates in a spatially narrower range than the structure element Bi, and/or an image portion, at which a change in the original image signal Sorg is sharp, ii) a first unsharp mask signal operation means for calculating an unsharp mask signal Sus, which corresponds to a first predetermined frequency, from the original image signal Sorg, iii) a first conversion table for receiving the morphology signal Smor and feeding out an emphasis coefficient αm(Smor), which is in accordance with the morphology signal Smor, iv) a first image emphasis means for carrying out a first image emphasis processing with Formula (24) shown above on the original image signal Sorg by using the emphasis coefficient αm(Smor), which is received from the first conversion table, a first processed image signal S' being thereby obtained, v) a second unsharp mask signal operation means for calculating an unsharp mask signal S's, which corresponds to a second predetermined frequency, from the first processed image signal S', and vi) a second conversion table for receiving the first processed image signal S' and feeding out an emphasis coefficient β(S'), which is in accordance with the first processed image signal S', and a second image emphasis means for carrying out a second image emphasis processing with Formula (25) shown above on the first processed image signal S' by using the emphasis coefficient β(S'), which is received from the second conversion table, a second processed image signal Sproc being thereby obtained, or vi') a second conversion table for receiving the unsharp mask signal S'us and feeding out an emphasis coefficient β(S'us), which is in accordance with the unsharp mask signal S'us, and a second image emphasis means for carrying out a second image emphasis processing with Formula P8'4 26) shown above on the first processed image signal S' by using the emphasis coefficient β(S'us), which is received from the second conversion table, a second processed image signal Sproc being thereby obtained.

The present invention also provides a sixth image processing apparatus comprising:

i) a morphology signal operation means for carrying out a morphology operation on an original image signal Sorg, which represents an image, by using a structure element Bi and a scale factor λ, a morphology signal Smor being thereby obtained, the morphology signal Smor representing whether each of picture elements constituting the image is or is not the one corresponding to an image portion, at which the original image signal Sorg fluctuates in a spatially narrower range than the structure element Bi, and/or an image portion, at which a change in the original image signal Sorg is sharp, ii) a frequency band dividing means for dividing the original image signal Sorg into frequency components $S_n$ falling within a plurality of different frequency bands, iii) a plurality of different first conversion tables for receiving the morphology signal Smor and feeding out a plurality of different emphasis coefficients $\alpha m_n$(Smor) corresponding respectively to the different frequency bands, within which the frequency components $S_n$ fall, iv) a first image emphasis means for carrying out a first image emphasis processing with Formula (27) shown above on the original image signal Sorg by using the plurality of the different emphasis coefficients $\alpha m_n$(Smor), which are received from the plurality of the different first conversion tables, a first processed image signal S' being thereby obtained, v) an unsharp mask signal operation means for calculating an unsharp mask signal S'us, which corresponds to a predetermined frequency, from the first processed image signal S', and vi) a second conversion table for receiving the first processed image signal S' and feeding out an emphasis coefficient β(S'), which is in accordance with the first processed image signal S', and a second image emphasis means for carrying out a second image emphasis processing with Formula (25) shown above on the first processed image signal S' by using the emphasis coefficient β(S'), which is received from the second conversion table, a second processed image signal Sproc being thereby obtained, or vi') a second conversion table for receiving the unsharp mask signal S'us and feeding out an emphasis coefficient β(S'us), which is in accordance with the unsharp mask signal S'us, and a second image emphasis means for carrying out a second image emphasis processing with Formula (26) shown above on the first processed image signal S' by using the emphasis coefficient β(S'us), which is received from the second conversion table, a second processed image signal Sproc being thereby obtained.

The present invention further provides a seventh image processing apparatus comprising:

i) a plurality of morphology signal operation means for carrying out morphology operations on an original image signal Sorg, which represents an image, by using a plurality of kinds of structure elements $Bi_n$, which have different sizes and/or different shapes, and a scale factor λ, a plurality of morphology signals $Smor_n$ being thereby obtained, each of the morphology signals $Smor_n$ representing whether each of picture elements constituting the image is or is not the one corresponding to an image portion, at which the original image signal Sorg fluctuates in a spatially narrower range than the corresponding one of the structure elements $Bi_n$, and/or an image portion, at which a change in the original image signal Sorg is sharp, ii) a frequency band dividing means for dividing the original image signal Sorg into frequency components $S_n$ falling within a plurality of different frequency bands, iii) a first conversion table for receiving the morphology signal $Smor_n$ and feeding out a plurality of emphasis coefficients $αm(Smor_n)$, each of which is in accordance with one of the morphology signals $Smor_n$, iv) a first image emphasis means for carrying out a first image emphasis processing with Formula (28) shown above on the original image signal Sorg by using the emphasis coefficients $αm(Smor_n)$, which are received from the first conversion table, a first processed image signal S' being thereby obtained, v) an unsharp mask signal operation means for calculating an unsharp mask signal S'us, which corresponds to a predetermined frequency, from the first processed image signal S', and vi) a second conversion table for receiving the first processed image signal S' and feeding out an emphasis coefficient β(S'), which is in accordance with the first processed image signal S', and a second image emphasis means for carrying out a second image emphasis processing with Formula (25) shown above on the first processed image signal S' by using the emphasis coefficient β(S'), which is received from the second conversion table, a second processed image signal Sproc being thereby obtained, or vi') a second conversion table for receiving the unsharp mask signal S'us and feeding out an emphasis coefficient β(S'us), which is in accordance with the unsharp mask signal S'us, and a second image emphasis means for carrying out a second image emphasis processing with Formula (26) shown above on the first processed image signal S' by using the emphasis coefficient β(S'us), which is received from the second conversion table, a second processed image signal Sproc being thereby obtained.

The present invention still further provides an eighth image processing apparatus comprising:

i) a plurality of morphology signal operation means for carrying out morphology operations on an original image signal Sorg, which represents an image, by using a plurality of kinds of structure elements $Bi_n$, which have different sizes and/or different shapes, and a scale factor λ, a plurality of morphology signals $Smor_n$ being thereby obtained, each of the morphology signals $Smor_n$ representing whether each of picture elements constituting the image is or is not the one corresponding to an image portion, at which the original image signal Sorg fluctuates in a spatially narrower range than the corresponding one of the structure elements $Bi_n$, and/or an image portion, at which a change in the original image signal Sorg is sharp, ii) a frequency band dividing means for dividing the original image signal Sorg into frequency components $S_n$ falling within a plurality of different frequency bands, iii) a plurality of different first conversion tables for receiving the morphology signals $Smor_n$ and feeding out a plurality of different emphasis coefficients $αm_n(Smor_n)$ corresponding respectively to the different frequency bands, within which the frequency components $S_n$ fall, the different emphasis coefficients being respectively in accordance with the morphology signals $Smor_n$, iv) a first image emphasis means for carrying out a first image emphasis processing with Formula (29) shown above on the original image signal Sorg by using the plurality of the different emphasis coefficients $αm_n(Smor_n)$, which are received from the plurality of the different first conversion tables, a first processed image signal S' being thereby obtained, v) an unsharp mask signal operation means for calculating an unsharp mask signal S'us, which corresponds to a predetermined frequency, from the first processed image signal S', and vi) a second conversion table for receiving the first processed image signal S' and feeding out an emphasis coefficient β(S'), which is in accordance with the first processed image signal S', and a second image emphasis means for carrying out a second image emphasis processing with Formula (25) shown above on the first processed image signal S' by using the emphasis coefficient β(S'), which is received from the second conversion table, a second processed image signal Sproc being thereby obtained, or vi') a second conversion table for receiving the unsharp mask signal S'us and feeding out an emphasis coefficient β(S'us), which is in accordance with the unsharp mask signal S'us, and a second image emphasis means for carrying out a second image emphasis processing with Formula (26) shown above on the first processed image signal S' by using the emphasis coefficient β(S'us), which is received from the second conversion table, a second processed image signal Sproc being thereby obtained.

The structure element Bi, wherein i=1, 2, . . . , M, is a set of M number of structure elements B, which extend in different directions in a two-dimensional plane. In cases where M=1, the structure element Bi is a bisymmetric element. In the eighth to twelfth image processing methods and the fourth to eighth image processing apparatuses in accordance with the present invention, the set of structure elements is referred to as the structure element Bi, including the cases where i≧2 and the cases where i=1. Also, the scale factor λ represents the number of the operations for finding the Minkowski sum and the operations for finding the Minkowski difference. As the number of the operations becomes large, the extent of smoothing becomes higher.

With the first image processing method in accordance with the present invention, wherein the operation of the iris filter is carried out on the original image signal Dorg, which represents an image, only the image signal representing the image portion, which is associated with a high degree of centralization of gradients of the original image signal Dorg, can be extracted from the original image signal Dorg. The extracted image signal is emphasized with the predetermined emphasis coefficient α, and the value thus obtained is added to the original image signal Dorg. In this manner, only the image portion, which is represented by the extracted image signal, can be emphasized selectively and efficiently.

With the second image processing method in accordance with the present invention, the operation of the iris filter f(Dorg) is carried out on the original image signal Dorg, which represents an image, and the degree of centralization of gradients of the original image signal Dorg with respect to a picture element is thereby calculated, each of picture elements constituting the image being taken as the picture element. The image portion, which is associated with a high degree of centralization, (for example, a region such as a tumor pattern) in the image is detected in accordance with the calculated degree of centralization. Also, the iris filter signal Giris is obtained, which represents whether each of the picture elements constituting the image is or is not the one corresponding to (i.e. constituting) the image portion associated with a high degree of centralization.

Further, by the calculation of the second term of Formula (1), the super-low frequency components Dus of the original image signal Dorg are subtracted from the original image signal Dorg. Therefore, comparatively high frequency components (i.e., the components other than the super-low frequency components) can be extracted selectively from the original image signal Dorg. The comparatively high frequency components having thus been extracted also contain radiation noise, which is composed of high frequency components.

However, as represented by Formula (1), the comparatively high frequency components (Dorg−Dus) are emphasized with the emphasis coefficient β(Giris). The emphasis coefficient β(Giris) is in accordance with the iris filter signal Giris representing whether each of the picture elements constituting the image is or is not the one constituting the specific image portion (such as the tumor pattern), which is associated with a high degree of centralization of gradients of the image signal and is obtained from the operation of the iris filter. Therefore, even if unnecessary components, such as quantum noise, are contained in the high frequency components (Dorg−Dus), in cases where the picture element is not the one constituting the image portion, such as the tumor pattern, the value of β(Giris) with respect to the picture element will be small, and the degree of emphasis with respect to the picture element will be kept low.

In cases where the picture element is the one constituting the image portion, such as the tumor pattern, the value of β(Giris) with respect to the picture element is large, and therefore the degree of emphasis with respect to the picture element is kept high.

Therefore, regardless of whether radiation noise is or is not contained in the high frequency components (Dorg−Dus) of the image, the specific image portion, such as the tumor pattern, can be selectively emphasized with the function β(Giris), which has a value in accordance with whether the image area is or is not the specific image portion, such as the tumor pattern.

With the second image processing method in accordance with the present invention, the image portion to be subjected to the image emphasis processing is not limited to the tumor pattern, in which the density value is smaller than the density values of the surrounding areas. For example, a pattern, in which the density value is larger than the density values of the surrounding areas and the density gradients are centralized, can also be selectively subjected to the image emphasis processing. Therefore, the second image processing method in accordance with the present invention is applicable to the high density-high signal level type of image signal and the high luminance-high signal level type of image signal.

With the third image processing method in accordance with the present invention, wherein the morphology operation is carried out on the original image signal Dorg, which represents an image, by using the multiply structure element Bi and the scale factor λ, only the image signal representing the specific image portion, at which the original image signal Dorg fluctuates in a spatially narrower range than the multiply structure element Bi, can be extracted from the original image signal Dorg. In accordance with the morphology signal Dmor obtained from the morphology operation, the image emphasis processing is carried out on the original image signal Dorg. Therefore, even if unnecessary components, such as high frequency noise, have been superposed upon the original image signal Dorg, only the image portion, which is represented by the extracted image signal, can be emphasized selectively.

Specifically, the morphology signal Dmor takes a large value with respect to the picture element constituting the specific image portion, at which the image signal fluctuates in a spatially narrower range than the multiply structure element Bi. Also, the morphology signal Dmor takes a small value or a value of zero with respect to picture elements other than the picture element constituting the specific image portion. Therefore, by the carrying out of the image emphasis processing in accordance with the morphology signal Dmor, the degree of emphasis becomes high with respect to the specific image portion and becomes low with respect to the image portions other than the specific image portion.

In the third image processing method in accordance with the present invention, as the function f(Dmor) in accordance with the morphology signal Dmor, as represented by Formula (4), the unsharp mask signal corresponding to the super-low frequency of the morphology signal Dmor may be utilized. In such cases, as illustrated in FIG. 20A, the morphology signal Dmor, which has sharp pulsed characteristics, is converted to a signal representing the arithmetic mean value of the morphology signal values with respect to the picture elements surrounding the picture element, that is associated with the morphology signal Dmor. Therefore, the pulsed characteristics of the morphology signal Dmor become unsharp. As a result, a processed image signal Dproc in accordance with the function f(Dmor) can be obtained such that it may represent an image, in which the occurrence of an artifact at an image area (i.e., the boundary area) connecting the specific image portion (at which the image signal fluctuates in a spatially narrower range than the size of the multiply structure element Bi) and the other portions with each other, has been reduced and which gives a natural feeling.

An example of the morphology operation, which is carried out with Formula (8), will hereinbelow be described in detail. As an aid in facilitating the explanation, the scale factor $\lambda$ and the number of the structure elements constituting the multiply structure element Bi are set such that $\lambda=1$ and i=1.

Specifically, the morphology operation is carried out on the density value Dorg, which is represented by the high density-high signal level type of image signal. With the morphology operation, the operation for finding the Minkowski sum (Dorg⊕B) is carried out on the image signal, which has a distribution of the density value Dorg indicated by, for example, the solid line in FIG. 17A, by using a linear structure element B, which is constituted of three picture elements and is shown in FIG. 17B. As a result, a density value $D_i$ of a certain picture element of interest is converted into $D_i'$, which takes the maximum value $D_{i+1}$ of the values of the three adjacent picture elements (determined by the structure element B) having their center at the picture element of interest. The operation is carried out for all of the picture elements constituting the image, each of them being taken as the picture element of interest. In this manner, the image signal having the distribution of the density value Dorg indicated by the solid line in FIG. 17A is converted into the image signal having the distribution indicated by the broken line in FIG. 17A.

Thereafter, the operation for finding the Minkowski difference {(Dorg⊕B)⊖B} is carried out on the density value (Dorg⊕B), which has been obtained from the operation for finding the Minkowski sum, by using the structure element B. As a result, the density value $D_i'$ of the picture element of interest indicated by the broken line in FIG. 17A is converted into $D_i''$ (=$D_i$), which takes the minimum value $D_{i-1}'$ of the values of the three adjacent picture elements having their center at the picture element of interest. The operation is carried out for all of the picture elements constituting the image, each of them being taken as the picture element of interest. In this manner, the image signal having the distribution indicated by the broken line in FIG. 17A is converted into the image signal having the distribution of the density value Dorg" indicated by the chained line in FIG. 17A. The image signal indicated by the chained line in FIG. 17A has the distribution such that the image portion corresponding to the signal change portion, at which the original image signal Dorg fluctuates in a spatially narrower range than the size of the structure element B, has been eliminated, and such that the image portion corresponding to the signal change portion, at which the original image signal Dorg fluctuates in a spatially wider range than the size of the structure element B, and the image portion, at which the original image signal Dorg does not fluctuates, are kept in the original forms. More specifically, the aforesaid processing (i.e., the closing operation) serves as the processing for smoothing the image density distribution from the high density side.

The value {(Dorg⊕B)⊖B} is thus obtained from the closing operation, in which the operation for finding the Minkowski sum is carried out on the original image signal Dorg and the operation for finding the Minkowski difference is then carried out. Thereafter, the obtained value {(Dorg⊕B)⊖B} is subtracted from the original image signal Dorg, and a value Dmor is thereby obtained. The thus obtained value Dmor represents the image portion corresponding to the signal change portion, at which the signal value fluctuates in a spatially narrower range than the size of the structure element B and which has been eliminated by the aforesaid closing operation.

Fundamentally, an image signal represents spatial coordinates (x, y), which constitute a two-dimensional element, and a signal value f(x, y), which constitutes a third dimensional element. However, in the foregoing, as an aid in facilitating the understanding, the morphology operation is described with respect to the one-dimensional image signal distribution curve, which appears in a predetermined cross section of the image expanded in the two-dimensional plane.

Therefore, actually, in the third image processing method in accordance with the present invention and those that follow, the foregoing explanation is extended and applied to a two-dimensional image. Also, the term "multiply structure element Bi" as used herein means a set of the i number of structure elements B, which are prepared as the structure elements B extending in different directions in the two-dimensional plane in cases where the morphology operation in the cross section of the image is extended and applied to the two-dimensional plane.

As a result of the closing operation carried out with all of the structure elements B constituting the multiply structure element Bi, an image portion may be found, which extends in the same direction as the direction of a structure element B and at which the signal value fluctuates in a spatially wider range than the size of the structure element B. As for such an image portion, the value of the second term [min{(Dorg⊕$\lambda$Bi)⊖$\lambda$Bi}] of Formula (8) becomes equal to Dorg, and therefore the value of Dmor becomes equal to zero. Accordingly, the image portion is not emphasized.

The scale factor $\lambda$ represents the number of the operations for finding the Minkowski sum and the operations for finding the Minkowski difference. As the number of the operations becomes large, the extent of smoothing becomes higher. (Ordinarily, it is sufficient for the scale factor $\lambda$ to be equal to 1.)

FIGS. 18A and 18B show the results of the comparison of the image emphasis processing, which utilizes the morphology operation and is carried out with the third image processing method in accordance with the present invention, and the image emphasis processing, which utilizes the conventional unsharp mask processing.

In cases where the morphology operation is carried out with Formula (7) or Formula (7'), an image portion, in which the value of the original image signal Dorg is larger than the image signal values representing the surrounding image areas, can be extracted, and the extracted image portion can be selectively subjected to the image emphasis processing. In cases where the morphology operation is carried out with Formula (8) or Formula (8'), an image portion, in which the value of the original image signal Dorg is smaller than the image signal values representing the surrounding image areas, can be extracted, and the extracted image portion can be selectively subjected to the image emphasis processing. Particularly, in cases where the operation is carried out with Formula (7') [or with Formula (8')], as illustrated in FIG. 20B, the entire area of the image portion can be emphasized. Or, as illustrated in FIG. 20C, the edges of the concave part of the image portion [as for Formula (8'), the edge of the convex part of the image portion] can be emphasized.

With the fourth image processing method in accordance with the present invention, the morphology operation is carried out on the original image signal Dorg, which represents an image, by using the multiply structure element Bi and the scale factor λ, and the morphology signal Dmor is thereby obtained. The morphology signal Dmor represents whether each of picture elements constituting the image is or is not the one corresponding to the image portion, at which the original image signal Dorg fluctuates in a spatially narrower range than the multiply structure element Bi.

Further, by the calculation of the second term of Formula (9), the super-low frequency components Dus of the original image signal Dorg are subtracted from the original image signal Dorg. Therefore, comparatively high frequency components (i.e., the components other than the super-low frequency components) can be extracted selectively from the original image signal Dorg. The comparatively high frequency components having thus been extracted also contain radiation noise, which is composed of high frequency components.

However, as represented by Formula (9), the comparatively high frequency components (Dorg−Dus) are emphasized with the emphasis coefficient β(Dmor). The emphasis coefficient β(Dmor) is in accordance with the morphology signal Dmor representing whether each of picture elements constituting the image is or is not the one constituting the specific image portion (such as the calcified pattern), at which the original image signal Dorg fluctuates in a spatially narrower range than the multiply structure element Bi and which is obtained from the morphology operation. Therefore, even if unnecessary components, such as quantum noise, are contained in the high frequency components (Dorg−Dus), in cases where the picture element is not the one constituting the image portion, such as the calcified pattern, the value of β (Dmor) with respect to the picture element will be small, and the degree of emphasis with respect to the picture element will be kept low.

In cases where the picture element is the one constituting the image portion, such as the calcified pattern, the value of β(Dmor) with respect to the picture element is large, and therefore the degree of emphasis with respect to the picture element is kept high.

Therefore, regardless of whether radiation noise is or is not contained in the high frequency components (Dorg−Dus) of the image, the specific image portion, such as the calcified pattern, can be selectively emphasized with the function β(Dmor), which has a value in accordance with whether the image area is or is not the specific image portion, such as the calcified pattern.

Furthermore, with the fourth image processing method in accordance with the present invention, the specific image portion is emphasized regardless of the magnitude of a density change. Therefore, undershooting and overshooting can be restricted, and the occurrence of an artifact can be reduced. Moreover, in lieu of the processing for calculating the variance value of the image signal, the processing for calculating the maximum value or the minimum value is carried out. Therefore, the operation time required to carry out the calculation processing can be kept short.

FIGS. 25A and 25B show the results of the comparison of the image emphasis processing, which utilizes the morphology operation and is carried out with the fourth image processing method in accordance with the present invention, and the image emphasis processing, which utilizes the conventional unsharp mask processing.

With the fifth image processing method and the first image processing apparatus in accordance with the present invention, the frequency components (ordinarily, super-low frequency components) Sus, which correspond to predetermined frequency, are subtracted from the original image signal Sorg, which represents an image. In this manner, only the comparatively high frequency components (i.e., the difference signal) Ssp, which are other than the frequency components not higher than the predetermined frequency, can be extracted selectively from the original image signal Sorg. The comparatively high frequency components Ssp having thus been extracted also contain radiation noise, which is composed of high frequency components.

The morphology operation is then carried out on the comparatively high frequency components Ssp by using the structure element Bi and the scale factor λ, and the morphology signal Smor is thereby obtained. The morphology signal Smor represents a characteristic output with respect to the characteristic image portion, at which the signal fluctuates in a spatially narrower range than the structure element Bi, and/or the characteristic image portion (such as an image edge portion), at which a change in the signal value is sharp. The characteristic image portion also contains radiation noise. However, the morphology signal Smor takes a small value with respect to radiation noise. With respect to the characteristic image portion other than radiation noise, the morphology signal Smor takes a value larger than the value for radiation noise. Therefore, in accordance with the morphology signal Smor, radiation noise can be separated from the characteristic image portion.

Thereafter, in accordance with the morphology signal Smor, the image emphasis processing is carried out on the comparatively high frequency components Ssp. As a result, the characteristic image portion other than radiation noise is emphasized strongly, and the other image portion containing radiation noise is not emphasized. In this manner, the characteristic image portion can be emphasized selectively.

As described above, with the fifth image processing method and the first image processing apparatus in accordance with the present invention, unnecessary components, such as noise components, are not emphasized, and only the specific image portion, which is to be used, can be emphasized efficiently. Also, the occurrence of an artifact as in the image emphasis processing depending upon variance values can be restricted.

Further, with the morphology operation, in lieu of the processing for calculating the variance value of the image signal, the processing for calculating the maximum value or the minimum value is carried out. Therefore, the operation time required to carry out the calculation processing can be kept short.

In cases where the morphology operation carried out with Formula (16) or Formula (17) is employed, the effects described below can further be obtained. Specifically, in an example illustrated in FIG. 31A, the characteristic image portion to be emphasized (i.e., the downwardly convex "signal region" in FIG. 31A) is located in an image portion having uniform density. In such cases, when the dilation processing, which is represented by the second term in Formula (16), is carried out on the original image signal Sorg, the dilation signal Sdi obtained from the dilation processing coincides approximately with the original image signal Sorg, which corresponds to the image portions surrounding the aforesaid "signal region." As a result, the difference between the dilation signal Sdi and the original image signal Sorg takes a value other than zero only for the aforesaid "signal region." In other words, the morphology signal Smor calculated with Formula (16) takes a predetermined value only for the aforesaid "signal region," and takes a value of approximately zero for the other surrounding portions.

In an example illustrated in FIG. 31B, the downwardly convex "signal region" is located in an image portion having a gentle density gradient. In such cases, when the dilation processing, which is represented by the second term in Formula (16), is carried out on the original image signal Sorg, the dilation signal Sdi obtained from the dilation processing has a pattern obtained by translating the pattern of the original image signal Sorg, which corresponds to the image portions surrounding the aforesaid "signal region," in parallel toward the larger signal value side. As a result, the difference between the dilation signal Sdi and the original image signal Sorg takes a value other than zero also for the surrounding image portions other than the aforesaid "signal region." Therefore, the morphology signal Smor calculated with Formula (16) takes a large value with respect to the entire image area. Accordingly, if the image emphasis processing in accordance with the morphology signal Smor is carried out, there is the risk that the emphasis becomes excessive.

However, with the fifth image processing method and the first image processing apparatus in accordance with the present invention, the morphology operation is not carried out directly on the original image signal Sorg and is carried out on the high frequency components Ssp, which constitute the difference signal between the original image signal Sorg and the unsharp mask signal Sus. Therefore, as for the gentle density gradient shown in FIG. 31B, the value of the morphology signal Smor obtained from the morphology operation becomes approximately equal to zero. Accordingly, the emphasis can be prevented from becoming excessive. This also applies to the erosion processing represented by Formula (17).

The effects of the fifth image processing method and the first image processing apparatus in accordance with the present invention will be described hereinbelow with reference to FIGS. 32A and 32B. Specifically, from the original image signal Sorg illustrated in FIG. 32A, the high frequency components are separated in accordance with the size of the unsharp mask. Of the separated high frequency components, only the signal components are emphasized selectively with the emphasis coefficient β(Smor). In this manner, as illustrated in FIG. 32B, the processed image signal Sproc, in which only the signal components have been emphasized, is obtained.

FIG. 33A shows the processed image signal Sproc, which is obtained from the conventional image emphasis processing. FIG. 33B shows the processed image signal Sproc, which is obtained from the image emphasis processing carried out with the fifth image processing method in accordance with the present invention. As understood from FIGS. 33A and 33B, with the image emphasis processing carried out with the fifth image processing method in accordance with the present invention, overshooting and undershooting can be restricted, and only the desired signal can be emphasized selectively and efficiently.

With the sixth image processing method and the second image processing apparatus in accordance with the present invention, the morphology operation is carried out on the original image signal Sorg, which represents an image, by using the structure element Bi and the scale factor λ. In this manner, it is possible to extract only the image portion, at which the original image signal Sorg fluctuates in a spatially narrower range than the structure element Bi, and/or the image portion, at which a change in the original image signal Sorg is sharp. The thus extracted image portion contains the desired image portion and grainy components, such as radiation noise, which are high frequency components.

However, the morphology signal Smor takes a small value with respect to radiation noise. With respect to the desired image portion, the morphology signal Smor takes a value larger than the value for radiation noise.

Also, the original image signal Sorg is divided into frequency components $S_n$ falling within a plurality of (e.g., n number of) different frequency bands.

Further, the emphasis coefficients $\alpha m_n(Smor)$ in accordance with the morphology signal Smor are calculated with, for example, a plurality of conversion tables corresponding to the plurality of different frequency bands, to which the original image signal Sorg has been divided. The image emphasis processing is then carried out on the frequency components, which fall within each of the frequency bands divided from one another, with the corresponding one of the emphasis coefficients $\alpha m_n(Smor)$ The image emphasis processing need not necessarily be carried out with respect to all of the frequency bands having been divided from one another and may be carried out with respect to only a frequency band corresponding to a desired image portion.

As described above, with the sixth image processing method in accordance with the present invention, the image emphasis processing in accordance with the morphology signal Smor is carried out on the frequency components of the original image signal Sorg, which fall within at least a single frequency band among the plurality of the different frequency bands. In this manner, the unnecessary components, such as grainy components, are not emphasized, and only the image portion to be emphasized, which is contained in the frequency band, can be emphasized. Also, the occurrence of an artifact as in the image emphasis processing depending upon variance values can be restricted.

In cases where the emphasis coefficients $\alpha m_n(Smor)$ are set such that they may vary for different frequency bands, the degree of emphasis of each frequency band can be altered, and fine image emphasis processing can thus be carried out.

Such effects are illustrated in FIGS. 39A and 39B. Specifically, as illustrated in FIG. 39A, the unsharp mask processing is carried out on the original image signal Sorg, and the original image signal Sorg is thereby divided into, for example, the components $S_{LL}$, $S_L$, $S_M$, and $S_H$, which respectively fall within four frequency bands. The components $S_{LL}$, $S_L$, $S_M$, and $S_H$ falling within the respective frequency bands are respectively multiplied by emphasis coefficients $\alpha m_{LL}(Smor)$ (=1; a fixed number), $\alpha m_L(Smor)$ (shown in FIG. 35C), $\alpha m_{LL}(Smor)$, $\alpha m_M(Smor)$ (shown in FIG. 35B), and $\alpha m_H(Smor)$ (shown in FIG. 35C), which take values in accordance with the morphology signal Smor. The image emphasis processing is thus carried out with Formula (22) or Formula (22'). In this manner, as illustrated in FIG. 39B, only the signal components among the respective frequency components are emphasized selectively, and a processed image signal Sproc, in which only the signal components have been emphasized, is obtained.

$$\text{Sproc}=\Sigma\{S_n \times \alpha m_n(Smor)\} \tag{22}$$

wherein $\alpha m_n(Smor)$ represents the emphasis coefficient in accordance with the morphology signal Smor.

$$\text{Sproc}=\text{Sorg}+\Sigma\{S_n \times \alpha m_n(Smor)\} \tag{22'}$$

Furthermore, with the sixth image processing method and the second image processing apparatus in accordance with the present invention, by the morphology operation, in lieu of the processing for calculating the variance value of the image signal, the processing for calculating the maximum value or the minimum value is carried out. Therefore, the operation time required to carry out the calculation processing can be kept short.

With the seventh image processing method and the third image processing apparatus in accordance with the present invention, the sixth image processing method and the second image processing apparatus in accordance with the present invention are modified such that the morphology operations may be carried out with the plurality of the structure elements $Bi_n$ having different sizes. As a result, the plurality of morphology signals $Smor_n$ are obtained.

The plurality of the structure elements $Bi_n$ employed in the morphology operations are set in accordance with the plurality of different frequency bands, in which the frequency components $S_n$ obtained by dividing the original image signal Sorg fall. A smaller structure element is set for a higher frequency band. Also, the emphasis coefficients $\alpha m_n(Smor_n)$ in accordance with the respective morphology signals $Smor_n$ are calculated with, for example, the corresponding conversion tables. The image emphasis processing is then carried out on the frequency components, which fall within each of the frequency bands divided from one another, with the corresponding one of the emphasis coefficients $\alpha m_n(Smor_n)$ The image emphasis processing need not necessarily be carried out with respect to all of the frequency bands having been divided from one another and may be carried out with respect to only a frequency band corresponding to a desired image portion.

As described above, with the seventh image processing method in accordance with the present invention, the image emphasis processing in accordance with the morphology signal $Smor_n$ is carried out on the frequency components of the original image signal Sorg, which fall within at least a single frequency band among the plurality of the different frequency bands. In this manner, with respect to each frequency band, the unnecessary components, such as grainy components, are not emphasized, and only the image portion to be emphasized, which is contained in the frequency band, can be emphasized. Also, the occurrence of an artifact as in the image emphasis processing depending upon variance values can be restricted.

In cases where the emphasis coefficients $\alpha m_n(Smor_n)$ are set such that they may vary for different frequency bands, the degree of emphasis of each frequency band can be altered, and fine image emphasis processing can thus be carried out.

Further, with the seventh image processing method and the third image processing apparatus in accordance with the present invention, by the morphology operations, in lieu of the processing for calculating the variance value of the image signal, the processing for calculating the maximum value or the minimum value is carried out. Therefore, the operation time required to carry out the calculation processing can be kept short.

With the eighth image processing method and the fourth image processing apparatus in accordance with the present invention, the morphology operation is carried out on the original image signal Sorg, which represents an image, by using the structure element Bi and the scale factor λ. In this manner, it is possible to extract only the image portion, at which the original image signal Sorg fluctuates in a spatially narrower range than the structure element Bi, and/or the image portion, at which a change in the original image signal Sorg is sharp. The thus extracted image portion contains the desired image portion and radiation noise, which is composed of high frequency components. However, the morphology signal Smor takes a small value with respect to radiation noise. With respect to the desired image portion, the morphology signal Smor takes a value larger than the value for radiation noise.

Thereafter, the first image emphasis processing is carried out on the original image signal Sorg and in accordance with the morphology signal Smor such that the image portion, at which the original image signal Sorg fluctuates in a spatially narrower range than the structure element Bi, and/or the image portion, at which a change in the original image signal Sorg is sharp, may be emphasized. The first processed image signal S' representing the image, in which the image portion has been emphasized selectively, is thereby obtained. In this manner, the first processed image signal S' is obtained from the image emphasis processing, which depends upon the morphology signal Smor.

Thereafter, the second image emphasis processing is carried out on the first processed image signal S' and in accordance with the first processed image signal S' such that an image portion, which corresponds to a desired frequency band among the frequency bands of the first processed image signal S', may be emphasized. In this manner, the image emphasis processing in accordance with the first processed image signal S', which represents, for example, density values, can be carried out.

In the manner described above, with the eighth image processing method and the fourth image processing apparatus in accordance with the present invention, by the image emphasis processing carried out in accordance with the morphology signal Smor (i.e., the first image emphasis processing), the emphasis of unnecessary radiation noise can be restricted, and only the signal components, i.e., the image portion, at which the original image signal Sorg fluctuates in a spatially narrower range than the structure element Bi, and/or the image portion, at which a change in the original image signal Sorg is sharp, can be emphasized efficiently.

Also, by the image emphasis processing carried out in accordance with the first processed image signal S' (i.e., the second image emphasis processing), the image signal, which falls within a different frequency band and which cannot be emphasized by the first image emphasis processing, can also be emphasized.

As described above, with the eighth image processing method and the fourth image processing apparatus in accordance with the present invention, unnecessary components, such as noise components, are not emphasized, and only the specific image portion, which is to be used, can be emphasized efficiently. Also, by the image emphasis processing carried out on the first processed image signal S' and in accordance with the signal representing the density, or the like, the occurrence of an artifact as in the image emphasis processing depending upon variance values can be restricted.

In cases where the frequency band, for which the first image emphasis processing is carried out, and the frequency band, for which the second image emphasis processing is carried out, are different from each other, the two frequency bands can be emphasized to different extents of emphasis.

Further, with the eighth image processing method and the fourth image processing apparatus in accordance with the present invention, in the morphology operation, in lieu of the processing for calculating the variance value of the image signal, the processing for calculating the maximum value or the minimum value is carried out. Therefore, the operation time required to carry out the calculation processing can be kept short.

With the ninth image processing method and the fifth image processing apparatus in accordance with the present invention, as in the eighth image processing method and the fourth image processing apparatus in accordance with the present invention, the morphology operation is carried out on the original image signal Sorg, which represents an image, by using the structure element Bi and the scale factor λ. In this manner, it is possible to extract only the image portion, at which the original image signal Sorg fluctuates in a spatially narrower range than the structure element Bi, and/or the image portion, at which a change in the original image signal Sorg is sharp.

Thereafter, the super-low frequency components Sus of the original image signal Sorg are subtracted from the original image signal Sorg. In this manner, only the comparatively high frequency components, which are other than the frequency components not higher than the super-low frequency, can be extracted selectively from the original image signal Sorg. The comparatively high frequency components having thus been extracted also contain radiation noise, which is composed of high frequency components.

The value of the emphasis coefficient αm(Smor), which has been set previously in accordance with the morphology signal Smor, is calculated in accordance with the obtained morphology signal Smor. The first image emphasis processing is carried out on the image signal and with the calculated value of the emphasis coefficient αm(Smor).

By way of example, as illustrated in FIG. 41, the emphasis coefficient αm(Smor) in accordance with the morphology signal Smor takes a value of zero with respect to the range, in which the value of the morphology signal Smor is small and which corresponds to radiation noise (grainy region). Also, the emphasis coefficient αm(Smor) takes a large value with respect to the "signal region" shown in FIG. 41, in which the value of the morphology signal Smor is comparatively large and which corresponds to the desired image portion.

The comparatively high frequency components described above are multiplied by the emphasis coefficient αm(Smor), and the obtained product is added to the original image signal Sorg. The calculation is carried out with Formula (24). As a result, the first processed image signal S', in which the comparatively high frequency components have been emphasized, is obtained. The comparatively high frequency components also contain high frequency components which are unnecessary for a diagnosis, or a like, such as radiation noise. However, the emphasis coefficient αm(Smor) corresponding to the unnecessary high frequency components takes a value of zero or a very small value. Therefore, as a result of the multiplication by the emphasis coefficient αm(Smor), the high frequency components which are unnecessary for a diagnosis, or a like, are not emphasized.

The aforesaid effects will be described hereinbelow with reference to FIGS. 49A and 49B. Specifically, from the original image signal Sorg illustrated in FIG. 49A, the frequency components falling within the high frequency band (i.e., the frequency band higher than the cut-off frequency of a low pass filter 1) are separated in accordance with the size of the unsharp mask. Of the separated frequency components, only the signal components are emphasized selectively with the emphasis coefficient αm(Smor). In this manner, as illustrated in FIG. 49B, the first processed image signal S', in which only the signal components have been emphasized, is obtained.

Thereafter, the unsharp mask signal S'us, which corresponds to super-low frequency, is calculated from the first processed image signal S'. The comparatively high frequency components of the first processed image signal S' are multiplied by the emphasis coefficient β(S') shown in, for example, FIG. 42, and the obtained product is added to the first processed image signal S'. The calculation is carried out with Formula (25). As a result, the second processed image signal Sproc, in which the comparatively high frequency components of the first processed image signal S' have been emphasized in accordance with the level of the first processed image signal S', is obtained.

Specifically, from the first processed image signal S' illustrated in FIG. 49B, the frequency components falling within the high frequency band (i.e., the frequency band higher than the cut-off frequency of a low pass filter 2) are separated in accordance with the size of the unsharp mask. The entire image signal falling within the separated high frequency band is emphasized selectively with the emphasis coefficient β(S'). In this manner, as illustrated in FIG. 49C, the second processed image signal Sproc is obtained.

As described above, with the ninth image processing method and the fifth image processing apparatus in accordance with the present invention, unnecessary components, such as noise components, are not emphasized, and only the specific image portion, which is to be used, can be emphasized efficiently. Also, by the image emphasis processing carried out on the first processed image signal S' and in accordance with the signal representing the density, or the like, the occurrence of an artifact as in the image emphasis processing depending upon variance values can be restricted.

In cases where the size of the unsharp mask, which is employed in the unsharp mask processing carried out on the original image signal Sorg, and the size of the unsharp mask, which is employed in the unsharp mask processing carried out on the first processed image signal S', are set to be different from each other, the two frequency bands can be emphasized to different extents of emphasis.

Also, with the ninth image processing method and the fifth image processing apparatus in accordance with the present invention, in the morphology operation, in lieu of the processing for calculating the variance value of the image signal, the processing for calculating the maximum value or the minimum value is carried out. Therefore, the operation time required to carry out the calculation processing can be kept short.

With the tenth image processing method and the sixth image processing apparatus in accordance with the present invention, the eighth and ninth image processing methods and the fourth and fifth image processing apparatuses in accordance with the present invention are modified such that the original image signal Sorg may be divided into the frequency components $S_n$ falling within the plurality of the different frequency bands. The first image emphasis processing is then carried out on the frequency components $S_n$, which fall within each of the frequency bands divided from one another, with the corresponding one of the different emphasis coefficients $αm_n$(Smor). In this manner, with respect to the frequency components $S_n$, which fall within each of the frequency bands divided from one another, the degree of emphasis can be adjusted selectively for a structure having a desired size and a desired shape. Also, the second image emphasis processing in accordance with the signal value (density) is carried out on the first processed image signal S', which has been obtained from the first image emphasis processing, and the second processed image signal Sproc is thereby obtained. In this manner, the occurrence of an artifact as in the image emphasis processing depending upon variance values can be restricted. As for the other effects, the same effects as those obtained with the eighth and ninth image processing methods and the fourth and fifth image processing apparatuses in accordance with the present invention can be obtained.

With the eleventh image processing method and the seventh image processing apparatus in accordance with the present invention, the eighth, ninth, and tenth image processing methods and the fourth, fifth, and sixth image processing apparatuses in accordance with the present invention are modified such that the morphology operations may be carried out on the original image signal Sorg, which represents an image, by using a plurality of kinds of structure elements $Bi_n$, which have different sizes and/or different shapes. The plurality of the morphology signals $Smor_n$ are thereby obtained, each corresponding to the image portion having a desired size and/or a desired shape. The emphasis coefficients α $m(Smor_n)$, each of which is in accordance with one of the morphology signals $Smor_n$, are obtained. Also, by the setting of a plurality of unsharp masks having different sizes corresponding to the structure elements $Bi_n$, the original image signal Sorg is divided into the frequency components $S_n$ falling within the plurality of the different frequency bands. The image signal falling within each frequency band is multiplied by the corresponding one of the emphasis coefficients $αm(Smor_n)$, which are in accordance with the morphology signals $Smor_n$. In this manner, each frequency band is emphasized independently. The total sum of the thus obtained products is added to the original image signal Sorg with Formula (28). As a result, the first processed image signal S' is obtained by altering the degree of emphasis for different frequency bands. The image emphasis processing in accordance with the signal value (density) is carried out with Formula (25) on the first processed image signal S', and the second processed image signal Sproc is thereby obtained.

Therefore, even if a plurality of kinds of desired image portions having different sizes and/or different shapes are to be emphasized, each of the desired image portions can be emphasized to a desired degree of emphasis. Also, as in the eighth, ninth, and tenth image processing methods and the fourth, fifth, and sixth image processing apparatuses in accordance with the present invention, unnecessary components, such as noise components, are not emphasized, and only the specific image portion, which is to be used, can be emphasized efficiently. Also, by the image emphasis processing carried out on the first processed image signal S' and in accordance with the signal representing the density, or the like, the occurrence of an artifact as in the image emphasis processing depending upon variance values can be restricted. Further, in the morphology operation, in lieu of the processing for calculating the variance value of the image signal, the processing for calculating the maximum value or the minimum value is carried out. Therefore, the operation time required to carry out the calculation processing can be kept short.

The twelfth image processing method and the eighth image processing apparatus in accordance with the present invention correspond to the combination of the tenth and eleventh image processing methods in accordance with the present invention and the combination of the sixth and seventh image processing apparatuses in accordance with the present invention. With the twelfth image processing method and the eighth image processing apparatus in accordance with the present invention, the same effects as those obtained with the tenth and eleventh image processing methods and the sixth and seventh image processing apparatuses in accordance with the present invention can be obtained.

BRIEF DESCRIPTION OF THE DRAWINGS

FIG. 10 is a block diagram showing an apparatus for computer aided diagnosis of medical images, in which a third embodiment of the image processing method in accordance with the present invention is employed, FIG. 21 is a block diagram showing an apparatus for computer aided diagnosis of medical images, in which a fourth embodiment of the image processing method in accordance with the present invention is employed, FIG. 24 is a graph showing a function f(Dorg–Dus), which restricts overshooting and undershooting, FIGS. 25A and 25B provide an explanatory view showing the results of comparison of image emphasis processing, which is carried out with the fourth embodiment of the image processing method in accordance with the present invention, and image emphasis processing, which utilizes conventional unsharp mask processing, FIGS. 32A and 32B are graphs showing the effects of the fifth and sixth embodiments of the image processing method in accordance with the present invention, FIG. 33A is an explanatory view showing how a processed image signal is obtained from conventional image emphasis processing, FIG. 33B is an explanatory view showing how a processed image signal is obtained from image emphasis processing carried out with the fifth and sixth embodiments of the image processing method in accordance with the present invention, FIG. 34A is a block diagram showing an apparatus for carrying out a seventh embodiment of the image processing method in accordance with the present invention, and FIG. 34B shows an example of low pass filter, FIG. 36 is a block diagram showing an apparatus for carrying out an eighth embodiment of the image processing method in accordance with the present invention, FIG. 41 is a graph showing a function representing a first conversion table, FIG. 42 is a graph showing a function representing a second conversion table, FIG. 46 is a block diagram showing an apparatus for carrying out a fifteenth embodiment of the image processing method in accordance with the present invention, FIGS. 49A, 49B, and 49C are graphs respectively showing an original image signal, a first processed image signal, and a second processed image signal, the graphs serving as an aid in explaining the effects of the eleventh to seventeenth embodiments of the image processing method in accordance with the present invention.

DESCRIPTION OF THE PREFERRED EMBODIMENTS

The present invention will hereinbelow be described in further detail with reference to the accompanying drawings.

Figure 1:
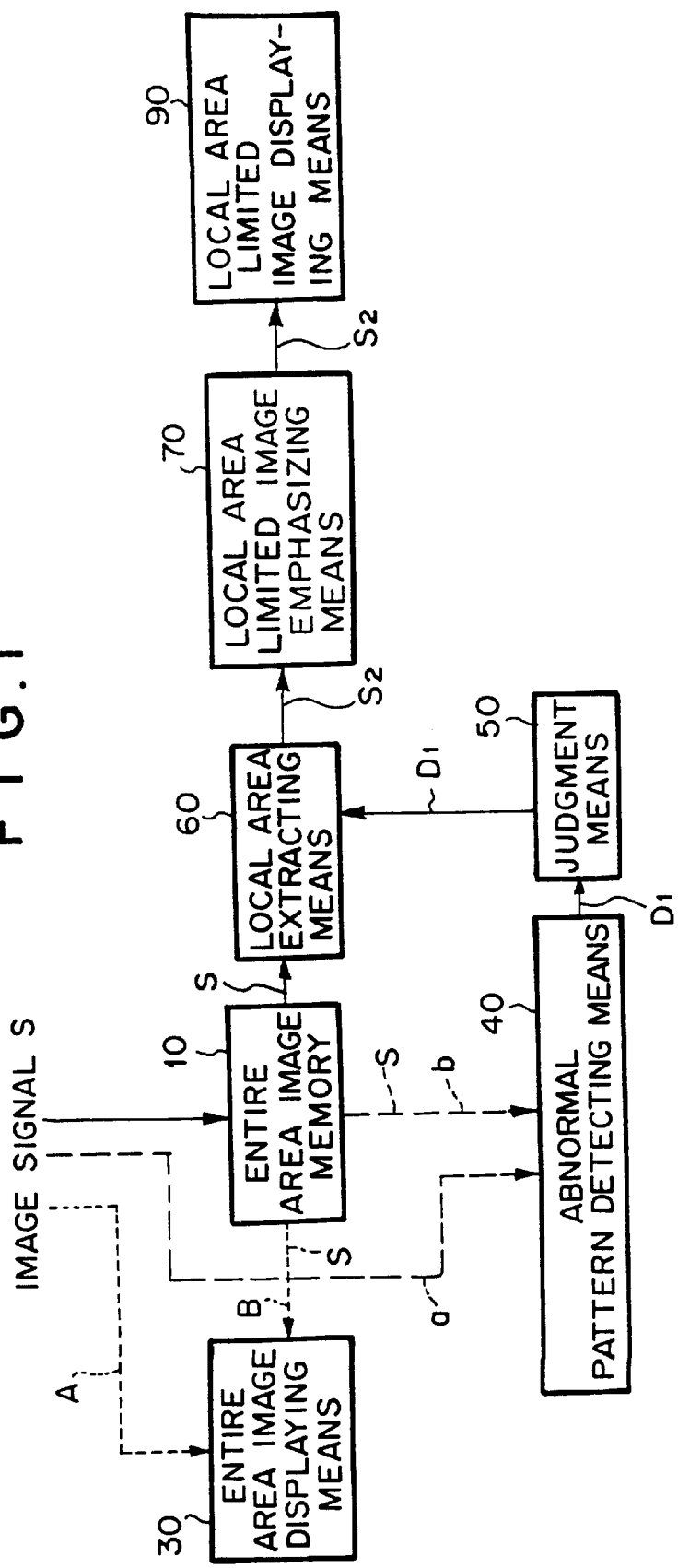
FIG. 1 is a block diagram showing an apparatus for computer aided diagnosis of medical images, in which a first embodiment of the image processing method in accordance with the present invention is employed.
Figure 2A:
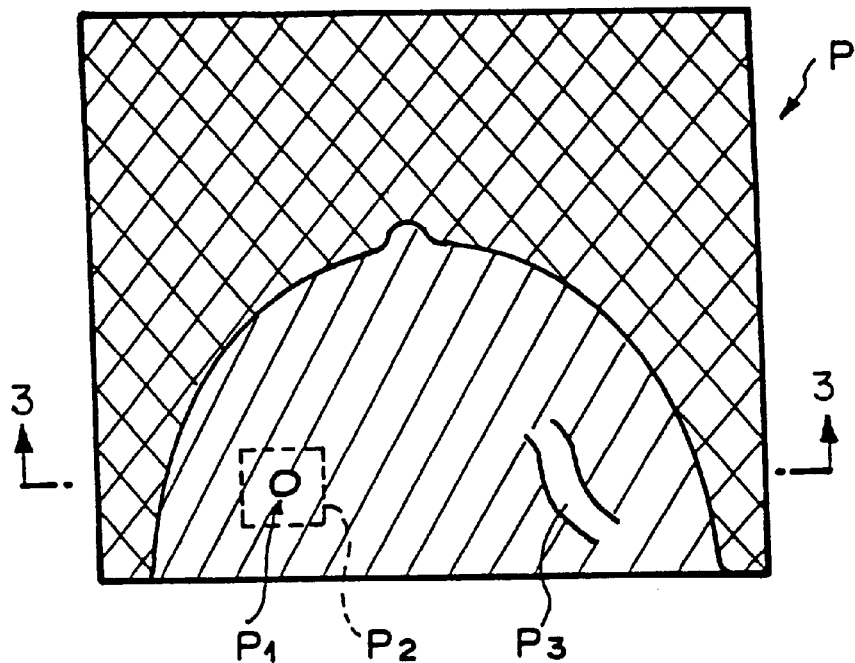
FIG. 2A is an explanatory view showing a radiation image of the mamma (i.e., a mammogram), which is subjected to diagnosis carried out with the apparatus for computer aided diagnosis of medical images shown in FIG. 1.

FIG. 1 is a block diagram showing an apparatus for computer aided diagnosis of medical images, in which a first embodiment of the image processing method in accordance with the present invention is employed. FIG. 2A is an explanatory view showing a radiation image of the mamma (i.e., a mammogram), which is subjected to diagnosis carried out with the apparatus for computer aided diagnosis of medical images shown in FIG. 1. The apparatus for computer aided diagnosis of medical images comprises an entire area image memory 10 for storing an image signal (i.e., an entire area image signal) S, which represents an entire radiation image (i.e., an entire area image) P of the mamma serving as an object and is made up of a series of density values Dorg of picture elements constituting the image, and an entire area image displaying means 30, which may be constituted of a CRT display device, or the like, and which displays the entire area image P of the object in accordance with the entire area image signal S received directly from the exterior or having been stored in the entire area image memory 10. The apparatus for computer aided diagnosis of medical images also comprises an abnormal pattern detecting means 40 for detecting an abnormal pattern $P_1$ in the entire area image P in accordance with the entire area image signal S, which has been stored in the entire area image memory 10, and a judgment means 50 for making a judgment as to whether the abnormal pattern $P_1$ has been or has not been detected by the abnormal pattern detecting means 40. The apparatus for computer aided diagnosis of medical images further comprises a local area extracting means 60 which, in cases where the judgment means 50 has judged that the abnormal pattern $P_1$ has been detected, extracts an image signal (i.e., a local area limited image signal) $S_2$ representing a local area limited image $P_2$ containing the abnormal pattern $P_1$ from the entire area image signal S having been stored in the entire area image memory 10. The apparatus for computer aided diagnosis of medical images still further comprises a local area limited image emphasizing means 70 for carrying out image emphasis processing on an image signal representing the abnormal pattern (i.e., an abnormal pattern image signal) $S_1$ such that the abnormal pattern $P_1$ in the local area limited image $P_2$, which is represented by the local area limited image signal $S_2$ having been extracted by the local area extracting means 60, may have better image quality and higher capability of serving as an effective tool in, particularly, the efficient and accurate diagnosis of an illness than the entire area image P, which is displayed on the entire area image displaying means 30. The apparatus for computer aided diagnosis of medical images also comprises a local area limited image displaying means 90, which may be constituted of a CRT display device, or the like, and which displays the local area limited image $P_2$ in accordance with the local area limited image signal $S_2$ having been obtained from the image emphasis processing.

In this embodiment, a tumor pattern is taken as the abnormal pattern. Also, an iris filter, which carries out an operation of iris filter, is employed as the abnormal pattern detecting means 40. However, in the image processing method in accordance with the present invention, the image to be processed is not limited to the medical image as in this embodiment and those that follow, and may be an image for inspection of an industrial product, or the like. For example, as for X-ray images of castings having a blow-hole therein, the abnormal pattern may be the pattern of the blow-hole.

Also, the term "local area" as used in the first embodiment means the region, which is located in the vicinity of the tumor pattern taken as the abnormal pattern and contains the tumor pattern.

In the first embodiment, the image signal value representing each of the picture element constituting the image is represented by a density signal value Dorg. Also, the image signal, which represents the region constituted of the set of the picture elements, is represented by the image signal S. The density value Dorg is the high density-high signal level type of signal value. Further, in this embodiment, the tumor pattern has the characteristics such that the density value Dorg may become smaller towards the center point of the pattern.

As described above, the processing with the iris filter 40 is carried out with the detection processing algorithm for detecting a specific image portion. However, in this embodiment, the iris filter 40 does not indicate the algorithm itself and indicates the means for carrying out the processing for detecting the tumor pattern with the algorithm.

Figure 4:
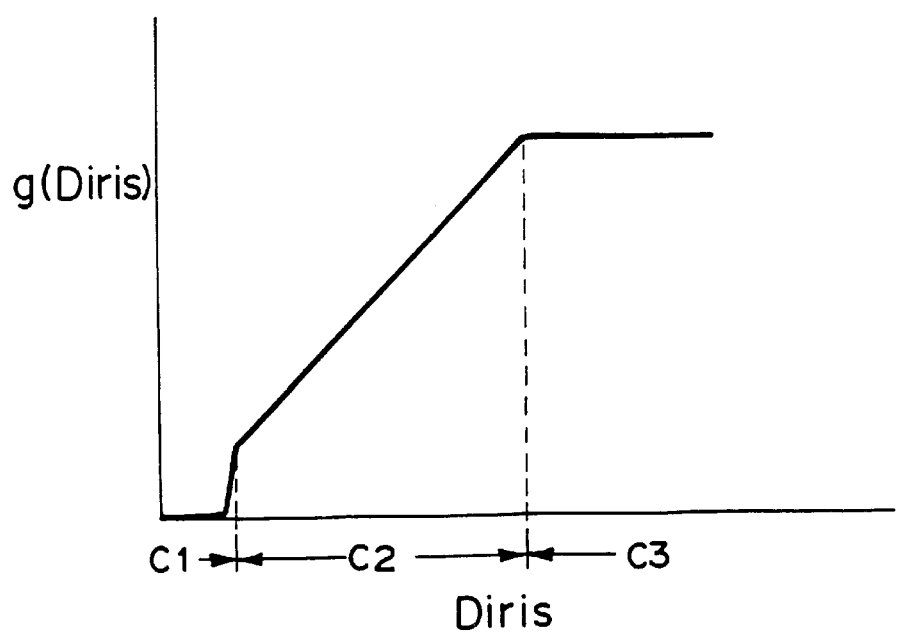
FIG. 4 is a graph showing a function representing a conversion table, which is incorporated in a local area limited image emphasizing means 70.
Figures 5, 6:
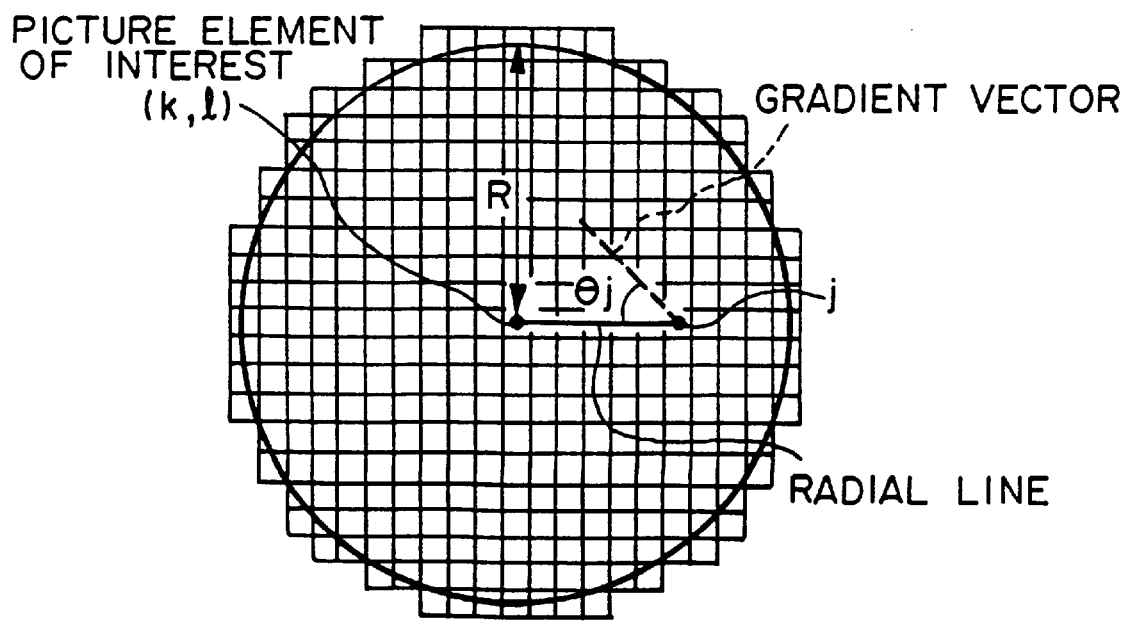
FIG. 5 is an explanatory view showing a mask, which is used for calculating directions of gradient vectors in an iris filter.
FIG. 6 is an explanatory view showing the concept behind the degree of centralization of a gradient vector with respect to a picture element of interest.
Figure 7:
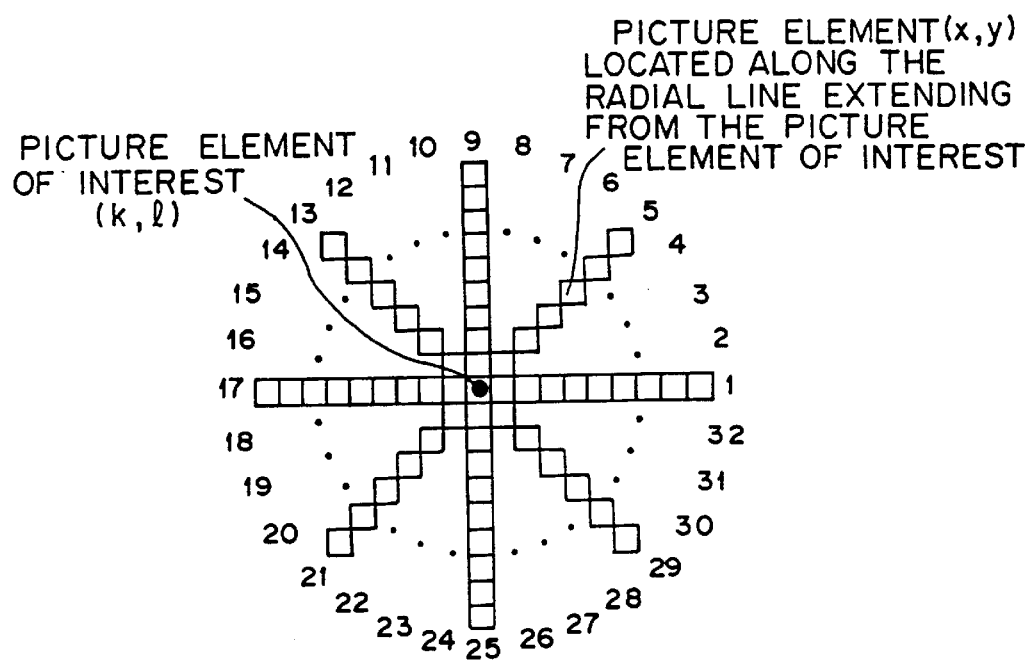
FIG. 7 is an explanatory view showing the picture elements, which are located along a plurality of radial lines extending radially from a picture element of interest and for which the degree of centralization of a gradient vector is rated.

The local area limited image emphasizing means 70 is provided with a conversion table for converting a variation Diris of the density value, which represents the tumor pattern extracted by the iris filter 40, into an output g(Diris). Specifically, as illustrated in FIG. 4, as for a region C1, in which the variation Diris is very small, and a region C3, in which the variation Diris is larger than a predetermined value, the conversion table converts the variation Diris such that the output g(Diris) may be restricted with respect to the variation Diris. Also, as for an intermediate region C2 between the region C1 and the region C3, the conversion table converts the variation Diris such that the output g(Diris) may be in proportion to the variation Diris. The output g(Diris) obtained from the conversion table is then multiplied by a predetermined emphasis coefficient α, and the resulting product is added to the original density value Dorg of the local area in the vicinity of the tumor pattern. In this manner, of the local area limited image $P_2$, only the tumor pattern $P_1$ is selectively emphasized. The calculation is carried out with Formula (55').

$$Dproc = Diris + \alpha \cdot g(Diris) \tag{55'}$$

wherein g(x) represents a function of x.

How the apparatus for computer aided diagnosis of medical images, in which the first embodiment of the image processing method in accordance with the present invention is employed, operates will be described hereinbelow.

The entire area image signal S, which represents the entire area image P of the mamma having the tumor therein and serving as the object, is fed from an external storage medium, such as a magneto-optical disk, an image read-out apparatus, or the like, into the entire area image memory 10. Also, the entire area image signal S is fed directly from the exterior into the entire area image displaying means 30 (along a line A shown in FIG. 1). Alternatively, the entire area image signal S having been stored in the entire area image memory 10 may be fed from the entire area image memory 10 into the entire area image displaying means 30 (along a line B shown in FIG. 1). The entire area image displaying means 30 displays the entire area image P in accordance with the entire area image signal S.

The entire area image signal S having been stored in the entire area image memory 10 is also fed into the iris filter 40. In accordance with the procedure described above, with respect to the received entire area image signal S, the iris filter 40 rates the degree of centralization of the gradient vector in accordance with the density value Dorg. The iris filter 40 thereby detects the image signal (hereinbelow referred to as the tumor pattern image signal) $S_1$, which represents the tumor pattern $P_1$.

Figure 2B:
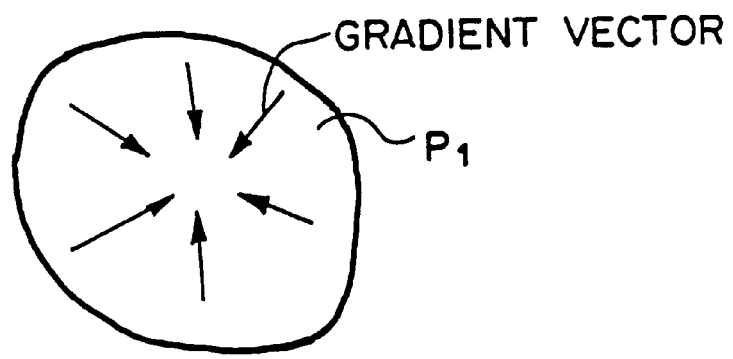
FIG. 2B is an explanatory view showing the degree of centralization of gradient vectors in a tumor pattern.
Figure 2C:
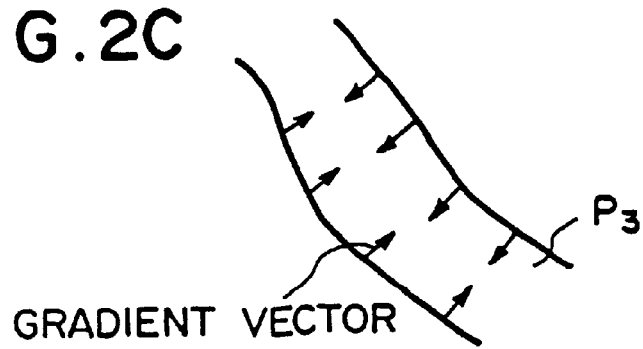
FIG. 2C is an explanatory view showing the degree of centralization of gradient vectors in a blood vessel pattern, or the like, FIG. 3 is a graph showing the distribution of density values in a cross section of the mammogram taken along line I—I of FIG. 2.

Specifically, the density value Dorg of the tumor pattern $P_1$ in the mammogram, which is shown in FIG. 2A, becomes smaller towards the center point of the pattern. Therefore, as illustrated in FIG. 2B, the direction of the gradient vector represented by Formula (38) centralizes upon the center point of the pattern. On the other hand, as for an image $P_3$ of a blood vessel, the mammary gland, or the like, the density value Dorg becomes smaller towards the center line of the pattern. Therefore, as illustrated in FIG. 2C, the direction of the gradient vector represented by Formula (38) is directed in the same direction and does not centralize upon a single point as in the tumor pattern shown in FIG. 2B.

The iris filter 40 rates the degree of centralization of the gradient vectors and rates the shape in Step 3 described above. In this manner, the iris filter 40 specifies the picture element (and its position), which corresponds to the image signal $S_1$ representing the tumor pattern $P_1$. The judgment means 50 judges that the tumor pattern image signal $S_1$ representing the tumor pattern $P_1$ has been detected by the iris filter 40. Also, the judgment means 50 feeds a position signal (hereinbelow referred to as the tumor picture element position signal) $D_1$, which specifies the position of the picture element represented by the tumor pattern image signal $S_1$, into the local area extracting means 60.

In cases where it has been judged that the tumor pattern image signal $S_1$ representing the tumor pattern $P_1$ has not been detected by the iris filter 40, the tumor picture element position signal $D_1$, which specifies the position of the picture element represented by the tumor pattern image signal $S_1$, is not fed out, and the processing is finished.

In cases where it has been judged that the tumor pattern image signal $S_1$ has been detected, the entire area image signal S having been stored in the entire area image memory 10 is also fed into the local area extracting means 60. In accordance with the received entire area image signal S and the received tumor picture element position signal $D_1$, the local area extracting means 60 specifies the picture elements (i.e., the local area constituted of the set of these picture elements), which include the picture elements corresponding to the tumor pattern image signal $S_1$ and are located in the vicinity of them, according to a predetermined processing procedure. The local area extracting means 60 thus extracts the local area limited image signal $S_2$, which represents the local area limited image $P_2$, from the entire area image signal S.

The extracted local area limited image signal $S_2$ is fed into the local area limited image emphasizing means 70.

By use of the conversion table shown in FIG. 4, the local area limited image emphasizing means 70 converts the variation Diris of the density value of the tumor pattern $P_1$ into the output g(Diris) in accordance with the tumor picture element position signal $D_1$ in the received local area limited image signal $S_2$.

Figure 3:
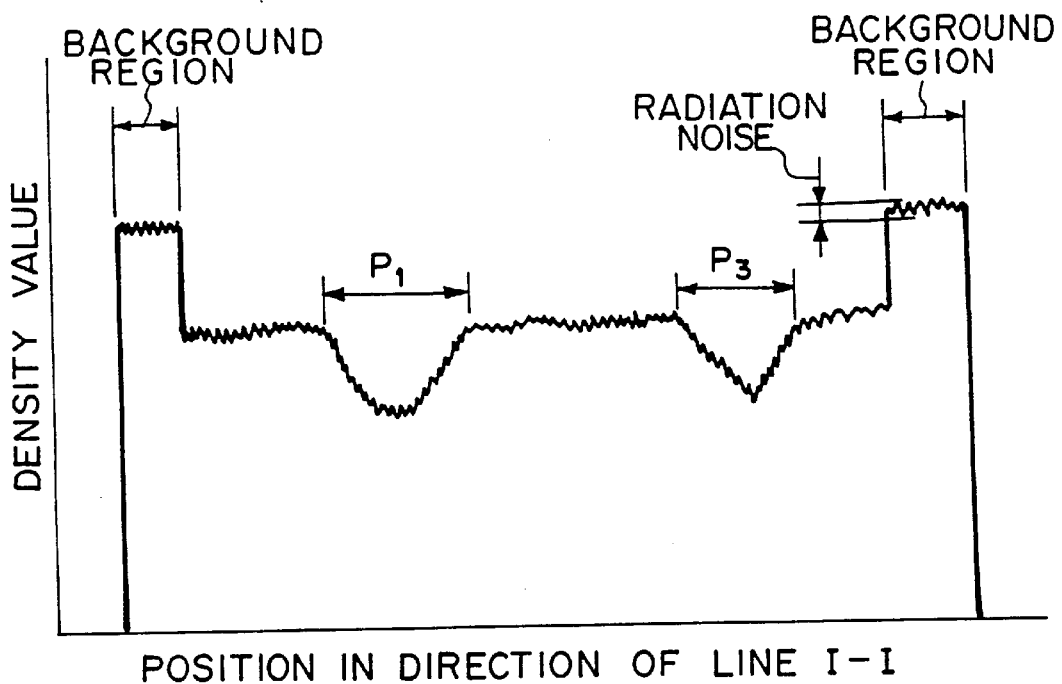

With the conversion table, the output g(Diris) is restricted to a small value with respect to the region C1, in which the value of the variation Diris is small. Therefore, high frequency radiation noise, which is detected in the region C1, can be reduced. Specifically, actually, as illustrated in FIG. 3, radiation noise has been superposed upon the distribution curve of the density value Dorg along the cross section of the mammogram shown in FIG. 2A, which cross section is taken along, for example, line I—I. Radiation noise is also emphasized by the image emphasis processing carried out with Formula (55') and, as a result, an image in which radiation noise has been emphasized is obtained. Therefore, the image quality of the image and its capability of serving as an effective tool in, particularly, the efficient and accurate diagnosis of an illness cannot be kept high. However, with the conversion table, by appropriate setting of the value of the boundary between the regions C1 and C2, it is possible to prevent radiation noise from being emphasized.

In the region C3, the change in the output g(Diris) is restricted with respect to the change in the variation Diris. The restriction is done in order to prevent the image portion, which already has a certain level of contrast, from being emphasized excessively. If the excessive emphasis is carried out, the contrast of the image areas other than the image portion will become comparatively low, and therefore the image quality of the image and its capability of serving as an effective tool in the efficient and accurately diagnosis of an illness will become low.

As described above, the signal value g(Diris) having been obtained from the conversion table is multiplied by the predetermined emphasis coefficient α, and the resulting product is added to the original density value Diris of the local area in the vicinity of the tumor pattern. In this manner, of the local area limited image $P_2$, only the tumor pattern $P_1$ is selectively emphasized. The signal having thus been obtained is fed into the local area limited image displaying means 90.

The local area limited image displaying means 90 reproduces the local area limited image $P_2$, in which the tumor pattern $P_1$ has been emphasized, from the received signal and display s it.

In this manner, of the entire area image P, only the local area limited image $P_2$ containing the tumor pattern $P_1$ is independently displayed on the local area limited image displaying means 90. Therefore, the person, who views the radiation image, can concentrate his attention on the local area limited image $P_2$, which is displayed on the local area limited image displaying means 90. As a result, the efficiency and the accuracy of the diagnosis, or the like, can be kept high.

The entire area image displaying means 30 may also serve as the local area limited image displaying means 90. In such cases, of the entire area image P displayed, only the tumor pattern $P_1$ is emphasized selectively. Therefore, the efficiency and the accuracy of the diagnosis, or the like, can be kept high.

A second embodiment of the image processing method in accordance with the present invention will be described hereinbelow.

Figure 8:
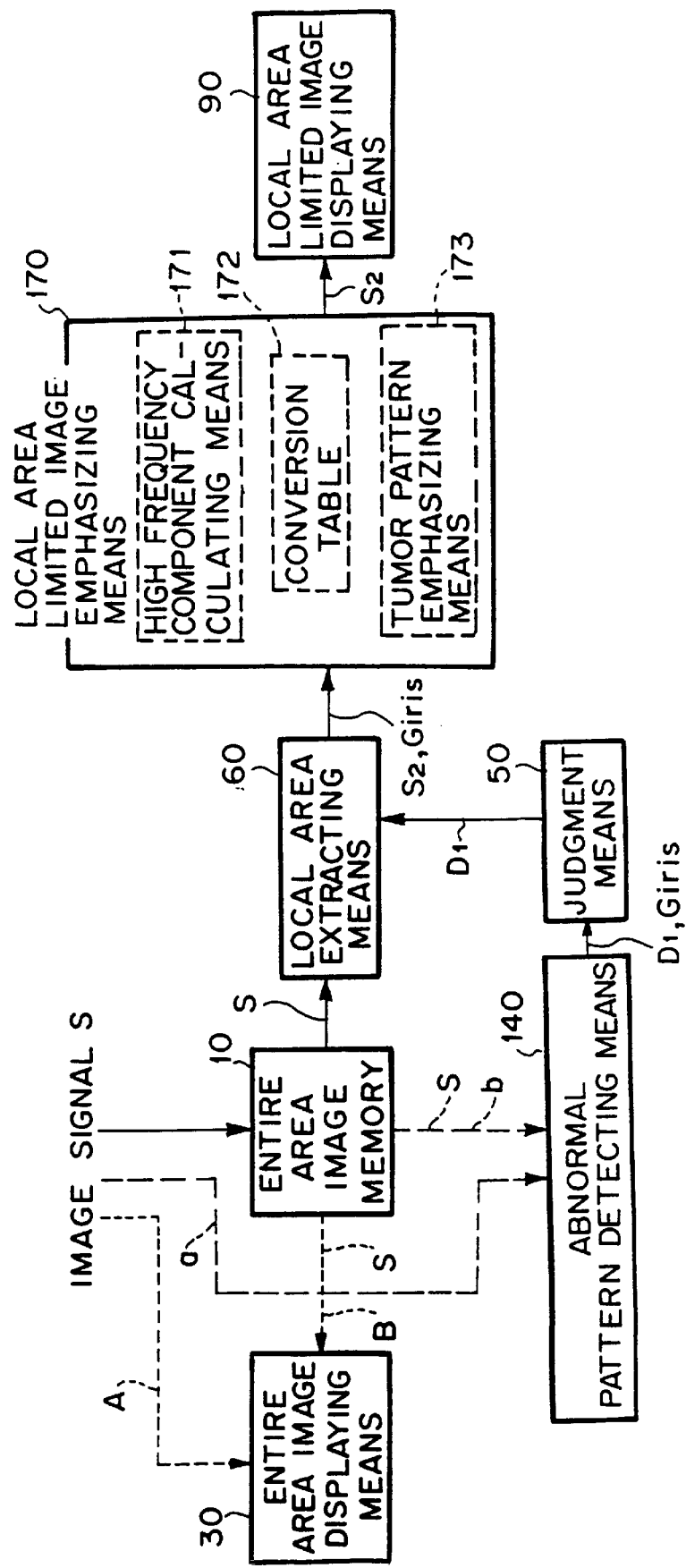
FIG. 8 is a block diagram showing an apparatus for computer aided diagnosis of medical images, in which a second embodiment of the image processing method in accordance with the present invention is employed.

FIG. 8 is a block diagram showing an apparatus for computer aided diagnosis of medical images, in which the second embodiment of the image processing method in accordance with the present invention is employed. In FIG. 8, similar elements are numbered with the same reference numerals with respect to FIG. 1.

In this embodiment, a tumor pattern is taken as the abnormal pattern. Also, an iris filter, which carries out an operation of iris filter, is employed as an abnormal pattern detecting means 140. The iris filter 140 feeds out the information representing the degree of centralization C, which has been calculated with Formula (44) with respect to the picture element corresponding to the tumor pattern, as an iris filter signal Giris representing whether the picture element is or is not the one constituting the tumor pattern.

The processing with the iris filter 140 is carried out with the detection processing algorithm for detecting a specific image portion in accordance with Step 1 to Step 3 described above. However, the iris filter 140 in this embodiment does not indicate the algorithm itself and indicates the means for carrying out the processing for detecting the tumor pattern with the algorithm, i.e., the processing carried out with Formula (56).

Figure 9:
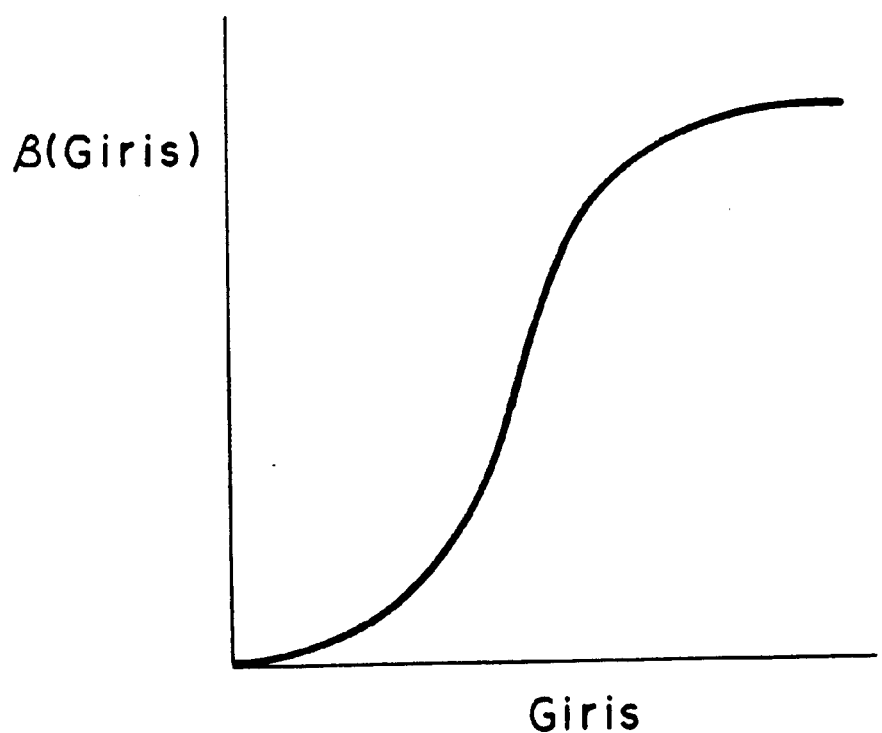
FIG. 9 is a graph showing a function representing a conversion table.

Also, a local area limited image emphasizing means 170 comprises a high frequency component calculating means 171. The high frequency component calculating means 171 carries out an operation on each picture element value (the density value Dorg), which constitutes the local area limited image signal $S_2$, in order to calculate an unsharp mask signal Dus with respect to an unsharp mask constituted of a picture element matrix, which has a size of N columns×N rows (wherein N represents an odd number, for example, 5) and has its center at the picture element, the unsharp mask signal Dus being calculated with Formula (37)

$$Dus = (\Sigma Dorg)/N^2 \tag{37}$$

wherein ΣDorg represents the sum of the image signal values representing the picture elements located within the unsharp mask. The high frequency component calculating means 171 then calculates high frequency components (Dorg−Dus) by subtracting the unsharp mask signal value Dus from the density value Dorg. The local area limited image emphasizing means 170 also comprises a conversion table 172 for converting the iris filter signal Giris, which has been obtained with respect to the picture element representing the tumor pattern extracted by the iris filter 140, into an emphasis coefficient β(Giris), which increases monotonously and is shown in FIG. 9. The local area limited image emphasizing means 170 further comprises a tumor pattern emphasizing means 173 for multiplying the high frequency components (Dorg−Dus) by the emphasis coefficient β(Giris) and carrying out a frequency emphasis processing to a high extent on the tumor pattern, which has a density value lower than the density value of the surrounding area.

How the apparatus for computer aided diagnosis of medical images, in which the second embodiment of the image processing method in accordance with the present invention is employed, operates will be described hereinbelow.

The entire area image signal S, which represents the entire area image P of the mamma having the tumor therein and serving as the object, is fed from an external storage medium, such as a magneto-optical disk, an image read-out apparatus, or the like, into the entire area image memory 10. Also, the entire area image signal S is fed directly from the exterior into the entire area image displaying means 30 (along a line A shown in FIG. 8). Alternatively, the entire area image signal S having been stored in the entire area image memory 10 may be fed from the entire area image memory 10 into the entire area image displaying means 30 (along a line B shown in FIG. 8). The entire area image displaying means 30 displays the entire area image P in accordance with the entire area image signal S.

The entire area image signal S having been stored in the entire area image memory 10 is also fed into the iris filter 140. In accordance with the procedure described above, with respect to the received entire area image signal S, the iris filter 140 rates the degree of centralization of the gradient vector with Formula (44) in accordance with the density value Dorg. The iris filter 140 thereby detects the image signal (hereinbelow referred to as the tumor pattern image signal) $S_1$, which represents the tumor pattern $P_1$.

The iris filter 140 rates the degree of centralization C of the gradient vectors, which has been described above with reference to FIGS. 2A, 2B, and 2C, and rates the shape in Step 3 described above. In this manner, the iris filter 140 specifies the picture element (and its position), which corresponds to the image signal $S_1$ representing the tumor pattern $P_1$, and feeds out the information representing the degree of centralization C as the iris filter signal Giris, which represents whether the picture element is or is not the one constituting the tumor pattern. The judgment means 50 judges that the tumor pattern image signal $S_1$ representing the tumor pattern $P_1$ has been detected by the iris filter 140. Also, the judgment means 50 feeds a position signal (hereinbelow referred to as the tumor picture element position signal) $D_1$, which specifies the position of the picture element represented by the tumor pattern image signal $S_1$, and the iris filter signal Giris into the local area extracting means 60.

In cases where it has been judged that the tumor pattern image signal $S_1$ representing the tumor pattern $P_1$ has not been detected by the iris filter 140, the tumor picture element position signal $D_1$, which specifies the position of the picture element represented by the tumor pattern image signal $S_1$, is not fed out, and the processing is finished.

In cases where it has been judged that the tumor pattern image signal $S_1$ has been detected, the entire area image signal S having been stored in the entire area image memory 10 is also fed into the local area extracting means 60. In accordance with the received entire area image signal S and the received tumor picture element position signal $D_1$, the local area extracting means 60 specifies the picture elements (i.e., the local area constituted of the set of these picture elements), which include the picture elements corresponding to the tumor pattern image signal $S_1$ and are located in the vicinity of them, according to a predetermined processing procedure. The local area extracting means 60 thus extracts the local area limited image signal $S_2$, which represents the local area limited image $P_2$, from the entire area image signal S.

The extracted local area limited image signal $S_2$ and the iris filter signal Giris are fed into the local area limited image emphasizing means 170.

With respect to each picture element (the density value Dorg) constituting the local area limited image signal $S_2$ having been fed into the local area limited image emphasizing means 170, the high frequency component calculating means 171 calculates the unsharp mask signal Dus. The high frequency component calculating means 171 then calculates the high frequency components (Dorg−Dus). Thereafter, with the conversion table 172, the iris filter signal Giris having been received from the iris filter 140 is converted into the emphasis coefficient β(Giris). As illustrated in FIG. 9, the conversion table 172 is constituted of the monotonously increasing function. Specifically, the iris filter signal Giris represents the degree of centralization C calculated with Formula (44), and a large value of the degree of centralization C represents that the picture element is the one corresponding to the tumor pattern. Therefore, when the picture element is the one corresponding to the tumor pattern, a large value of the emphasis coefficient β(Giris) is fed out from the conversion table 172.

The tumor pattern emphasizing means 173 calculates the product β(Giris)×(Dorg−Dus) of the emphasis coefficient β(Giris), which has been obtained from the conversion table 172, and the high frequency components (Dorg−Dus), which have been obtained from the high frequency component calculating means 171. The tumor pattern emphasizing means 173 then adds the density value Dorg of the original image to the product and thus carries out the frequency emphasis processing with Formula (1).

With the frequency emphasis processing, the high frequency components (Dorg−Dus) are emphasized with the emphasis coefficient β(Giris) obtained in accordance with the iris filter signal Giris, which is obtained from the iris filter 140 and indicates whether the picture element is or is not the one constituting the tumor pattern. Therefore, even if unnecessary components, such as quantum noise, are contained in the high frequency components (Dorg−Dus), in cases where the picture element is not the one constituting the image portion, such as the tumor pattern, (for example, in cases where the picture element is the one constituting the blood vessel pattern, or the like), the value of β(Giris) with respect to the picture element will be small, and the degree of emphasis with respect to the picture element will be kept low. In cases where the picture element is the one constituting the image portion, such as the tumor pattern, the value of β(Giris) with respect to the picture element is large, and therefore the degree of emphasis with respect to the picture element is kept high Therefore, regardless of whether radiation noise is or is not contained in the high frequency components (Dorg−Dus) of the image, the specific image portion, such as the tumor pattern, can be selectively emphasized with the function β(Giris), which has a value in accordance with whether the image area is or is not the specific image portion.

The local area limited image displaying means 90 displays an image, in which the tumor pattern $P_1$ in the local area limited image $P_2$ has been emphasized by the local area limited image emphasizing means 170.

In this manner, of the entire area image P, only the local area limited image $P_2$ containing the tumor pattern $P_1$ is independently displayed on the local area limited image displaying means 90. Therefore, the person, who views the radiation image, can concentrate his attention on the local area limited image $P_2$, which is displayed on the local area limited image displaying means 90. As a result, the efficiency and the accuracy of the diagnosis, or the like, can be kept high.

In this embodiment, the entire area image displaying means 30 may also serve as the local area limited image displaying means 90. In such cases, of the entire area image P displayed, only the tumor pattern $P_1$ is emphasized selectively. Therefore, the efficiency and the accuracy of the diagnosis, or the like, can be kept high.

A third embodiment of the image processing method in accordance with the present invention will be described hereinbelow.

FIG. 10 is a block diagram showing an apparatus for computer aided diagnosis of medical images, in which the third embodiment of the image processing method in accordance with the present invention is employed. In FIG. 10, similar elements are numbered with the same reference numerals with respect to FIG. 1.

The term "abnormal pattern" as used in the third embodiment means a calcified pattern. Also, a morphology filter, which carries out a morphology operation, is employed as an abnormal pattern detecting means 240. The morphology filter 240 feeds out the information representing the value, which has been calculated with Formula (8) with respect to the picture element corresponding to the calcified pattern, as a morphology signal Dmor representing whether the picture element is or is not the one constituting the calcified pattern.

Also, the term "local area" as used in the third embodiment means the region, which is located in the vicinity of the calcified pattern taken as the abnormal pattern and contains the calcified pattern.

In the third embodiment, the image signal value representing each of the picture elements constituting the image are represented by a density value Dorg. Also, the image signal, which represents the region constituted of the set of the picture elements, is represented by the image signal S. The density value Dorg is the high density-high signal level type of signal value. Further, in this embodiment, the calcified pattern has the characteristics such that the density value Dorg may be smaller than the density values of the surrounding image areas, and the size of the calcified pattern is small.

Figure 12:
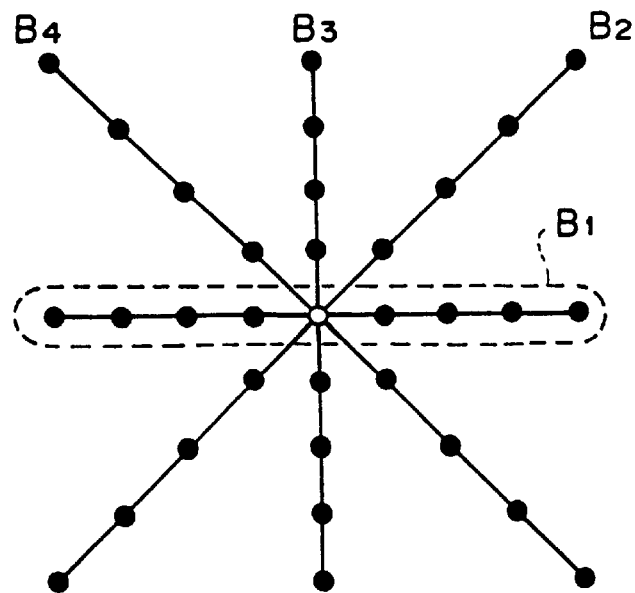
FIG. 12 is an explanatory view showing four linear structure elements, which constitute a multiply structure element employed in a morphology filter.

As described above, the processing with the morphology filter 240 is carried out with the detection processing algorithm for detecting a specific image portion of a radiation image by utilizing a multiply structure element. However, in this embodiment, the morphology filter 240 does not indicate the algorithm itself and indicates the means for carrying out the processing for detecting the calcified pattern with the algorithm. Specifically, the morphology filter 240 carries out the morphology operation on the density value Dorg of each picture element by using a multiply structure element $B_i$, the size of which is larger than a small calcified pattern $P_1$ and which is shown in FIG. 12, and a scale factor λ. In this manner, the small calcified pattern is extracted. The morphology operation is carried out with Formula (8).

$$Dmor=Dorg-\min\{(Dorg\oplus\lambda B_i)\ominus\lambda B_i\} \quad (8)$$

i=1, . . . ,n

Figure 13:
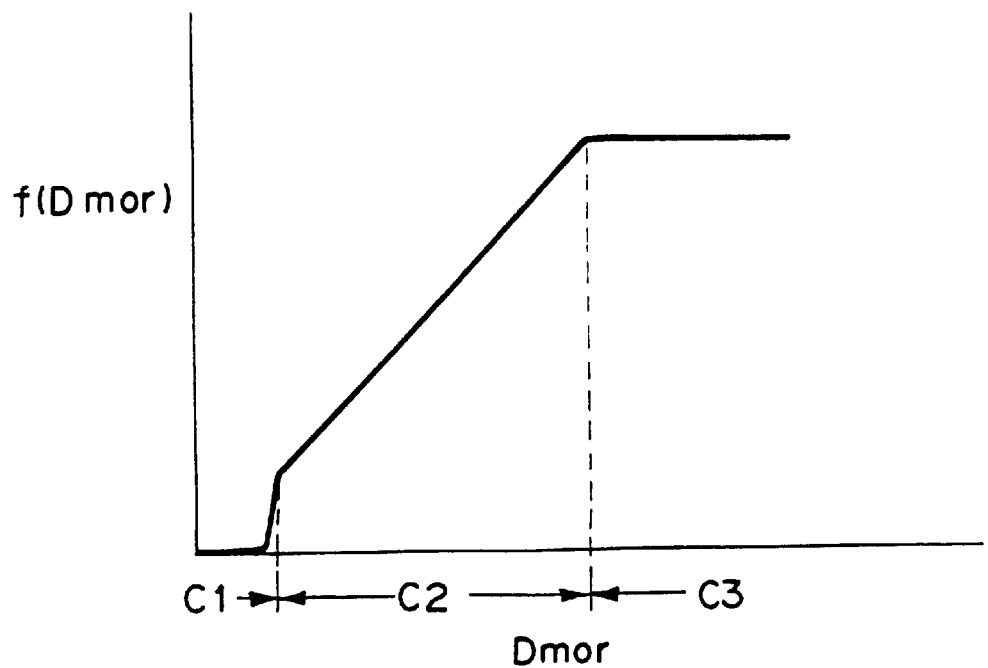
FIG. 13 is a graph showing a function representing a conversion table, which is incorporated in a local area limited image emphasizing means 270.
Figure 14A:
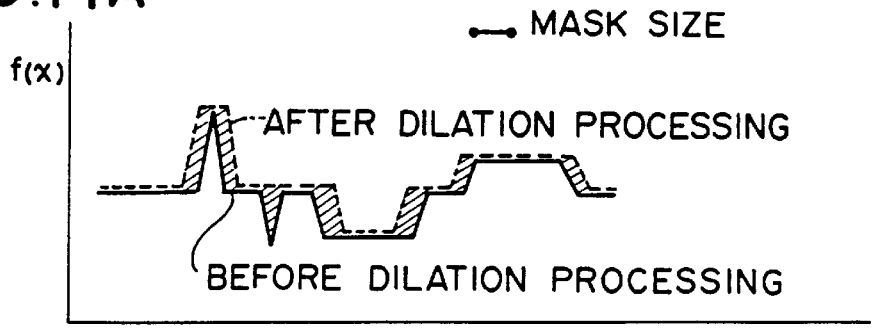
FIG. 14A is a graph showing how a dilation processing, which is one of fundamental morphology operations, is carried out.
Figure 14B:
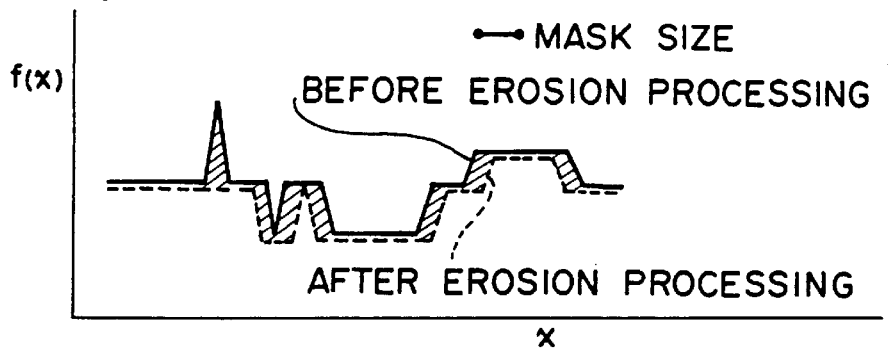
FIG. 14B is a graph showing how an erosion processing, which is one of fundamental morphology operations, is carried out.
Figure 14C:
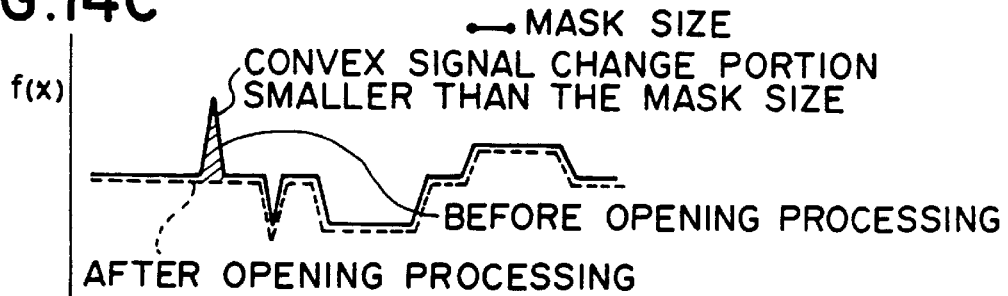
FIG. 14C is a graph showing how an opening processing, which is one of fundamental morphology operations, is carried out.
Figure 14D:
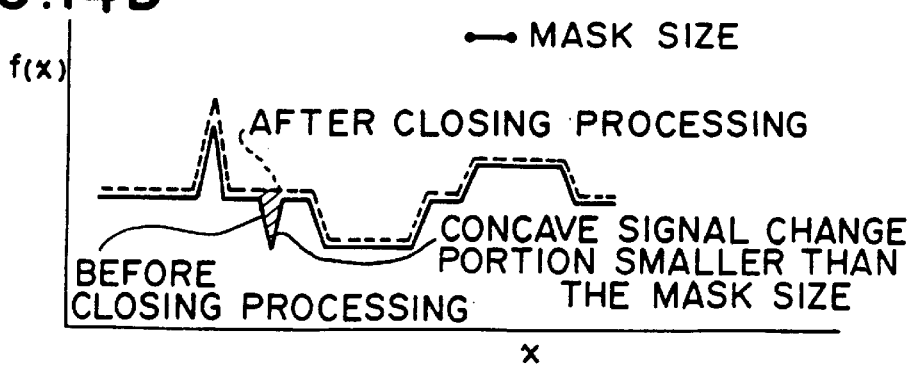
FIG. 14D is a graph showing how a closing processing, which is one of fundamental morphology operations, is carried out.

A local area limited image emphasizing means 270 is provided with a conversion table for converting the variation Dmor of the density value, which represents the small calcified pattern extracted by the morphology filter 240, into an output f(Dmor). Specifically, as illustrated in FIG. 13, as for a region C1, in which the variation Dmor is very small, the conversion table converts the variation Dmor such that the output f(Dmor) may be kept to be equal to zero. Also, as for a region C2, in which the variation Dmor has a certain level of value, the conversion table converts the variation Dmor such that the output f(Dmor) may be monotonously increased with respect to the variation Dmor. Further, as for a region C3, in which the variation Dmor is very large, the conversion table converts the variation Dmor such that the output f(Dmor) may be kept to be equal to the upper limit value. The output f(Dmor) obtained from the conversion table is then multiplied by a predetermined emphasis coefficient α (α is equal to, for example, 2), and the resulting product is added to the original density value Dorg of the local area in the vicinity of the small calcified pattern. In this manner, of the local area limited image $P_2$, only the small calcified pattern $P_1$ is selectively emphasized. The calculation is carried out with Formula (2).

$$Dproc=Dorg+\alpha \cdot f(Dmor) \quad (2)$$

How the apparatus for computer aided diagnosis of medical images, in which the third embodiment of the image processing method in accordance with the present invention is employed, operates will be described hereinbelow.

The entire area image signal S, which represents the entire area image P of the mamma having the small calcified portion therein and serving as the object, is fed from an external storage medium, such as a magneto-optical disk, an image read-out apparatus, or the like, into the entire area image memory 10. Also, the entire area image signal S is fed directly from the exterior into the entire area image displaying means 30 (along a line A shown in FIG. 10). Alternatively, the entire area image signal S having been stored in the entire area image memory 10 may be fed from the entire area image memory 10 into the entire area image displaying means 30 (along a line B shown in FIG. 10). The entire area image displaying means 30 displays the entire area image P in accordance with the entire area image signal S.

The entire area image signal S having been stored in the entire area image memory 10 is also fed into the morphology filter 240. In accordance with the procedure described above, with respect to the received entire area image signal S, the morphology filter 240 carries out the closing processing with Formula (8) on the density value Dorg and detects the image signal (hereinbelow referred to as the calcified pattern image signal) $S_1$, which represents a small calcified pattern $P_1$.

Figure 11A:
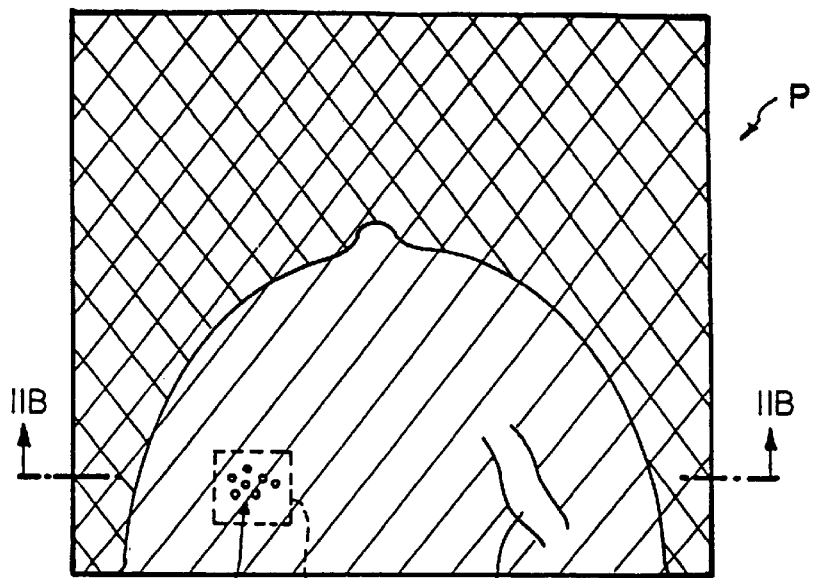
FIG. 11A is an explanatory view showing a radiation image of the mamma (i.e., a mammogram), which is subjected to diagnosis carried out with the apparatus for computer aided diagnosis of medical images shown in FIG. 10.
Figure 11B:
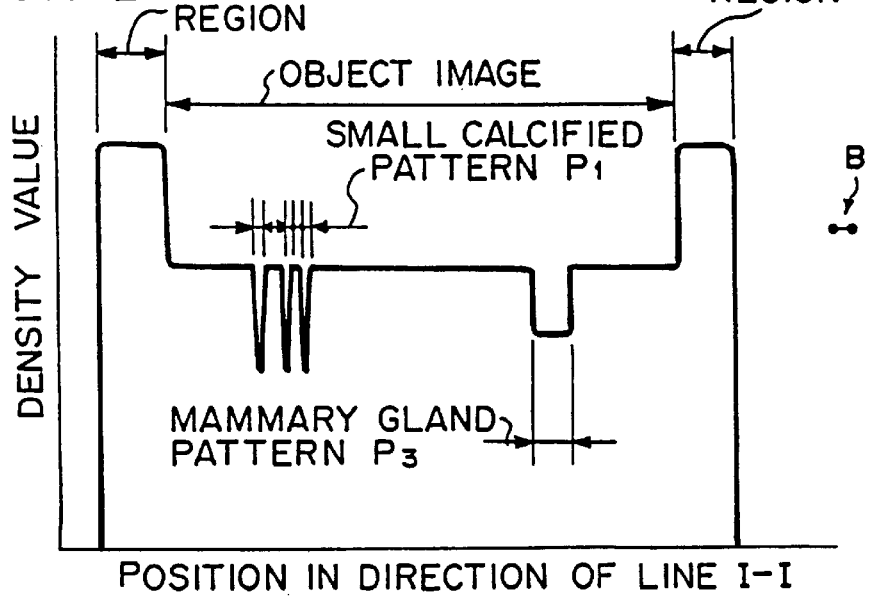
FIG. 11B is a graph showing the distribution of density values of the mammogram in the cross section taken along line I—I of FIG. 11A.

Specifically, density values Dorg of the mammogram in the cross section taken along line I—I of FIG. 11A are distributed in the pattern shown in FIG. 11B. At the small calcified pattern $P_1$, the density value fluctuates in a spatially narrower range than a structure element B and is smaller than the density values of the surrounding image areas. Therefore, the morphology signal Dmor, which is calculated with Formula (8), takes a predetermined value other than zero, and the pattern is smoothed by the closing processing. On the other hand, at a pattern $P_3$ of the blood vessel or the mammary gland, at which the density value fluctuates in a spatially wider range than the structure element B, the value of the morphology signal Dmor becomes equal to zero. Therefore, the pattern is not smoothed by the closing operation and is kept unremoved.

In this manner, the morphology filter 240 specifies the picture element (and its position), which corresponds to the image signal $S_1$ representing the small calcified pattern $P_1$. The judgment means 50 judges that the calcified pattern image signal $S_1$ representing the small calcified pattern $P_1$ has been detected by the morphology filter 240. Also, the judgment means 50 feeds a position signal (hereinbelow referred to as the calcified picture element position signal) $D_1$, which specifies the position of the picture element represented by the calcified pattern image signal $S_1$, and the morphology signal Dmor, which represents the variation of the density value of the small calcified pattern $P_1$ having been extracted by the morphology filter 240, into the local area extracting means 60.

In cases where it ha s been judged that the calcified pattern image signal $S_1$ representing the small calcified pattern $P_1$ has not been detected by the morphology filter 240, the calcified picture element position signal $D_1$, which specifies the position of the picture element represented by the calcified pattern image signal $S_1$, is not fed out, and the processing is finished.

In cases where it has been judged that the calcified pattern image signal $S_1$ has been detected, the entire area image signal S having been stored in the entire area image memory 10 is also fed into the local area extracting means 60. In accordance with the received entire area image signal S and the received calcified picture element position signal $D_1$, the local area extracting means 60 specifies the picture elements (i.e., the local area constituted of the set of these picture elements), which include the picture elements corresponding to the calcified pattern image signal $S_1$ and are located in the vicinity of them, according to a predetermined processing procedure. The local area extracting means 60 thus extracts the local area limited image signal $S_2$, which represents the local area limited image $P_2$, from the entire area image signal S.

The extratede local area limited image signal $S_2$ and the morphology signal Dmor, which represents the variation of the density value of the small calcified pattern $P_1$ having been extracted by the morphology filter 240, are fed into the local area limited image emphasizing means 270.

By use of the conversion table shown in FIG. 13, the local area limited image emphasizing means 270 converts the variation Dmor of the density value of the small calcified pattern $P_1$ into the output f(Dmor).

Figure 11C:
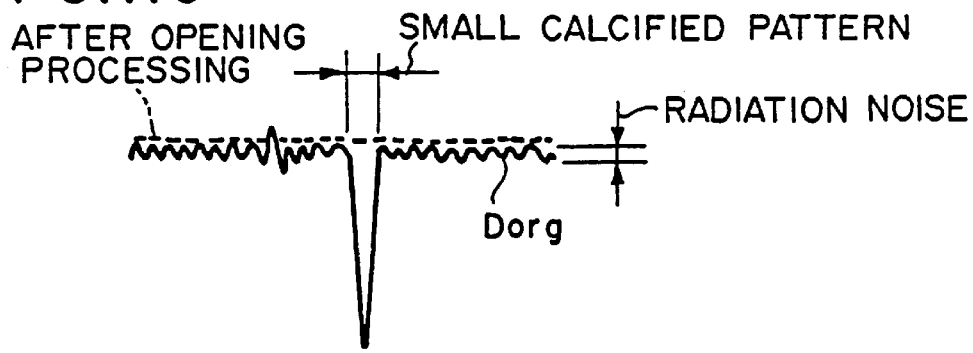
FIG. 11C is an enlarged view showing a portion of the distribution shown in FIG. 11B.

With the conversion table, the output f(Dmor) is equal to zero with respect to the region C1. Therefore, as for the region C1, no image emphasis is carried out, and the processed image signal Dproc becomes equal to the original image signal Dorg. Specifically, actually, as illustrated in FIG. 11C, radiation noise has been superposed upon the distribution curve of the density value shown in FIG. 11B. However, as indicated by the broken line in FIG. 11C, the radiation noise is smoothed by the closing operation of the second term in Formula (8). Therefore, the value of Dmor is varied very finely. However, the amount of the variation is smaller than the variation Dmor due to the small calcified pattern $P_1$. Accordingly, by appropriate setting of the value of the boundary between the regions C1 and C2, it is possible to prevent the high frequency noise from being emphasized In the region C3, the change in the output f(Dmor) is restricted with respect to the change in the value of Dmor. The restriction is done in order to prevent the image portion, which already has a certain level of contrast, from being emphasized excessively. If the excessive emphasis is carried out, the contrast of the image areas other than the image portion will become comparatively low, and therefore the image quality of the image and its capability of serving as an effective tool in the efficient and accurately diagnosis of an illness will become low.

As described above, the signal value f(Dmor) having been obtained from the conversion table is multiplied by the predetermined emphasis coefficient α, and the resulting product is added to the original density value Dorg of the local area in the vicinity of the small calcified pattern. In this manner, of the local area limited image $P_2$, only the small calcified pattern $P_1$ is selectively emphasized. The signal having thus been obtained is fed into the local area limited image displaying means 90.

The local area limited image displaying means 90 reproduces the local area limited image $P_2$, in which the small calcified pattern $P_1$ has been emphasized, from the received signal and displays it.

In this manner, of the entire area image P, only the local area limited image $P_2$ containing the small calcified pattern $P_1$ is independently displayed on the local area limited image displaying means 90. Therefore, the person, who views the radiation image, can concentrate his attention on the local area limited image $P_2$, which is displayed on the local area limited image displaying means 90. As a result, the efficiency and the accuracy of the diagnosis, or the like, can be kept high.

In this embodiment, the entire area image displaying means 30 may also serve as the local area limited image displaying means 90. In such cases, of the entire area image P displayed, only the small calcified pattern $P_1$ is emphasized selectively. Therefore, overshooting and undershooting can be restricted, an artifact due to them can be reduced, and a reproduced image can be obtained, which has good image quality and can serve as an effective tool in the efficient and accurate diagnosis of an illness.

With the processing for detecting the small calcified pattern alone, which is carried out by the morphology filter 240 in accordance with Formula (8), it will often occur that a pattern resembling the small calcified pattern is also detected as a calcified pattern. Specifically, an image (hereinbelow referred to as the non-calcified pattern) will often be detected, which is other than the calcified pattern and has approximately the same size as the calcified pattern and for which the value of Dmor calculated with Formula (8) does not become equal to zero. If the emphasis processing is carried out on such a non-calcified pattern, an accurate diagnosis cannot be made.

Therefore, such that the non-calcified pattern may be prevented from being detected together with the calcified pattern and only the calcified pattern can be detected accurately, the morphology filter 240 may be provided with the discriminating function described below.

Specifically, the differential operation based upon the morphology operation is carried out with Formula (63) shown below. A larger value of Mgrad represents a higher possibility that the picture element will be the one constituting the calcified pattern. Therefore, in lieu of Formula (8), the logical operation is then carried out with Formula (64).

$$\text{Mgrad} = (1/2) \cdot (\text{Dorg} \oplus \lambda B - \text{Dorg} \ominus \lambda B) \quad (63)$$

$$\text{if } \text{Dmor}(x,y) \geq T1 \text{ and } \text{Mgrad} \geq T2 \text{ then } \text{Dmor}(x,y) = \text{Dmor else}$$
$$\text{Dmor}(x,y) = 0 \quad (64)$$

In cases where the value of Dmor obtained with Formula (64) is equal to zero, the picture element is the one constituting the non-calcified pattern. Therefore, in such cases, the emphasis processing with Formula (2) is not carried out. In cases where the value of Dmor obtained with Formula (64) is not equal to zero, the picture element is the one constituting the calcified pattern. Therefore, in such cases, the emphasis processing with Formula (2) is carried out. In Formula (64), T1 and T2 represent the threshold values which have been set experimentally.

Besides the discrimination with Formulas (63) and (64), the discrimination between the calcified pattern and the non-calcified pattern may be carried out with the combination of the opening processing and the closing processing with the multi-scale.

Specifically, the value of Dmor may be set with Formulas (65), (66), and (67) shown below.

$$D' = \text{Dmor} \ominus \lambda_1 B \oplus \lambda_1 B \quad (65)$$

$$D_c(x,y) = D' \oplus \lambda_2 B \ominus \lambda_2 B \quad (66)$$

$$\text{if } D_c(x,y) \geq T \text{ then } \text{Dmor}(x,y) = \text{Dmor else } \text{Dmor}(x,y) = 0 \quad (67)$$

In Formula (67), T represents a threshold value having been set experimentally.

Figure 15A:
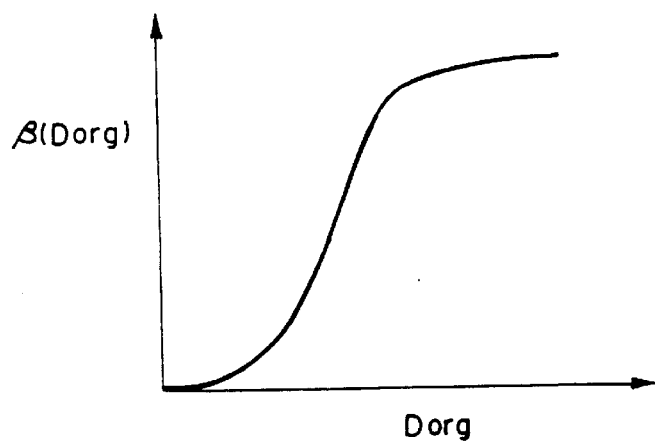
FIGS. 15A and 15B are graphs showing emphasis functions β(Dorg) in accordance with an original image signal Dorg.
Figure 15B:
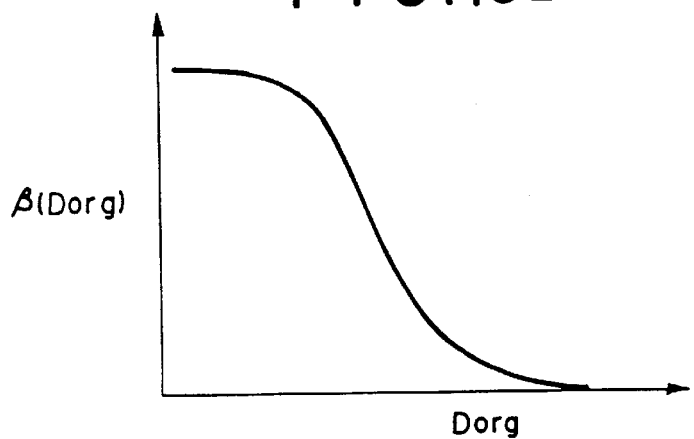
Figure 16:
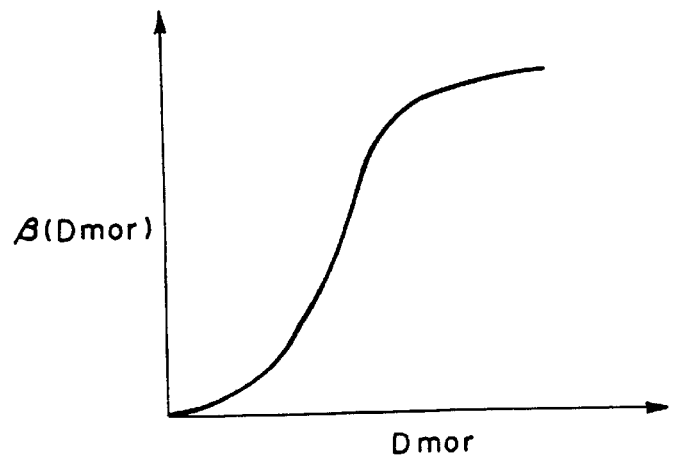
FIG. 16 is a graph showing an emphasis function β(Dmor) in accordance with a morphology signal Dmor.
Figures 17A, 17B:
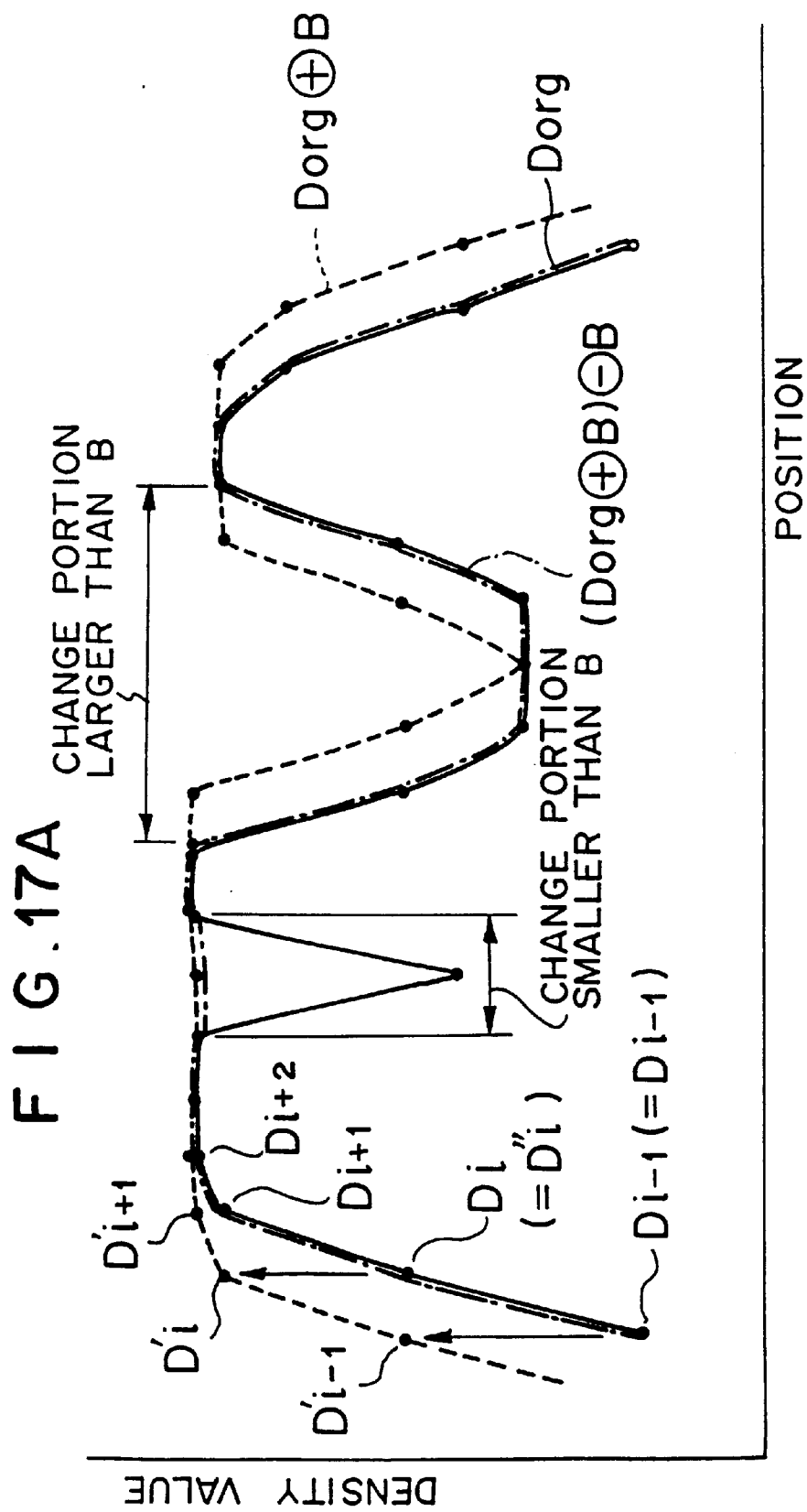
FIG. 17A is a graph showing a distribution of density values, the graph serving as an aid in explaining how the processing with morphology operation is carried out.
FIG. 17B is an explanatory view showing a linear structure element B, which is constituted of three picture elements, FIGS. 18A and 18B provide an explanatory view showing the results of comparison of image emphasis processing, which is carried out with the third embodiment of the image processing method in accordance with the present invention, and image emphasis processing, which utilizes conventional unsharp mask processing.

In the third embodiment described above, the local area limited image emphasizing means 270 carries out the image emphasis processing with Formula (2) and the conversion table having the function shown in FIG. 13. Alternatively, the image emphasis processing may be carried out with Formula (5) and a conversion table having the function shown in FIG. 15A or FIG. 15B. As another alternative, the image emphasis processing may be carried out with Formula (6) and a conversion table having the function shown in FIG. 16.

As a further alternative, in lieu of the conversion table having the function shown in FIG. 13, the local area limited image emphasizing means 270 may be provided with a low pass filter for converting the variation Dmor of the density value into an unsharp mask signal corresponding to superlow frequency of the variation Dmor. The conversion is carried out with Formula (4).

$$f(\text{Dmor}) = (\Sigma\Sigma\text{Dmor})/N^2 \quad (4)$$

wherein $\Sigma\Sigma\text{Dmor}$ represents the sum of the morphology signal values with respect to the picture elements located within a picture element matrix, which has a size of N columns×N rows (where N is equal to, for example, 3) and has its center at the picture element, that is associated with the morphology signal Dmor, in a two-dimensional array of picture elements.

In such cases, with the local area limited image emphasizing means 270, as represented by Formula (2), the signal value f(Dmor) obtained with Formula (4) may be multiplied by the predetermined emphasis coefficient αm, and the resulting product may be added to the original density value Dorg of the local area in the vicinity of the small calcified pattern. In this manner, of the local area limited image $P_2$, only the small calcified pattern $P_1$ may be selectively emphasized.

Figure 19:
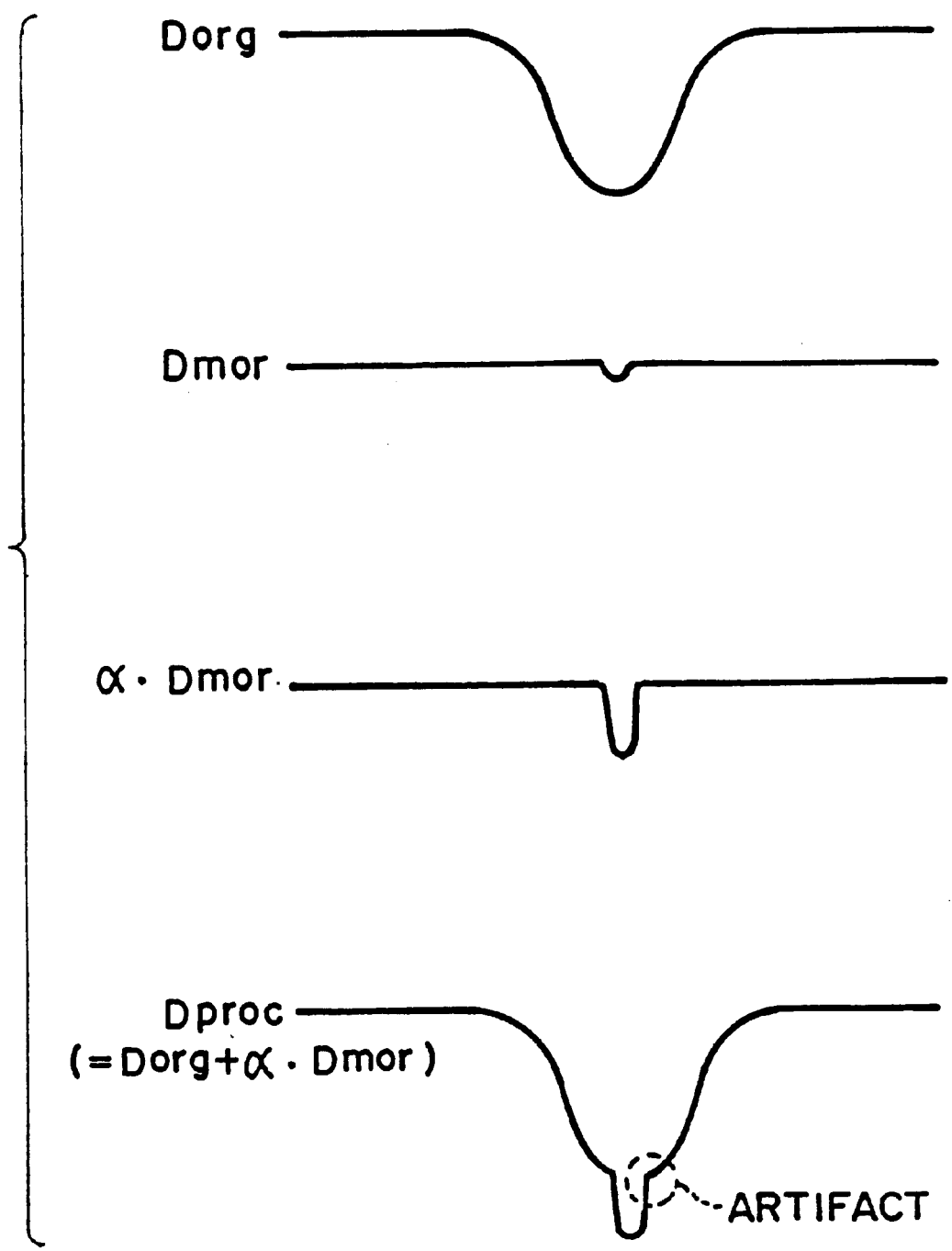
FIG. 19 is an explanatory view showing how a signal value changes in cases where image emphasis processing is carried out merely in accordance with a morphology signal Dmor.
Figure 20A:
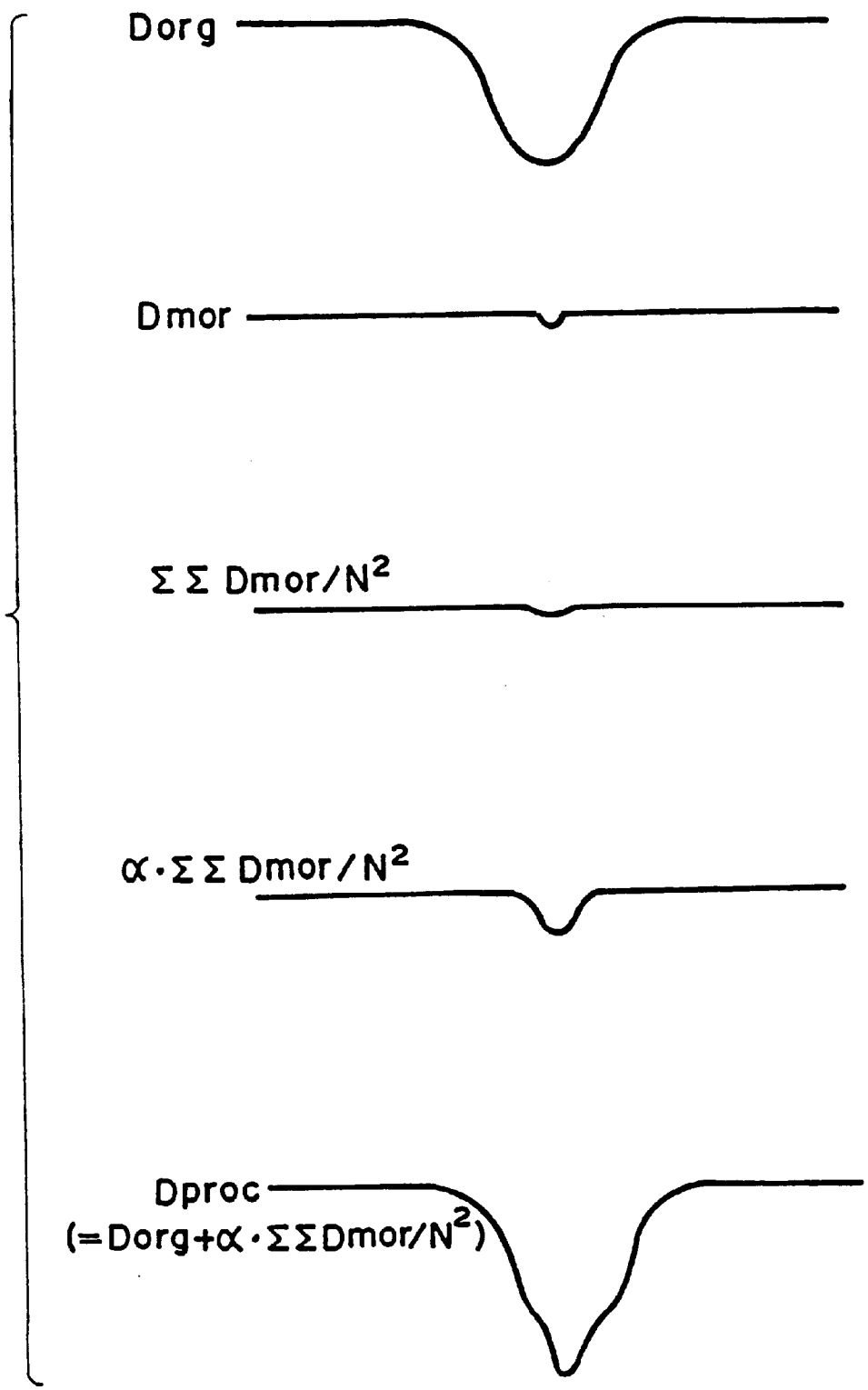
FIG. 20A is an explanatory view showing how a processed image signal Dproc is obtained in cases where image emphasis processing is carried out in accordance with an unsharp mask signal calculated from a morphology signal Dmor.
Figure 20B:
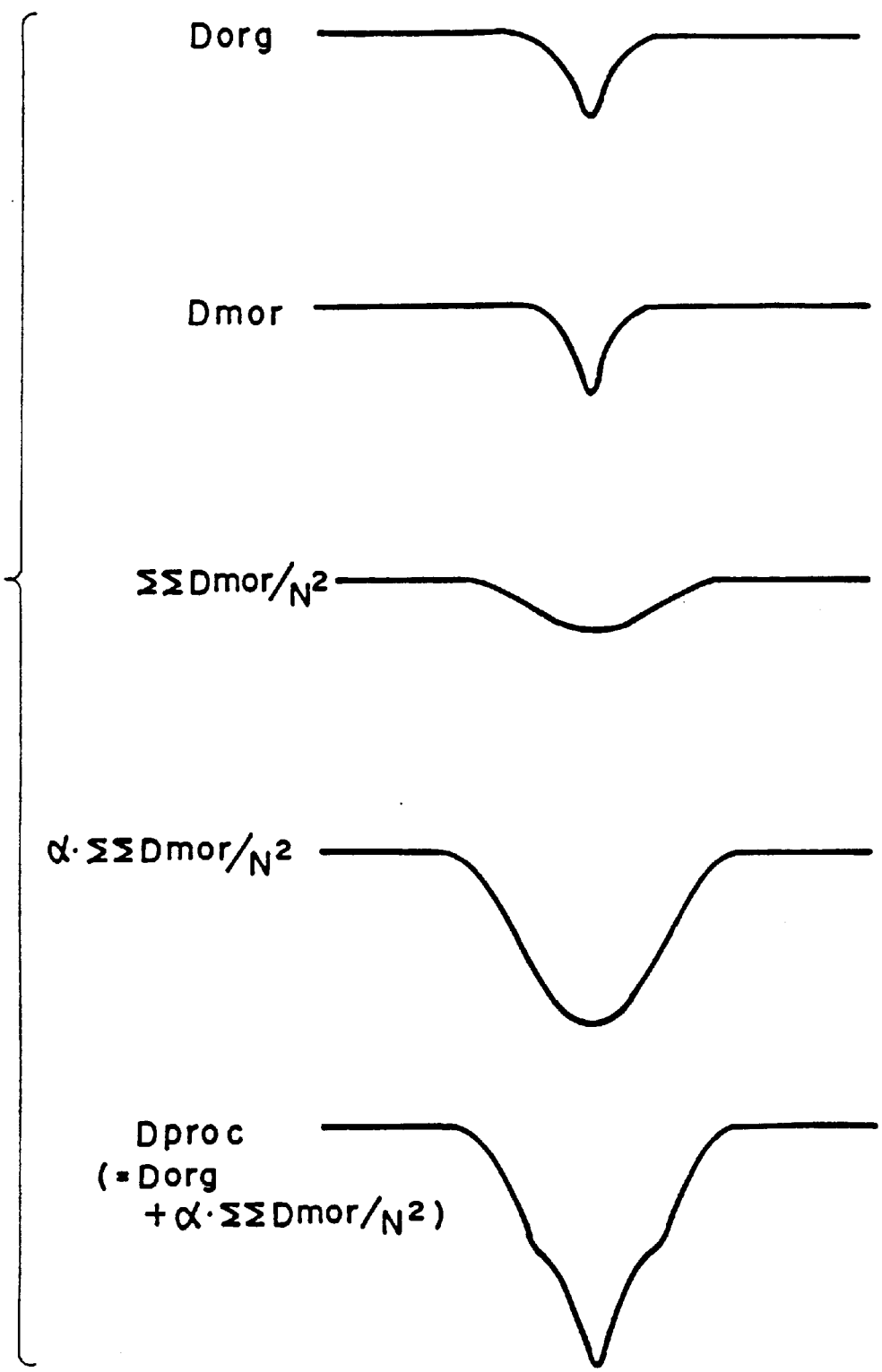
FIG. 20B is an explanatory view showing how the entire area of an image portion, at which the signal value fluctuates in a spatially very narrow range, is emphasized.
Figure 20C:
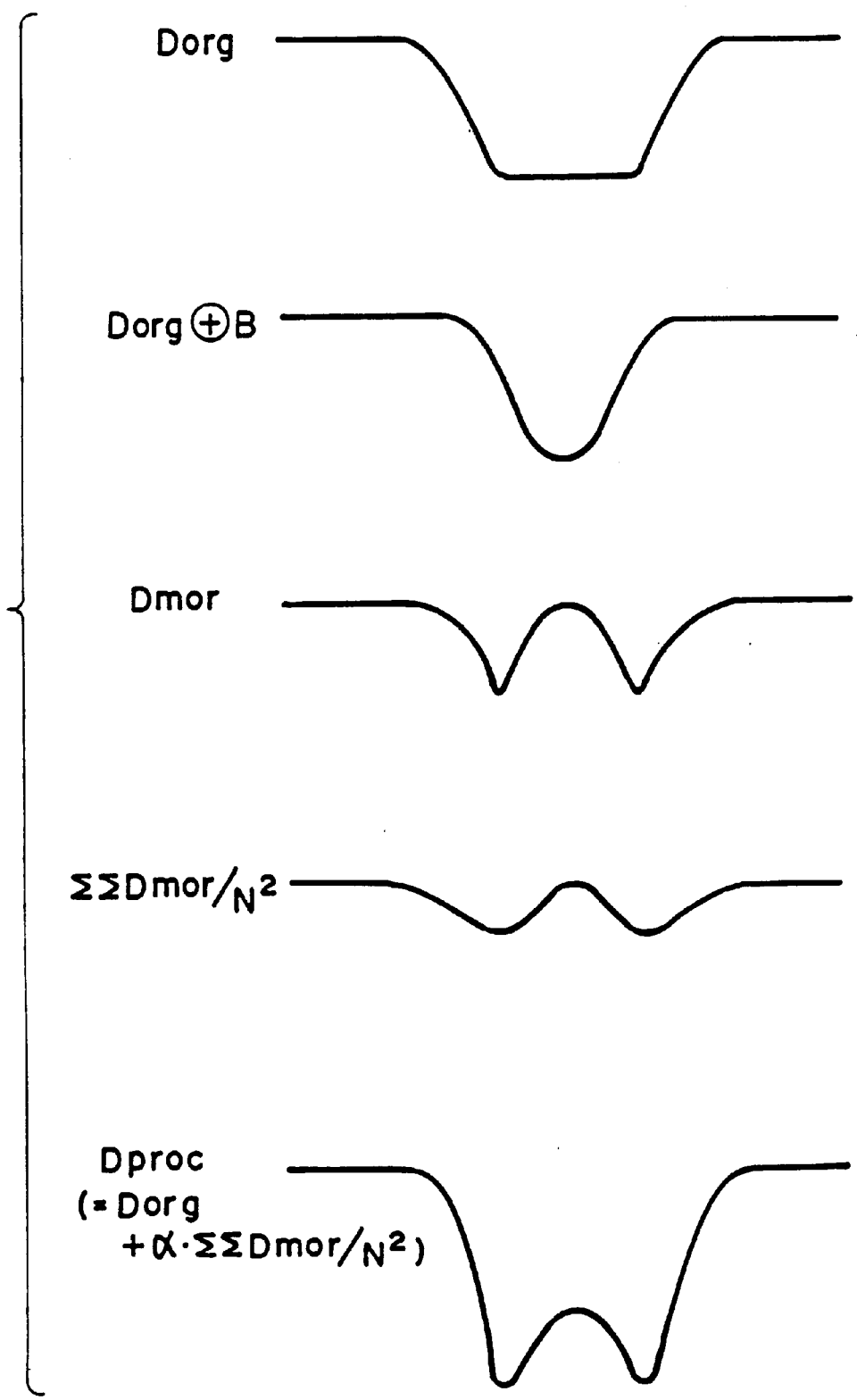
FIG. 20C is an explanatory view showing how the edges of a concave image portion, at which the signal value fluctuates in a spatially comparatively wide range, are emphasized.

In cases where the local area limited image emphasizing means 270 is thus constituted, as illustrated in FIG. 20A, the morphology signal Dmor, which has sharp pulsed characteristics shown in, for example, FIG. 19, is converted to a signal representing the arithmetic mean value of the morphology signal values with respect to the picture elements surrounding the picture element, that is associated with the morphology signal Dmor. Therefore, the pulsed characteristics of the morphology signal Dmor can be rendered unsharp. As a result, a processed image signal Dproc in accordance with the function f(Dmor) can be obtained such that it may represent an emphasized image, in which the occurrence of an artifact at the boundary between the calcified pattern and the other image portions with each other, has been reduced and which gives a natural feeling.

Besides the closing operation described above, the morphology filter 240 may also carry out the dilation processing with Formula (8').

Also, in cases where the image signal is of the high luminance-high signal level type, the opening processing with Formula (7) or the erosion processing with Formula (7') may be carried out.

A fourth embodiment of the image processing method in accordance with the present invention will be described hereinbelow.

FIG. 21 is a block diagram showing an apparatus for computer aided diagnosis of medical images, in which the fourth embodiment of the image processing method in accordance with the present invention is employed. In FIG. 21, similar elements are numbered with the same reference numerals with respect to FIG. 1.

The term "abnormal pattern" as used in the fourth embodiment means a calcified pattern. Also, a morphology filter, which carries out a morphology operation, is employed as an abnormal pattern detecting means 340. The morphology filter 340 feeds out the information representing the value, which has been calculated with Formula (8) with respect to the picture element corresponding to the calcified pattern, as a morphology signal Dmor representing whether the picture element is or is not the one constituting the calcified pattern.

Also, the term "local area" as used in the fourth embodiment means the region, which is located in the vicinity of the calcified pattern taken as the abnormal pattern and contains the calcified pattern.

In the fourth embodiment, the image signal value representing each of the picture element constituting the image is represented by a density signal value Dorg. Also, the image signal, which represents the region constituted of the set of the picture elements, is represented by the image signal S. The density value Dorg is the high density-high signal level type of signal value.

As described above, the processing with the morphology filter 340 is carried out with the detection processing algorithm for detecting a specific image portion. However, in this embodiment, the morphology filter 340 does not indicate the algorithm itself and indicates the means for carrying out the processing for detecting the calcified pattern with the algorithm, i.e., the processing carried out with Formula (8).

Figure 22A:
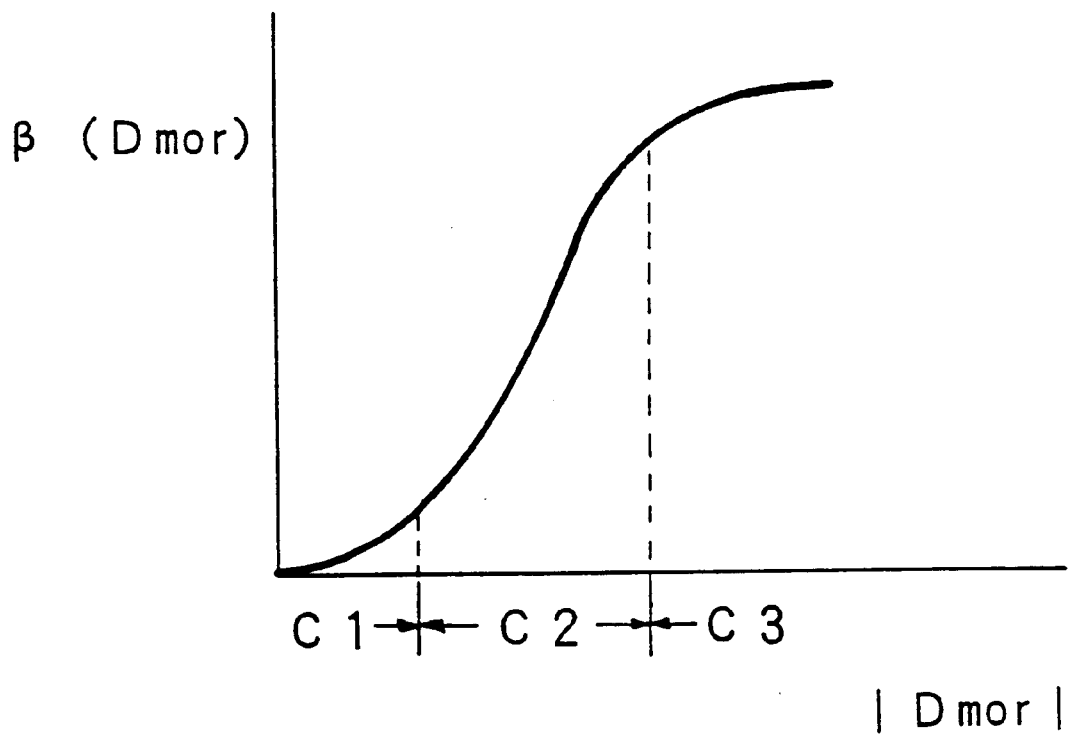
FIGS. 22A and 22B are graphs showing functions representing conversion tables.
Figure 22B:
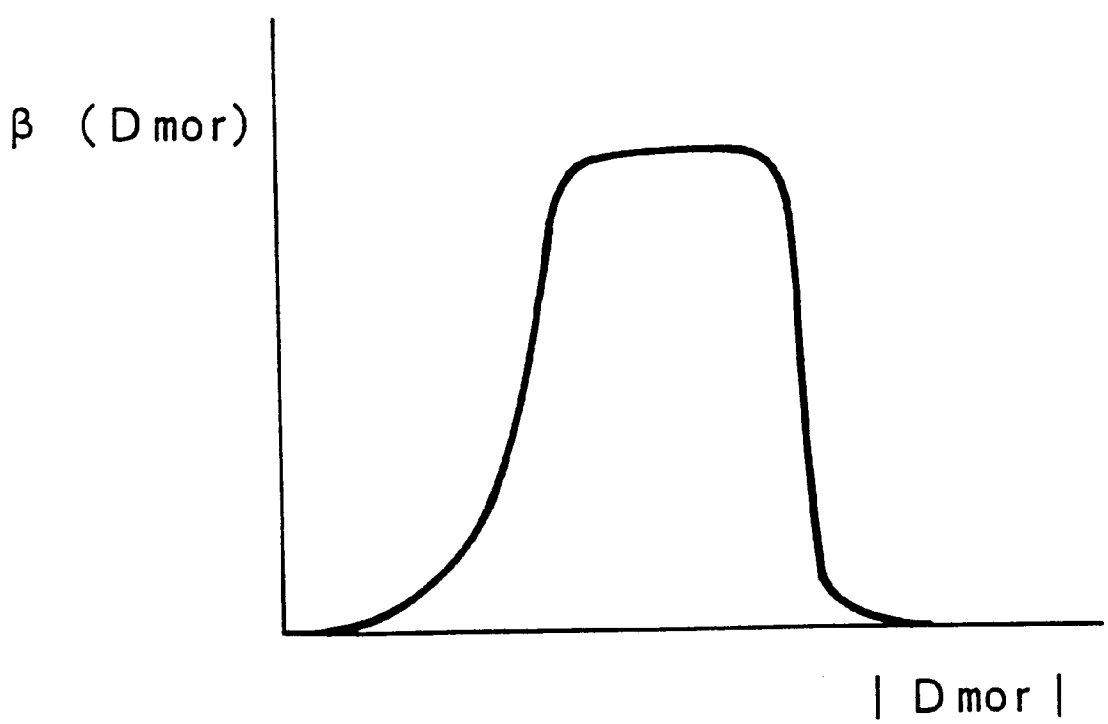
Figure 23:
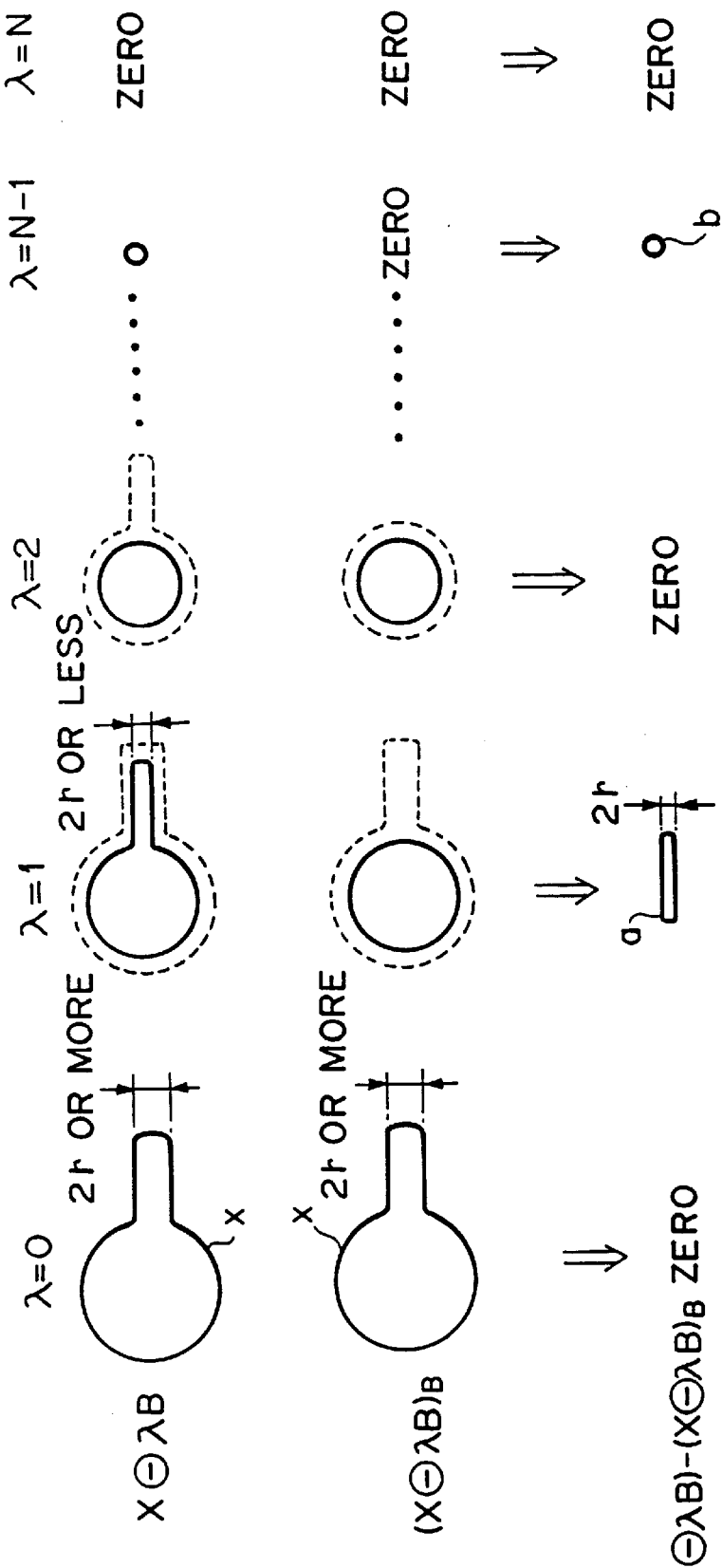
FIG. 23 is an explanatory view showing how a skeleton processing is carried out.

Also, a local area limited image emphasizing means 370 comprises a high frequency component calculating means 371. The high frequency component calculating means 371 carries out an operation on each picture element value (the density value Dorg), which constitutes the local area limited image signal $S_2$, in order to calculate an unsharp mask signal Dus with respect to an unsharp mask constituted of a picture element matrix, which has a size of N columns×N rows (wherein N represents an odd number, for example, 5) and has its center at the picture element, the unsharp mask signal Dus being calculated with Formula (37)

$$Dus=(\Sigma Dorg)/N^2 \quad (37)$$

wherein $\Sigma Dorg$ represents the sum of the image signal values representing the picture elements located within the unsharp mask. The high frequency component calculating means 371 then calculates high frequency components (Dorg−Dus) by subtracting the unsharp mask signal value Dus from the density value Dorg. The local area limited image emphasizing means 370 also comprises a conversion table 372 for converting the morphology signal Dmor, which has been obtained with respect to the picture element representing the calcified pattern extracted by the morphology filter 340, into an emphasis coefficient β(Dmor), which increases monotonously and is shown in FIG. 22A. The local area limited image emphasizing means 370 further comprises a calcified pattern emphasizing means 373 for multiplying the high frequency components (Dorg−Dus) by the emphasis coefficient β(Dmor) and carrying out a frequency emphasis processing to a high extent on the calcified pattern, which has a density value lower than the density value of the surrounding area.

How the apparatus for computer aided diagnosis of medical images, in which the fourth embodiment of the image processing method in accordance with the present invention is employed, operates will be described hereinbelow.

The entire area image signal S, which represents the entire area image P of the mamma having the calcified portion therein and serving as the object, is fed from an external storage medium, such as a magneto-optical disk, an image read-out apparatus, or the like, into the entire area image memory 10. Also, the entire area image signal S is fed directly from the exterior into the entire area image displaying means 30 (along a line A shown in FIG. 21). Alternatively, the entire area image signal S having been stored in the entire area image memory 10 may be fed from the entire area image memory 10 into the entire area image displaying means 30 (along a line B shown in FIG. 21). The entire area image displaying means 30 displays the entire area image P in accordance with the entire area image signal S.

The entire area image signal S having been stored in the entire area image memory 10 is also fed into the morphology filter 340. With Formula (8), the morphology filter 340 detects the image signal (hereinbelow referred to as the calcified pattern image signal) $S_1$, which represents a calcified pattern $P_1$.

As described above with reference to FIGS. 11A and 11B, the morphology filter 340 specifies the picture element (and its position), which corresponds to the image signal $S_1$ representing the small calcified pattern $P_1$. The judgment means 50 judges that the calcified pattern image signal $S_1$ representing the small calcified pattern $P_1$ has been detected by the morphology filter 340. Also, the judgment means 50 feeds a position signal (hereinbelow referred to as the calcified picture element position signal) $D_1$, which specifies the position of the picture element represented by the calcified pattern image signal $S_1$, and the morphology signal Dmor, which represents the variation of the density value of the small calcified pattern $P_1$ having been extracted by the morphology filter 340, into the local area extracting means 60.

In cases where it has been judged that the calcified pattern image signal $S_1$ representing the small calcified pattern $P_1$ has not been detected by the morphology filter 340, the calcified picture element position signal $D_1$, which specifies the position of the picture element represented by the calcified pattern image signal $S_1$, is not fed out, and the processing is finished.

In cases where it has been judged that the calcified pattern image signal $S_1$ has been detected, the entire area image signal S having been stored in the entire area image memory 10 is also fed into the local area extracting means 60. In accordance with the received entire area image signal S and the received calcified picture element position signal $D_1$, the local area extracting means 60 specifies the picture elements (i.e., the local area constituted of the set of these picture elements), which include the picture elements corresponding to the calcified pattern image signal $S_1$ and are located in the vicinity of them, according to a predetermined processing procedure. The local area extracting means 60 thus extracts the local area limited image signal $S_2$, which represents the local area limited image $P_2$, from the entire area image signal S.

The extracted local area limited image signal $S_2$ and the morphology signal Dmor are fed into the local area limited image emphasizing means 370.

With respect to each picture element (the density value Dorg) constituting the local area limited image signal $S_2$ having been fed into the local area limited image emphasizing means 370, the high frequency component calculating means 371 for calculating the high frequency components calculates the unsharp mask signal Dus and then calculates the high frequency components (Dorg−Dus). Thereafter, with the conversion table 372, the morphology signal Dmor having been received from the morphology filter 340 is converted into the emphasis coefficient β(Dmor). As illustrated in FIG. 22A, the conversion table 372 is constituted of the monotonously increasing function. Specifically, a large value of the morphology signal Dmor represents that the picture element is the one corresponding to the calcified pattern. Therefore, when the picture element is the one corresponding to the calcified pattern, a large value of the emphasis coefficient β(Dmor) s fed out from the conversion table 372.

With the conversion table 372, the emphasis coefficient β(Dmor) is restricted to a small value with respect to a region C1, in which the value of the morphology signal Dmor is small. Therefore, as for the region C1, high frequency radiation noise can be reduced. Specifically, actually, as illustrated in FIG. 11C, radiation noise has been superposed upon the distribution curve of the density value shown in FIG. 11B. However, as indicated by the broken line in FIG. 11C, the radiation noise is smoothed by the closing operation of the second term in Formula (8). Therefore, the value of Dmor is varied very finely. However, the amount of the variation is smaller than the variation Dmor due to the small calcified pattern $P_1$. Accordingly, by appropriate setting of the value of the boundary between the regions C1 and C2, it is possible to prevent the high frequency noise from being emphasized.

In the region C3, the change in the emphasis coefficient $\beta$(Dmor) is restricted with respect to the change in the value of Dmor. The restriction is done in order to prevent the image portion, which already has a certain level of contrast, from being emphasized excessively. If the excessive emphasis is carried out, the contrast of the image areas other than the image portion will become comparatively low, and therefore the image quality of the image and its capability of serving as an effective tool in the efficient and accurately diagnosis of an illness will become low.

The calcified pattern emphasizing means 373 calculates the product $\beta$(Dmor)×(Dorg−Dus) of the emphasis coefficient $\beta$(Dmor), which has been obtained from the conversion table 372, and the high frequency components (Dorg−Dus), which have been obtained from the high frequency component calculating means 371. The calcified pattern emphasizing means 373 then adds the density value Dorg of the original image to the product and thus carries out the frequency emphasis processing with Formula (9). [In this embodiment, f(Dorg−Dus) in Formula (9) is set such that f(Dorg−Dus)=Dorg−Dus.]

With the frequency emphasis processing, the comparatively high frequency components (Dorg−Dus) are emphasized with the emphasis coefficient $\beta$(Dmor) obtained in accordance with the morphology signal Dmor, which is obtained from the morphology filter 340 and indicates whether the picture element is or is not the one constituting the calcified pattern. Therefore, even if unnecessary components, such as quantum noise, is contained in the high frequency components (Dorg−Dus), in cases where the picture element is not the one constituting the image portion, such as the calcified pattern, (for example, in cases where the picture element is the one constituting the blood vessel pattern, or the like), the value of $\beta$(Dmor) with respect to the picture element will be small, and the degree of emphasis with respect to the picture element will be kept low. In cases where the picture element is the one constituting the image portion, such as the calcified pattern, the value of $\beta$(Dmor) with respect to the picture element is large, and therefore the degree of emphasis with respect to the picture element is kept high.

Therefore, regardless of whether radiation noise is or is not contained in the high frequency components (Dorg−Dus) of the image, the specific image portion, such as the calcified pattern, can be selectively emphasized with the function $\beta$(Dmor), which has a value in accordance with whether the image area is or is not the specific image portion.

The local area limited image displaying means 90 displays an image, in which the small calcified pattern $P_1$ in the local area limited image $P_2$ has been emphasized by the local area limited image emphasizing means 370.

In this manner, of the entire area image P, only the local area limited image $P_2$ containing the small calcified pattern $P_1$ is independently displayed on the local area limited image displaying means 90. Therefore, the person, who views the radiation image, can concentrate his attention on the local area limited image $P_2$, which is displayed on the local area limited image displaying means 90. As a result, the efficiency and the accuracy of the diagnosis, or the like, can be kept high.

In this embodiment, the entire area image displaying means 30 may also serve as the local area limited image displaying means 90. In such cases, of the entire area image P displayed, only the small calcified pattern $P_1$ is emphasized selectively. Therefore, overshooting and undershooting can be restricted, an artifact due to them can be reduced, and a reproduced image can be obtained, which has good image quality and can serve as an effective tool in the efficient and accurate diagnosis of an illness.

In this embodiment, the morphology operation is carried out with Formula (8). Alternatively, the emphasis processing may be carried out with the morphology operation in accordance with one of Formula (7) and Formulas (10) through (14).

With the processing for detecting the small calcified pattern alone, which is carried out by the morphology filter 340 in accordance with one of morphology operation Formulas (7), (8) and Formulas (10) through (14), it will often occur that a pattern resembling the small calcified pattern is also detected as a calcified pattern. Specifically, an image (hereinbelow referred to as the non-calcified pattern) will often be detected, which is other than the calcified pattern and has approximately the same size as the calcified pattern and for which the value of Dmor calculated with Formulas (7), (8) and Formulas (10) through (14) does not become equal to zero. If the emphasis processing is carried out on such a non-calcified pattern, an accurate diagnosis cannot be made.

Therefore, such that the non-calcified pattern may be prevented from being detected together with the calcified pattern and only the calcified pattern can be detected accurately, the morphology filter 340 may be provided with the discriminating function described below.

Specifically, the differential operation based upon the morphology operation is carried out with Formula (63) shown above. A larger value of Mgrad represents a higher possibility that the picture element will be the one constituting the calcified pattern. Therefore, in lieu of Formulas (7), (8) and Formulas (10) through (14), the logical operation is then carried out with Formula (64).

In cases where the value of Dmor obtained with Formula (64) is equal to zero, the picture element is the one constituting the non-calcified pattern. Therefore, in such cases, the emphasis processing with Formula (9) is not carried out. In cases where the value of Dmor obtained with Formula (64) is not equal to zero, the picture element is the one constituting the calcified pattern. Therefore, in such cases, the emphasis processing with Formula (9) is carried out.

Besides the discrimination with Formulas (63) and (64), the discrimination between the calcified pattern and the non-calcified pattern may be carried out with the combination of the opening processing and the closing processing with the multi-scale.

Specifically, the value of Dmor may be set with Formulas (65), (66), and (67) shown above.

A fifth embodiment of the image processing method in accordance with the present invention will be described hereinbelow.

Figure 26:
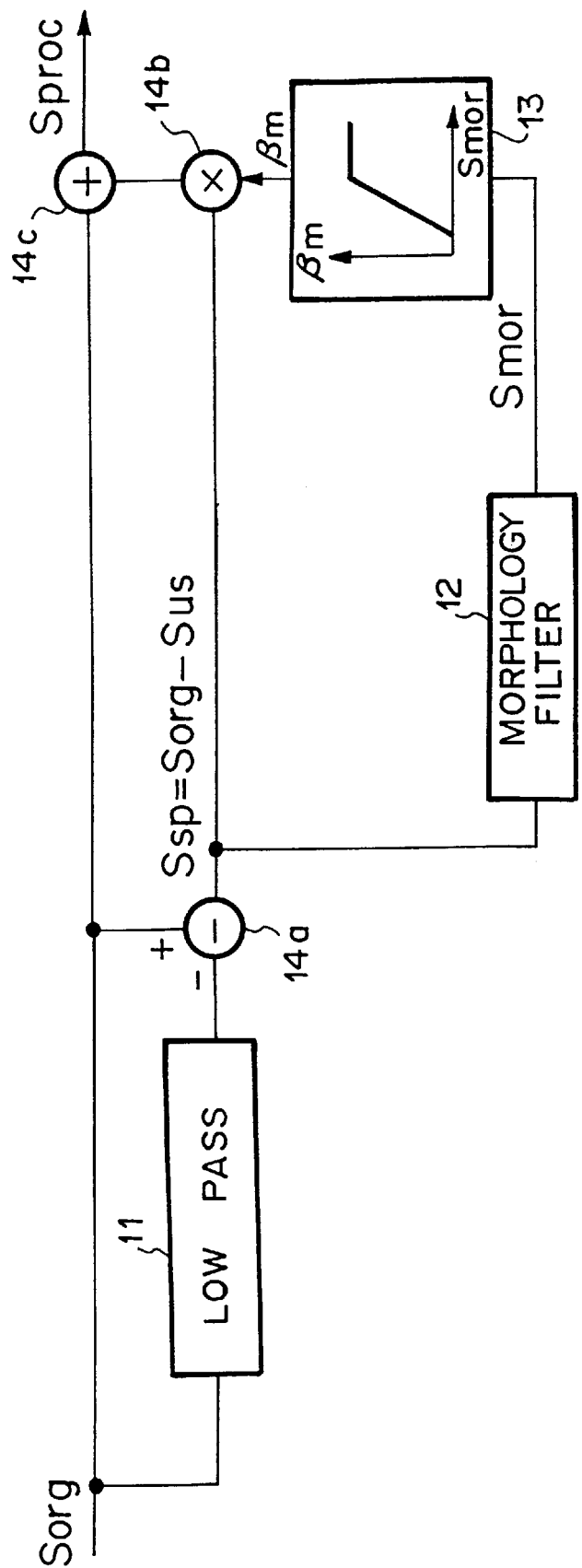
FIG. 26 is a block diagram showing an apparatus for carrying out a fifth embodiment of the image processing method in accordance with the present invention.

FIG. 26 is a block diagram showing an apparatus for carrying out the fifth embodiment of the image processing method in accordance with the present invention. With reference to FIG. 26, the image processing apparatus comprises a low pass filter 11 for obtaining an unsharp mask signal Sus, which corresponds to super-low frequency, from an original image signal Sorg, which represents an image. The image processing apparatus also comprises an operation element 14a for subtracting the unsharp mask signal Sus from the original image signal Sorg. The image processing apparatus further comprises a morphology filter 12 for carrying out a morphology operation on the high frequency components Ssp (=Sorg−Sus), which have been obtained from the operation element 14a, by using a structure element Bi and a scale factor λ. A morphology signal Smor is obtained from the morphology filter 12. The morphology signal Smor represents a characteristic output with respect to an image portion, at which the high frequency components Ssp of the original image signal Sorg fluctuate in a spatially narrower range than the structure element Bi, and/or a characteristic image portion, such as an edge portion, at which a change in the signal value is sharp. The image processing apparatus still further comprises a conversion table 13 for receiving the morphology signal Smor and feeding out information representing an emphasis coefficient βm(Smor), which takes a value in accordance with the morphology signal Smor. The image processing apparatus also comprises operation elements 14b and 14c for carrying out operation processing on the original image signal Sorg by using the emphasis coefficient βm(Smor), which has been obtained from the conversion table 13, a processed image signal Sproc being thereby obtained. The operation processing is carried out with Formula (15).

$$Sproc = Sorg + \beta(Smor) \times Ssp \tag{15}$$

wherein β(Smor) represents the emphasis coefficient in accordance with the morphology signal Smor.

By way of example, the original image signal Sorg representing the image may be one which has been detected from a radiation image by a predetermined image read-out apparatus and has then been stored in a predetermined storage means. Alternatively, the original image signal Sorg may be directly received from the image read-out apparatus. Also, in this embodiment, the radiation image is a mammogram. The low pass filter 11 sets an unsharp mask constituted of a picture element matrix having a size of, for example, 3 columns×3 rows and calculates an unsharp mask signal Sus from the original image signal Sorg. The unsharp mask signal Sus is calculated with Formula (68) (in this example, N=3)

$$Sus = (\Sigma Sorg)/N^2 \tag{68}$$

wherein ΣSorg represents the sum of the image signal values representing the picture elements located within the unsharp mask.

Figure 27:
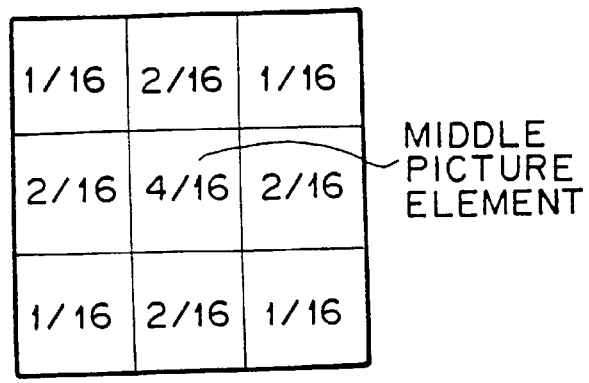
FIG. 27 is an explanatory view showing a matrix of values of weight factor for picture elements located within an unsharp mask.

As the unsharp mask signal Sus, the simple mean value of the signal values of the picture elements located within the unsharp mask may be calculated with Formula (68). Alternatively, as illustrated in FIG. 27, the unsharp mask signal Sus may be calculated from the matrix, in which the values of the picture elements located within the unsharp mask are weighted in accordance with the length of distance from the middle picture element.

The morphology filter 12 carries out the operation processing in accordance with the dilation processing on the high frequency components Ssp of the original image signal Sorg by using the structure element B, which is composed of a picture element matrix having a size of, for example, 5 columns×5 rows and the scale factor λ. The operation processing is carried out with Formula (16)

$$Smor = |Ssp - \min(Ssp \oplus \lambda Bi)| \tag{16}$$

i=1, . . . ,n

In this manner, the morphology filter 12 feeds out the morphology signal Smor. The morphology signal Smor takes a large value with respect to an image portion (for example, as for a mammogram, a small calcified pattern indicating a mammary cancer), at which the high frequency components Ssp of the original image signal Sorg fluctuate in a spatially narrower range than the structure element Bi, and/or a characteristic image portion, such as an edge portion, at which a change in the signal value is sharp. Also, the morphology signal Smor takes a very small value with respect to an image portion, in which the values of the high frequency components Ssp are larger than the values for the surrounding image areas, or at which the high frequency components Ssp fluctuate in a spatially wider range than the structure element Bi. The structure element B is set previously in accordance with the shape and the size of the desired small calcified portion, which is to be emphasized.

Figure 28A:
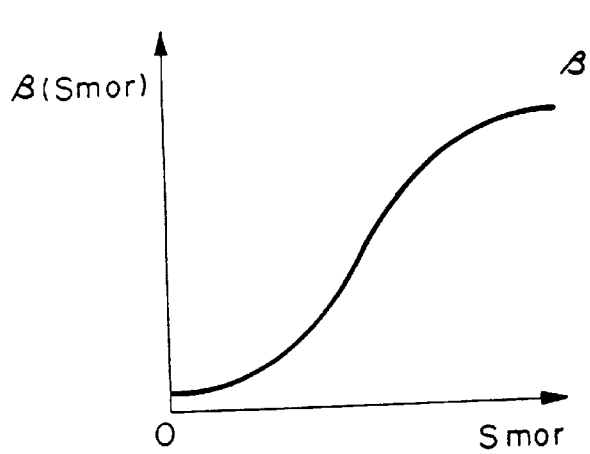
FIGS. 28A and 28B are graphs showing functions representing conversion tables.

By way of example, as illustrated in FIG. 28A, the conversion table 13 is constituted of a function having been set such that it may be increased monotonously in accordance with an increase in the value of the morphology signal Smor. Specifically, the output of the conversion table 13 is restricted to a small value with respect to a region (i.e., a radiation noise region), in which the value of the morphology signal Smor is small. Also, the output of the conversion table 13 is increased with respect to a region, in which the value of the morphology signal Smor is large and which corresponds to a desired image portion, such as a calcified pattern. (In FIG. 26, the function of the conversion table 13 is illustrated roughly.)

The operation element 14b carries out the multiplication of the output of the operation element 14a and the output of the conversion table 13. The operation element 14c carries out the addition of the original image signal Sorg and the output of the operation element 14b.

How the image processing apparatus, in which the fifth embodiment of the image processing method in accordance with the present invention is employed, operates will be described hereinbelow.

When the original image signal Sorg is fed into the image processing apparatus, the low pass filter 11 sets the unsharp mask constituted of a picture element matrix having a size of 3 columns×3 rows and calculates the unsharp mask signal Sus from the original image signal Sorg. The unsharp mask signal Sus is calculated with Formula (68), wherein N=3. Since the unsharp mask signal Sus is obtained with the unsharp mask constituted of a picture element matrix having a size of 3 columns×3 rows, the unsharp mask signal Sus is a comparatively high frequency signal.

The operation element 14a subtracts the unsharp mask signal Sus, which is the output of the low pass filter 11, from the original image signal Sorg. Of the original image signal Sorg, only the high frequency components Ssp (=Sorg−Sus) are fed out from the operation element 14a.

The morphology filter 12 carries out the operation processing on the high frequency components Ssp, which have been obtained from the operation element 14a, by using the structure element B, which is composed of a picture element matrix having a size of 5 columns×5 rows and the scale factor λ. The operation processing is carried out with Formula (16). In this manner, the morphology filter 12 feeds out the morphology signal Smor, which takes a value in accordance with the characteristic shape of the image portion and the variation of the signal value. Specifically, the morphology signal Smor takes a large value with respect to an image portion, which constitutes a small calcified pattern, i.e., an abnormal pattern, and/or an image portion, at which a change in the contrast is sharp. Also, the morphology signal Smor takes a very small value with respect to the other image portions.

The morphology signal Smor having been obtained from the morphology filter 12 is fed into the conversion table 13. The conversion table 13 feeds out the information representing the emphasis coefficient βm(Smor) having a value in accordance with the value of the received morphology signal Smor. In this embodiment, as for the small calcified pattern, the emphasis coefficient β(Smor) takes a value approximately equal to the upper limit value. As for the other image portions, the emphasis coefficient βm(Smor) takes a very small value.

The operation element 14b multiplies the high frequency components Ssp, which have been obtained from the operation element 14a, by the emphasis coefficient βm(Smor) having been obtained from the conversion table 13. In this manner, the high frequency components Ssp are weighted.

Thereafter, the operation element 14c adds the original image signal Sorg and the output of the operation element 14b to each other and feeds out the processed image signal Sproc. In the processed image signal Sproc, of the high frequency components Ssp of the original image signal Sorg, only the components corresponding to the small calcified pattern and/or the image portion, at which the change in the contrast is sharp, have been emphasized by the processing described above.

As described above, with the image processing apparatus, in which the fifth embodiment of the image processing method in accordance with the present invention is employed, the emphasis of radiation noise falling within the frequency band of the high frequency components Ssp can be restricted, and only the characteristic image portion, such as the small calcified pattern, can be emphasized efficiently. Therefore, the image processing apparatus is useful for computer aided diagnosis of medical images, or the like.

In lieu of Formula (16), the operation of the morphology filter 12 may be carried out with one of Formulas (17), (18), (19), and (20).

$$Smor=|Ssp-max(Ssp\ominus\lambda Bi)| \qquad (17)$$

i=1, . . . ,n $$Smor=|Ssp-max\{(Ssp\ominus\lambda Bi)\oplus\lambda Bi\}| \qquad (18)$$

i=1, . . . ,n $$Smor=|Ssp-min\{(Ssp\oplus\lambda Bi)\ominus\lambda Bi\}| \qquad (19)$$

i=1, . . . ,n $$Smor=|Ssp\oplus\lambda Bi-Ssp\ominus\lambda Bi| \qquad (20)$$

Figure 30:
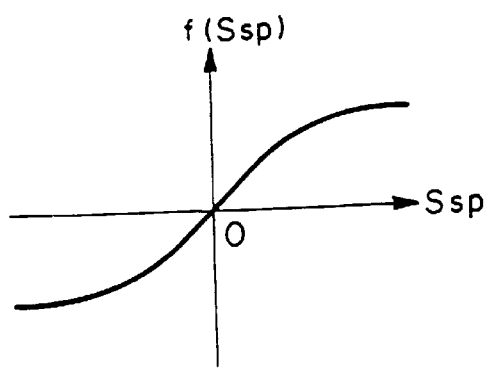
FIG. 30 is a graph showing a function representing a second conversion table.
Figure 29:
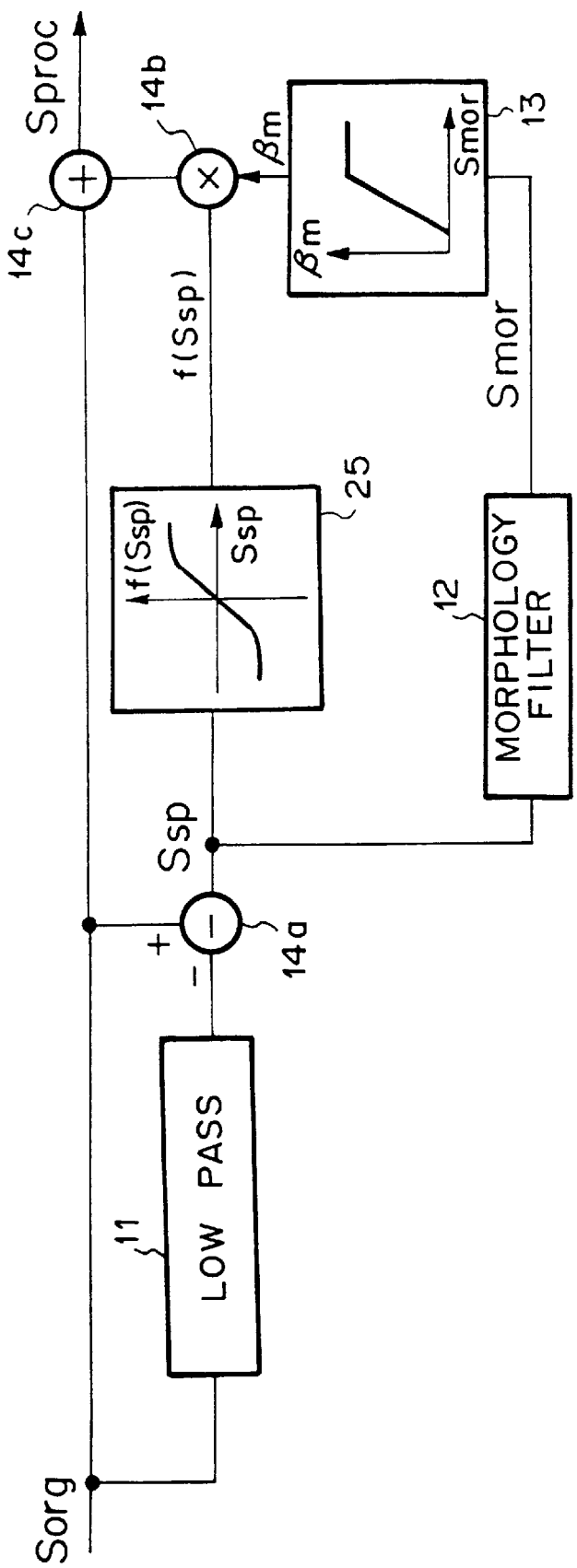
FIG. 29 is a block diagram showing an apparatus for carrying out a sixth embodiment of the image processing method in accordance with the present invention.
Figure 31A:
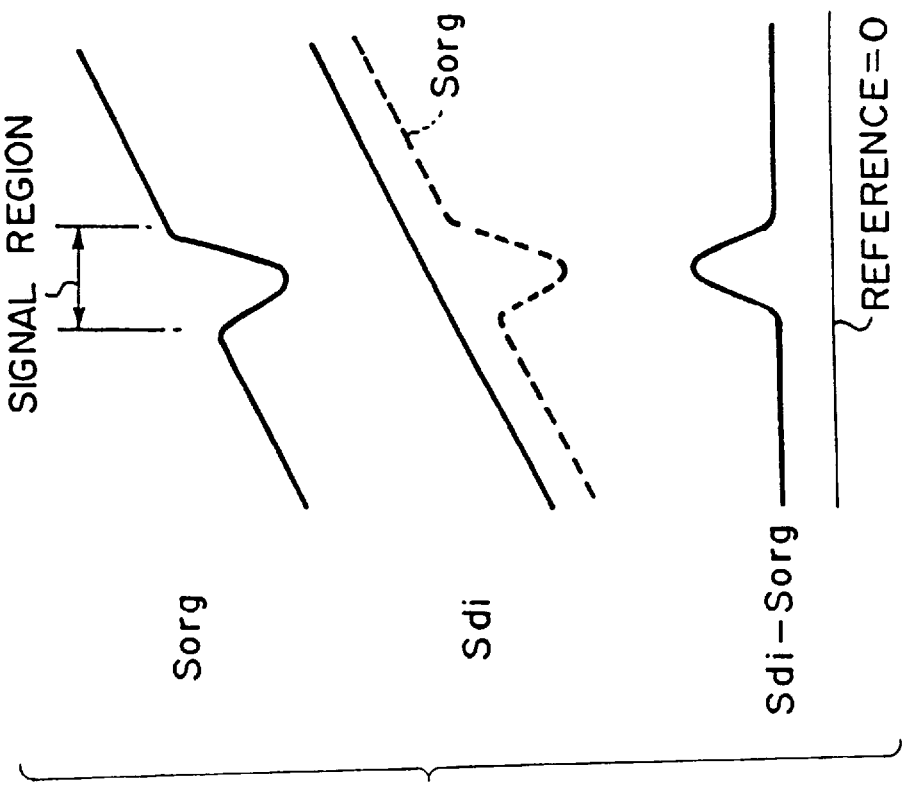
FIG. 31A is an explanatory view showing how a morphology signal is obtained in cases where a characteristic image portion to be emphasized is located in an image portion having uniform density.
Figure 31B:
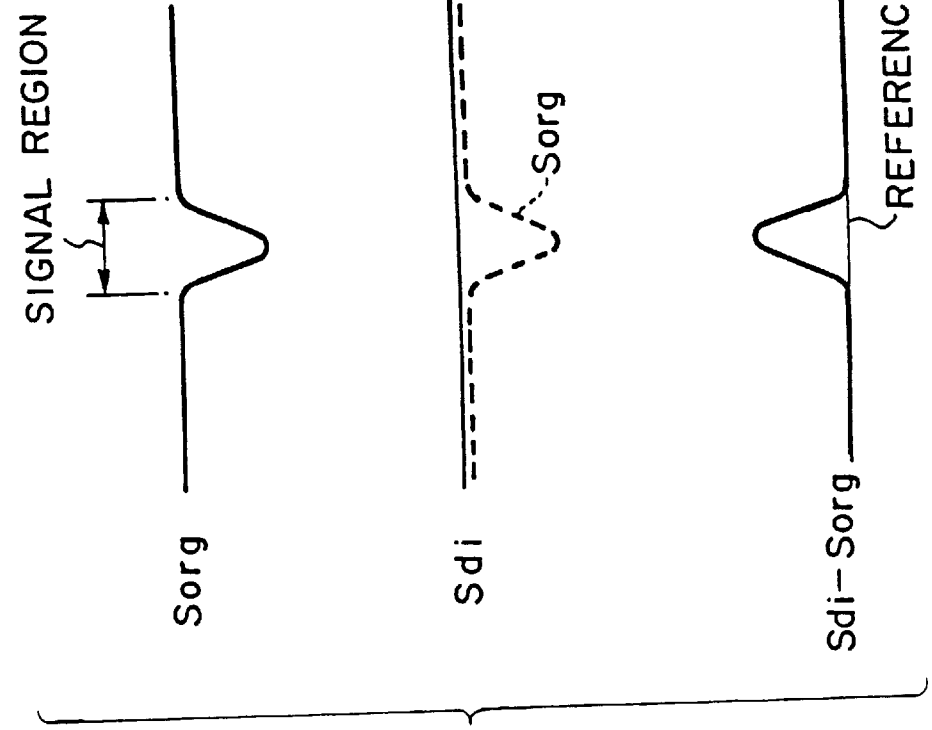
FIG. 31B is an explanatory view showing how a morphology signal is obtained in cases where a characteristic image portion to be emphasized is located in an image portion having a gentle density gradient.

In cases where the operation is carried out with Formula (20), a sixth embodiment of the image processing method in accordance with the present invention, which is shown in FIG. 29, should preferably be employed. Specifically, in the sixth embodiment, instead of the image emphasis processing in accordance with the morphology signal Smor being carried out directly on the high frequency components Ssp having been obtained from the operation element 14a, the high frequency components Ssp are converted into high frequency components f(Ssp) by a second conversion table 25, which has a function shown in, for example, FIG. 30. The image emphasis processing in accordance with the morphology signal Smor having been obtained from the morphology operation, which is carried out with Formula (20) by the morphology filter 12, is then carried out on the high frequency components f(Ssp).

With the sixth embodiment, in cases where the values of the high frequency components Ssp before being converted fall within a range larger than a predetermined value or within a range smaller than a predetermined value, even if extreme emphasis is carried out, the occurrence of overshooting and undershooting can be restricted.

Figure 28B:
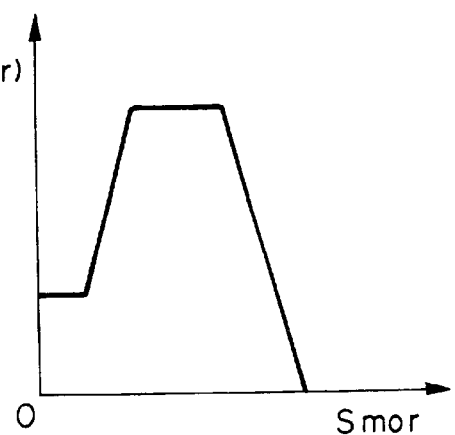

In lieu of the function shown in FIG. 28A, the conversion table 13 may have a function shown in FIG. 28B.

A seventh embodiment of the image processing method in accordance with the present invention will be described hereinbelow.

FIG. 34A is a block diagram showing an apparatus for carrying out the seventh embodiment of the image processing method in accordance with the present invention and FIG. 34B shows an example of a low pass filter. With reference to FIG. 34A, the image processing apparatus comprises a first low pass filter 11a, a second low pass filter 11b, and a third low pass filter 11c for obtaining unsharp mask signals Sus, which correspond to super-low frequency of the input signals. The image processing apparatus also comprises an operation element $14a_1$, for calculating the difference between the input signal to the low pass filter 11a and the output signal from the low pass filter 11a, an operation element $14a_2$ for calculating the difference between the input signal to the low pass filter 11b and the output signal from the low pass filter 11b, and an operation element $14a_3$ for calculating the difference between the input signal to the low pass filter 11c and the output signal from the low pass filter 11c. In this manner, the operation elements $14a_1$, $14a_2$, $14a_3$ respectively calculates high frequency components $S_H$ corresponding to a high frequency band $f_H$ of the original image signal Sorg, middle frequency components $S_M$ corresponding to a middle frequency band $f_M$ of the original image signal Sorg, and low frequency components $S_L$ corresponding to a low frequency band $f_L$ of the original image signal Sorg. The image processing apparatus further comprises a morphology filter 12 for carrying out a morphology operation on the original image signal Sorg, by using a structure element Bi and a scale factor λ. A morphology signal Smor is obtained from the morphology filter 12. The morphology signal Smor takes a large value with respect to an image portion, at which the original image signal Sorg fluctuates in a spatially narrower range than the structure element Bi, and/or an image portion, such as an edge portion, at which a change in the signal value is sharp. Also, the morphology signal Smor takes a value of zero or a very small value with respect to the other image portions. The image processing apparatus still further comprises a first conversion table 13a, a second conversion table 13b, and a third conversion table 13c for receiving the morphology signal Smor and respectively feeding out information representing emphasis coefficients $\alpha m_1(Smor)$, $\alpha m_2(Smor)$, and $\alpha m_3(Smor)$, which takes values in accordance with the morphology signal Smor and which respectively correspond to the frequency bands $f_H$, $f_M$, and $f_L$. [As an aid in facilitating the explanation, $\alpha m_1(Smor)$, $\alpha m_2(Smor)$, and $\alpha m_3(Smor)$ will hereinbelow be referred to simply as $\alpha m_1$, $\alpha m_2$, and $\alpha m_3$]. The image processing apparatus also comprises an operation element $14b_1$ for multiplying the high frequency components $S_H$, which have been obtained from the operation element $14a_1$, by the emphasis coefficient $\alpha m_1$, which has been obtained from the first conversion table 13a. The image processing apparatus further comprises an operation element $14b_2$ for multiplying the middle frequency components $S_M$, which have been obtained from the operation element $14a_2$, by the emphasis coefficient $\alpha m_2$, which has been obtained from the second conversion table 13b. The image processing apparatus still further comprises an operation element $14b_3$ for multiplying the low frequency components $S_L$, which have been obtained from the operation element $14a_3$, by the emphasis coefficient $\alpha m_3$, which has been obtained from the third conversion table 13c. The image processing apparatus also comprises operation elements $14c_1$, $14c_2$, and $14c_3$ for adding the outputs, which are obtained from the operation elements $14b_1$, $14b_2$, and $14b_3$, to the output obtained from the third low pass filter 11c.

By way of example, the original image signal Sorg representing the image may be one which has been detected from a radiation image by a predetermined image read-out apparatus and has then been stored in a predetermined storage means. Alternatively, the original image signal Sorg may be directly received from the image read-out apparatus. Also, in this embodiment, the radiation image is a mammogram. Each of the low pass filters 11a, 11b, and 11c sets an unsharp mask constituted of a picture element matrix having a size of, for example, 3 columns×3 rows and calculates an unsharp mask signal Sus from the original image signal Sorg. The unsharp mask signal Sus is calculated with Formula (68) (in this example, N=3)

$$\text{Sus}=(\Sigma\text{Sorg})/N^2 \qquad (68)$$

wherein $\Sigma$Sorg represents the sum of the image signal values representing the picture elements located within the unsharp mask.

As the unsharp mask signal Sus, the simple mean value of the signal values of the picture elements located within the unsharp mask may be calculated with Formula (68). Alternatively, as illustrated in FIG. 34B, the unsharp mask signal Sus may be calculated from the matrix, in which the values of the picture elements located within the unsharp mask are weighted in accordance with the length of distance from the middle picture element.

The outputs of the low pass filters 11a, 11b, and 11c are respectively referred to as Sus1, Sus2, and Sus3.

The morphology filter 12 carries out the operation processing in accordance with the closing processing on the original image signal Sorg by using the structure element B, which is composed of a picture element matrix having a size of, for example, 5 columns×5 rows and the scale factor $\lambda$. The operation processing is carried out with Formula (58)

$$\text{Smor}=|\text{Sorg}-\min\{(\text{Sorg}\oplus\lambda\text{Bi})\ominus\lambda\text{Bi}\}| \qquad (58)$$

i=1, . . . ,n

In this manner, the morphology filter 12 feeds out the morphology signal Smor. The morphology signal Smor takes a large value with respect to an image portion (for example, as for a mammogram, a small calcified pattern indicating a mammary cancer), in which the value of the original image signal Sorg is smaller than the signal values of the surrounding image areas, and at which the original image signal Sorg fluctuates in a spatially narrower range than the structure element Bi. Also, the morphology signal Smor takes a very small value with respect to an image portion, in which the value of the original image signal Sorg is larger than the signal values of the surrounding image areas, or at which the original image signal Sorg fluctuates in a spatially wider range than the structure element Bi. The structure element B is set previously in accordance with the shape and the size of the desired small calcified portion, which is to be emphasized.

Figure 35A:
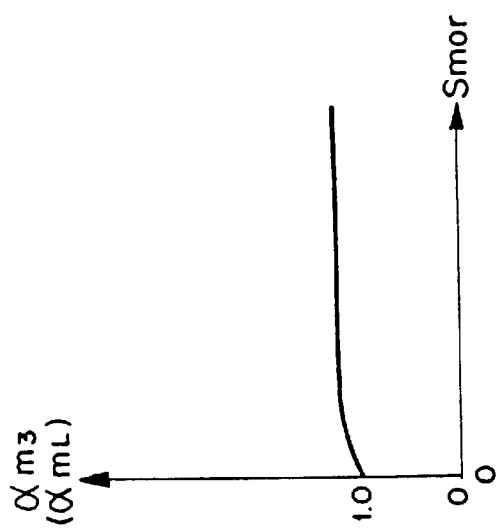
FIG. 35A is a graph showing a function representing a first conversion table.
Figure 35B:
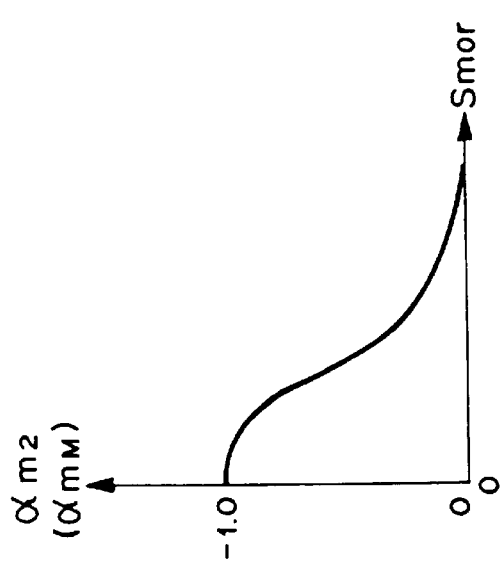
FIG. 35B is a graph showing a function representing a second conversion table.
Figure 35C:
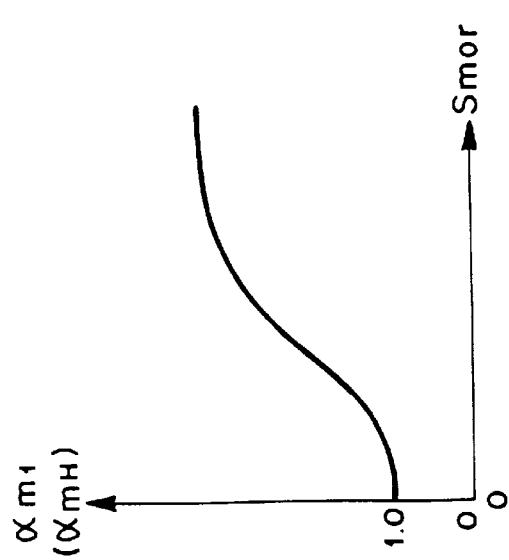
FIG. 35C is a graph showing a function representing a third conversion table.

By way of example, as illustrated in FIG. 35A, the first conversion table 13a is constituted of a function having been set such that it may feed out the emphasis coefficient $\alpha m_1$, which takes a value in accordance with the morphology signal Smor, with respect to the high frequency band $f_H$. Also, as illustrated in FIG. 35B, the second conversion table 13b is constituted of a function having been set such that it may feed out the emphasis coefficient $\alpha m_2$, which takes a value in accordance with the morphology signal Smor, with respect to the middle frequency band $f_M$. Further, as illustrated in FIG. 35C, the third conversion table 13c is constituted of a function having been set such that it may feed out the emphasis coefficient $\alpha m_3$, which takes a value in accordance with the morphology signal Smor, with respect to the low frequency band $f_L$.

How the image processing apparatus, in which the seventh embodiment of the image processing method in accordance with the present invention is employed, operates will be described hereinbelow.

When the original image signal Sorg is fed into the image processing apparatus, the original image signal Sorg is successively fed into the first low pass filter 11a, the second low pass filter 11b, and the third low pass filter 11c. The first low pass filter 11a sets the unsharp mask constituted of a picture element matrix having a size of 3 columns×3 rows and calculates the first unsharp mask signal Sus1 from the original image signal Sorg. The first unsharp mask signal Sus1 is calculated with Formula (68). Since the first unsharp mask signal Sus1 is obtained with the unsharp mask constituted of a picture element matrix having a size of 3 columns×3 rows, the first unsharp mask signal Sus1 is constituted of the signal components other than the predetermined high frequency components $S_H$. The operation element $14a_1$ subtracts the first unsharp mask signal Sus1 from the original image signal Sorg, and only the high frequency components $S_H$ are thereby obtained from the operation element $14a_1$.

The first unsharp mask signal Sus1 having been obtained from the first low pass filter 11a is fed into the second low pass filter 11b. In the same manner as that with the first low pass filter 11a, the second low pass filter 11b feeds out the second unsharp mask signal Sus2, in which the middle frequency components $S_M$, i.e. the high frequency components in the first unsharp mask signal Sus1, have been removed. The operation element $14a_2$ subtracts the second unsharp mask signal Sus2 from the first unsharp mask signal Sus1, and only the middle frequency components $S_M$ are thereby obtained from the operation element $14a_2$.

In the same manner as that described above, only the low frequency components $S_L$ are extracted by the third low pass filter 11c and the operation element $14a_3$. The third unsharp mask signal Sus3 having been obtained from the third low pass filter 11c is constituted of the lowest frequency components, which are not contained in the low frequency components $S_L$ and which will hereinbelow be referred to as the super-low frequency components $S_{LL}$ (=Sus3).

In this manner, the original image signal Sorg is divided into the frequency components $S_H$, $S_M$, $S_L$, and $S_{LL}$, which fall within four different frequency bands.

In this embodiment, the frequency components $S_H$, $S_M$, $S_L$, and $S_{LL}$ are divided from one another such that their frequency bands may not overlap one upon another. However, in the image processing method in accordance with the present invention, the frequency components need not necessarily be divided from one another such that their frequency bands may not overlap one upon another. The frequency components may be divided from one another such that portions of their frequency bands may overlap one upon another.

The original image signal Sorg is also fed into the morphology filter 12. The morphology filter 12 carries out the operation processing on the original image signal Sorg by using the structure element B, which is composed of a picture element matrix having a size of, for example, 5 columns×5 rows and the scale factor λ. The operation processing is carried out with Formula (58). In this manner, the morphology filter 12 feeds out the morphology signal Smor, which takes a value in accordance with the characteristic shape of the image portion and the variation of the signal value. Specifically, the morphology signal Smor takes a large value with respect to an image portion, which constitutes a small calcified pattern, i.e., an abnormal pattern. Also, the morphology signal Smor takes a very small value with respect to the other image portions.

The morphology signal Smor having been obtained from the morphology filter 12 is fed into the first conversion table 13a, the second conversion table 13b, and the third conversion table 13c.

The first conversion table 13a feeds out the information representing the emphasis coefficient $\alpha m_1$, which has a value in accordance with the value of the received morphology signal Smor and which corresponds to the high frequency components $S_H$. The second conversion table 13b feeds out the information representing the emphasis coefficient $\alpha m_2$, which has a value in accordance with the value of the received morphology signal Smor and which corresponds to the middle frequency components $S_M$. Also, the third conversion table 13c feeds out the information representing the emphasis coefficient $\alpha m_3$, which has a value in accordance with the value of the received morphology signal Smor and which corresponds to the low frequency components $S_L$.

The emphasis coefficient corresponding to the super-low frequency components $S_{LL}$ may be represented by $\alpha m_4$, and a fourth conversion table for feeding out the information representing the emphasis coefficient $\alpha m_4$, which has a value in accordance with the value of the received morphology signal Smor, may be provided. However, in this embodiment, it is not necessary for the super-low frequency components $S_{LL}$ to be emphasized independently. Therefore, the emphasis coefficient $\alpha m_4$ is set such that $\alpha m_4=1$ (a fixed number), and the operation processing with the emphasis coefficient $\alpha m_4$ is omitted. This is because, in cases where a signal is divided into frequency components, which fall within n number of different frequency bands, and the degrees of emphasis for the frequency components, which fall within n−1 number of different frequency bands, are set to be low so as to serve as the degrees of restriction, the degree of emphasis for the frequency components, which fall within the remaining single frequency band, can be controlled relatively.

The emphasis coefficients $\alpha m_1$, $\alpha m_2$, and $\alpha m_3$, which have been obtained from the conversion tables 13a, 13b, and 13c, are respectively fed into the corresponding operation elements $14b_1$, $14b_2$, and $14b_3$. Also, the operation elements $14b_1$, $14b_2$, and $14b_3$ respectively receive the high frequency components $S_H$, the middle frequency components $S_M$, and the low frequency components $S_L$ from the corresponding operation elements $14a_1$, $14a_2$, and $14a_3$. The operation element $14b_1$ multiplies the high frequency components $S_H$ by the emphasis coefficient $\alpha m_1$. The operation element $14b_2$ multiplies the middle frequency components $S_M$ by the emphasis coefficient $\alpha m_2$. Also, the operation element $14b_3$ multiplies the low frequency components $S_L$ by the emphasis coefficient $\alpha m_3$. The products obtained from the operation elements $14b_1$, $14b_2$, and $14b_3$ are respectively fed into the operation elements $14c_1$, $14c_2$, and $14c_3$. This operation is equivalent to the weighting of the frequency components, which fall within the respective frequency bands, in accordance with the morphology signal Smor.

The operation elements $14c_1$, $14c_2$, and $14c_3$ calculate the total sum of the outputs having been obtained from the operation elements $14b_1$, $14b_2$, and $14b_3$ and adds the obtained total sum to the super-low frequency components $S_{LL}$, which has been obtained from the third low pass filter 11c. In this manner, the processed image signal Sproc is calculated with Formula (69).

$$Sproc = S_H \times \alpha m_1 + S_M \times \alpha m_2 + S_L \times \alpha m_3 + S_{LL} \qquad (69)$$

The processed image signal Sproc is obtained by carrying out the image emphasis processing on the frequency components of the original image signal Sorg, which fall within the respective frequency bands, and in accordance with the morphology signal Smor. Only the desired signal components, which fall within each of the frequency bands, can be emphasized selectively and to a desired degree of emphasis by appropriately selecting the size of the structure element B, the size of the unsharp mask, the number of the frequency bands, into which the signal is divided, the shape of the emphasis function of each conversion table, or the like. Therefore, the adjustment of emphasis can be carried out more finely and the efficient and the accuracy of the diagnosis, or the like, can be kept higher than with the conventional image emphasis processing.

Formula (69) can be expressed as Formula (22) serving as the general formula. Specifically, Formula (69) is equivalent to Formula (22), in which the emphasis coefficient, by which the super-low frequency components $S_{LL}$ are to be multiplied, is set to be equal to 1 (a fixed number) and is thus omitted. Therefore, in this embodiment, as described above, the emphasis coefficient in accordance with the morphology signal Smor and corresponding to the super-low frequency components $S_{LL}$ may be set to be, for example, $\alpha m_4$, and the super-low frequency components $S_{LL}$ may be multiplied by the emphasis coefficient $\alpha m_4$.

An eighth embodiment of the image processing method in accordance with the present invention will be described hereinbelow.

FIG. 36 is a block diagram showing an apparatus for carrying out the eighth embodiment of the image processing method in accordance with the present invention. In lieu of the morphology filter 12 employed in the image processing apparatus for carrying out the seventh embodiment of the image processing method in accordance with the present invention, the image processing apparatus shown in FIG. 36 is provided with a first morphology filter 12a, a second morphology filter 12b, and a third morphology filter 12c. The first morphology filter 12a obtains a first morphology signal Smor1 of the original image signal Sorg by using a structure element $B_s$ having a size corresponding to the high frequency components $S_H$ of the original image signal Sorg. The second morphology filter 12b obtains a second morphology signal Smor2 of the original image signal Sorg by using a structure element $B_M$ having a size corresponding to the middle frequency components $S_M$ of the original image signal Sorg. The third morphology filter 12c obtains a third morphology signal Smor3 of the original image signal Sorg by using a structure element $B_L$ having a size corresponding to the low frequency components $S_L$ of the original image signal Sorg. The first conversion table 13a receives the first morphology signal Smor1 from the first morphology filter 12a and feeds out the information representing an emphasis coefficient $\alpha m_1$ (Smor1), which takes a value in accordance with the first morphology signal Smor1. The second conversion table 13b receives the second morphology signal Smor2 from the second morphology filter 12b and feeds out the information representing an emphasis coefficient $\alpha m_2$ (Smor2), which takes a value in accordance with the second morphology signal Smor2. Also, the third conversion table 13c receives the third morphology signal Smor3 from the third morphology filter 12c and feeds out the information representing an emphasis coefficient a $\alpha m_3$(Smor3), which takes a value in accordance with the third morphology signal Smor3.

The structure element $B_L$ has the largest size, the structure element $B_S$ has the smallest size, and the structure element $B_M$ has a middle size between the sizes of the structure elements $B_L$ and $B_S$.

The sizes of the structure elements $B_S$, $B_M$, and $B_L$ are set in the manner described above. As a result, the morphology filters 12a, 12b, and 12c feed out the morphology signals Smor1, Smor2, and Smor3, which take a characteristic value with respect to an image portion having the corresponding size. In accordance with the morphology signals Smor1, Smor2, and Smor3 obtained from the morphology filters 12a, 12b, and 12c, the corresponding conversion tables 13a, 13b, and 13c feed out the information representing the emphasis coefficients $\alpha m_1$(Smor1), $\alpha m_2$(Smor2), and $\alpha m_3$(Smor3).

The operation element $14b_1$ multiplies the high frequency components $S_H$ by the emphasis coefficient $\alpha m_1$(Smor1). The operation element $14b_2$ multiplies the middle frequency components $S_M$ by the emphasis coefficient $\alpha m_2$(Smor2). The operation element $14b_3$ multiplies the low frequency components $S_L$ by the emphasis coefficient $\alpha m_3$(Smor3). In this manner, image portions corresponding to the sizes of the structure elements $B_S$, $B_M$, and $B_L$ can be emphasized independently and to degrees of emphasis in accordance with the emphasis coefficients $\alpha m_1$(Smor1), $\alpha m_2$(Smor2), and $\alpha m_3$(Smor3).

As described above, with the image processing apparatus for carrying out the eighth embodiment of the image processing method in accordance with the present invention, with respect to the frequency components of the original image signal Sorg, which fall within each of the frequency bands, only the image portion to be emphasized, from which the unnecessary components, such as grainy components, have been removed, can be extracted selectively. Also, in cases where each conversion table is set previously such that an image portion having a desired size can be emphasized or restricted, only the selectively extracted image portion can be emphasized selectively and to a desired degree of emphasis. Therefore, fine image emphasis processing can be carried out.

Figure 37:
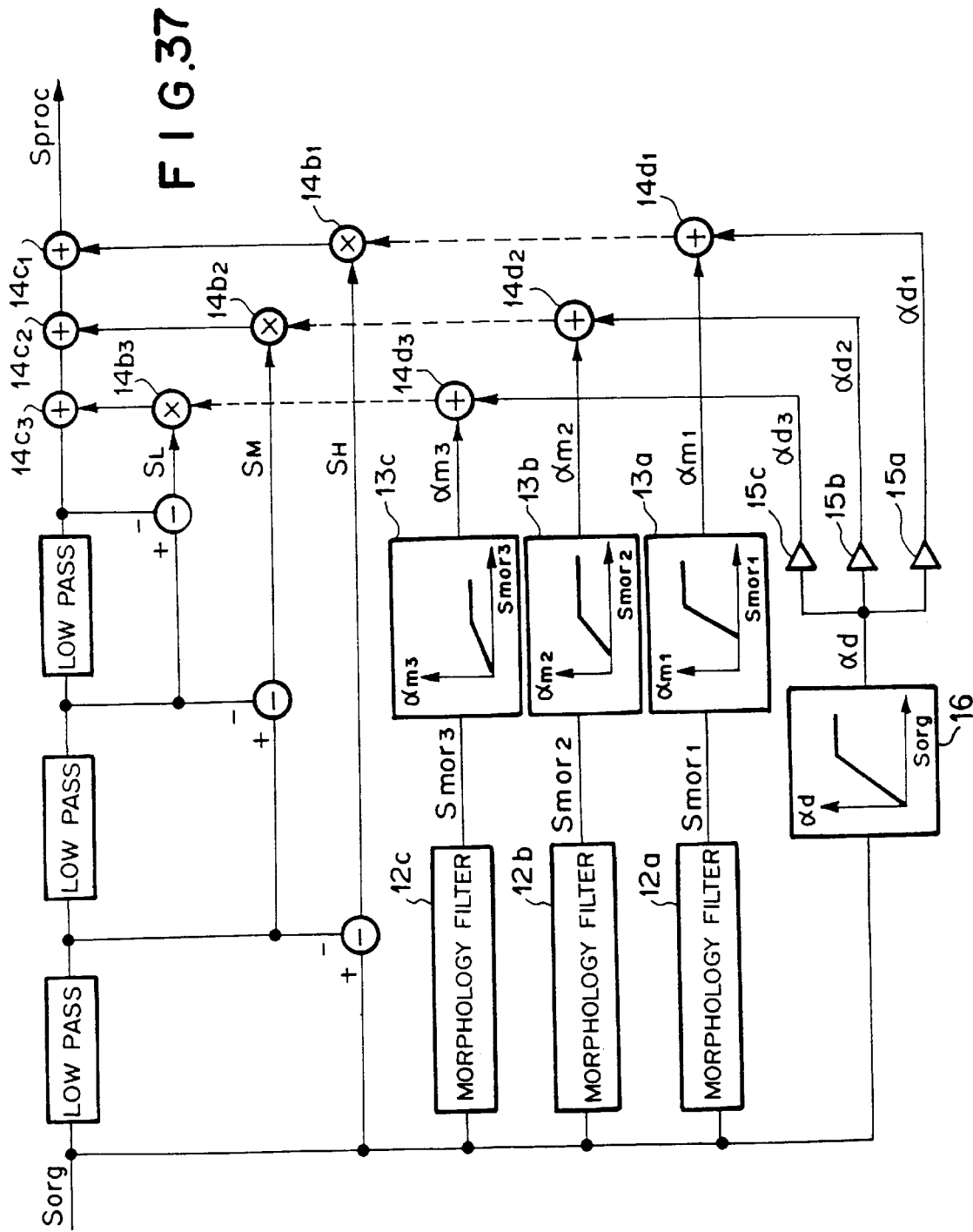
FIG. 37 is a block diagram showing an apparatus for carrying out a ninth embodiment of the image processing method in accordance with the present invention.

FIG. 37 is a block diagram showing an apparatus for carrying out a ninth embodiment of the image processing method in accordance with the present invention. The image processing apparatus shown in FIG. 37 has the same constitution as that of the image processing apparatus for carrying out the eighth embodiment of the image processing method in accordance with the present invention, except that the image processing apparatus shown in FIG. 37 is further provided with a second conversion table 16, three amplifiers 15a, 15b, and 15c, and operation elements $14d_1$, $14d_2$, and $14d_3$. The second conversion table 16 receives the original image signal Sorg and feeds out the information representing an emphasis coefficient $\alpha d$(Sorg), the value of which is increased monotonously in accordance with the original image signal Sorg. The amplifiers 15a, 15b, and 15c amplify the emphasis coefficient $\alpha d$(Sorg), which takes a value in accordance with the original image signal Sorg which has been obtained from the second conversion table 16, to different amplification degrees. The operation element $14d_1$ adds an output $\alpha d_1$(Sorg) of the amplifier 15a and the emphasis coefficient $\alpha m_1$(Smor1), which is in accordance with the morphology signal Smor1 obtained from the morphology filter 12a, to each other. The operation element $14d_2$ adds an output $\alpha d_2$(Sorg) of the amplifier 15b and the emphasis coefficient $\alpha m_2$(Smor2), which is in accordance with the morphology signal Smor2 obtained from the morphology filter 12b, to each other. The operation element $14d_3$ adds an output $\alpha d_3$(Sorg) of the amplifier 15c and the emphasis coefficient $\alpha m_3$(Smor3), which is in accordance with the morphology signal Smor3 obtained from the morphology filter 12c, to each other.

The amplifiers 15a, 15b, and 15c are set such that, when the same input value $\alpha d$(Sorg) is received, the amplifier 15a may output the largest emphasis coefficient $\alpha d_1$(Sorg), the amplifier 15c may output the smallest emphasis coefficient $\alpha d_3$(Sorg), and the amplifier 15b may output the middle emphasis coefficient $\alpha d_2$(Sorg), which takes a value between the values of $\alpha d_1$(Sorg) and $\alpha d_3$(Sorg).

With the image processing apparatus for carrying out the ninth embodiment of the image processing method in accordance with the present invention, the high frequency components $S_H$ are emphasized with an emphasis coefficient $\alpha_1$ in accordance with the sum of the emphasis coefficient $\alpha m_1$(Smor1), which is in accordance with the morphology signal Smor1, and the emphasis coefficient $\alpha d_1$(Sorg), which is in accordance with the original image signal Sorg. Also, the middle frequency components $S_M$ are emphasized with an emphasis coefficient $\alpha_2$ in accordance with the sum of the emphasis coefficient $\alpha m_2$(Smor2), which is in accordance with the morphology signal Smor2, and the emphasis coefficient $\alpha d_2$(Sorg), which is in accordance with the original image signal Sorg. Further, the low frequency components $S_L$ are emphasized with an emphasis coefficient $\alpha_3$ in accordance with the sum of the emphasis coefficient $\alpha m_3$(Smor3), which is in accordance with the morphology signal Smor3, and the emphasis coefficient $\alpha d_3$(Sorg), which is in accordance with the original image signal Sorg.

As described above, with the image processing apparatus for carrying out the ninth embodiment of the image processing method in accordance with the present invention, the image emphasis processing in accordance with the morphology signals and the image emphasis processing in accordance with the original image signal Sorg are combined together and carried out. Therefore, excessive emphasis (overshooting or undershooting) can be restricted at an image portion, such as an artificial bone pattern, at which a change in the density is locally sharp.

In the ninth embodiment, as a technique for combining the image emphasis processing in accordance with the morphology signals and the image emphasis processing in accordance with the original image signal Sorg with each other, the sums of the emphasis coefficients for the respective image emphasis processing are utilized. Alternatively, new emphasis coefficients $\alpha_n$, which are obtained by multiplying the corresponding emphasis coefficients for the respective image emphasis processing by each other, may be utilized.

Figure 38:
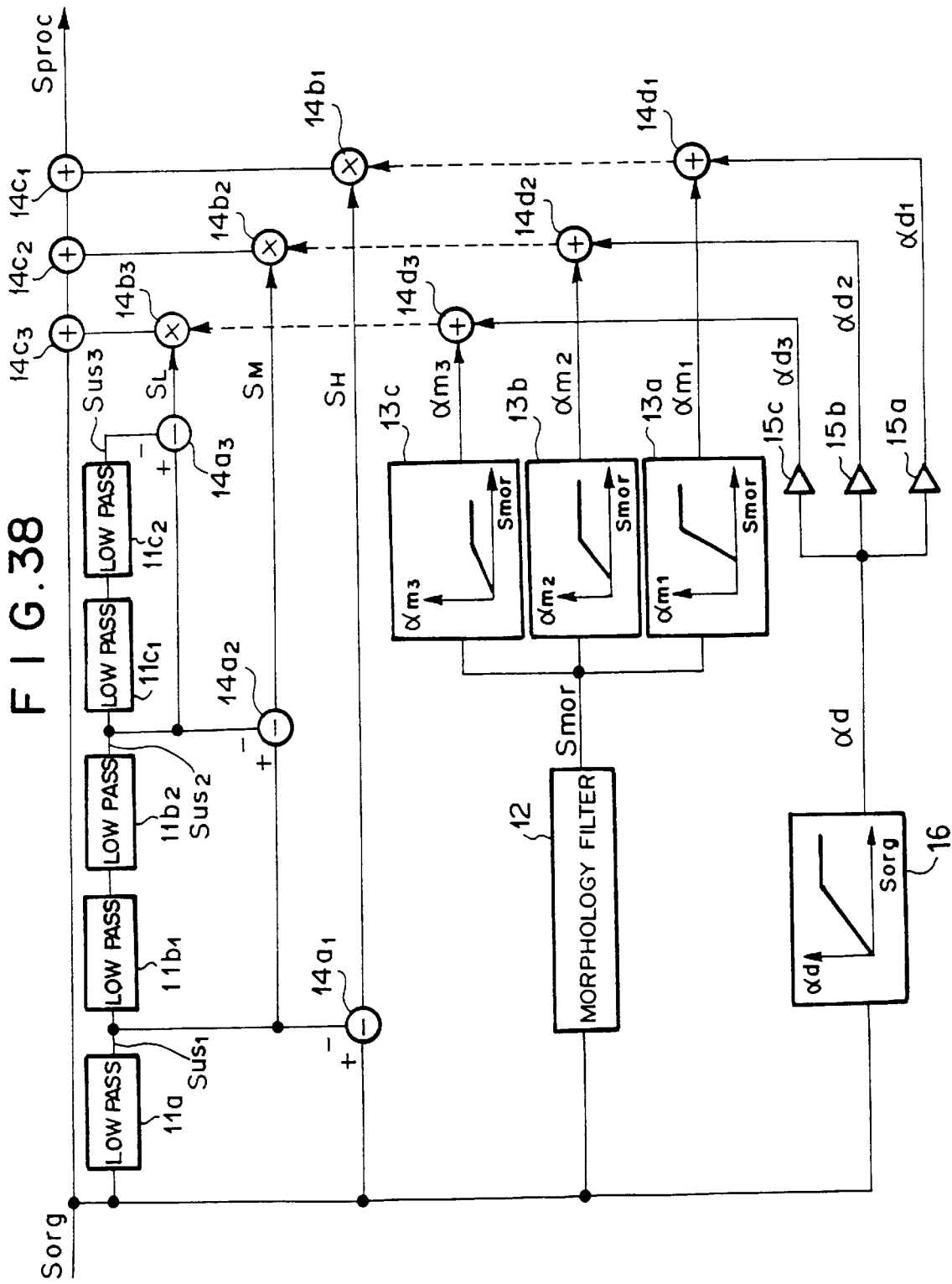
FIG. 38 is a block diagram showing an apparatus for carrying out a tenth embodiment of the image processing method in accordance with the present invention.

Also, as in an image processing apparatus for carrying out a tenth embodiment of the image processing method in accordance with the present invention, which is shown in FIG. 38, in lieu of the aforesaid three low pass filters 11a, 11b, and 11c, which are connected in series, five low pass filters 11a, $11b_1$, $11b_2$, $11c_1$, and $11c_2$ may be connected in series. Further, instead of the operation elements $14c_1$, $14c_2$, and $14c_3$ being located at the positions for the addition to the output signal Sus3 of the low pass filter 11c as in the seventh, eighth, and ninth embodiments described above, the operation elements $14c_1$, $14c_2$, and $14c_3$ may be located at the positions for the addition to the original image signal Sorg. In such cases, in lieu of Formula (22), the processed image signal Sproc may be calculated with Formula (22').

$$Sproc=\Sigma\{S_n \times \alpha m_n(Smor)\} \quad (22)$$

wherein $\alpha m_n(Smor)$ represents the emphasis coefficient in accordance with the morphology signal Smor.

$$Sproc=Sorg+\Sigma\{S_n \times \alpha m_n(Smor)\} \quad (22')$$

As in Formula (22), Formula (22') represents that the signal is obtained from the image emphasis processing, which is carried out on the original image signal Sorg and in which the degree of emphasis is changed in accordance with the morphology signal Smor and with respect to each frequency band. The desired image emphasis processing can thus be carried out only on the image portion having a desired size, which is contained in each frequency band, and for each of the desired frequency bands.

An eleventh embodiment of the image processing method in accordance with the present invention will be described hereinbelow.

Figure 40:
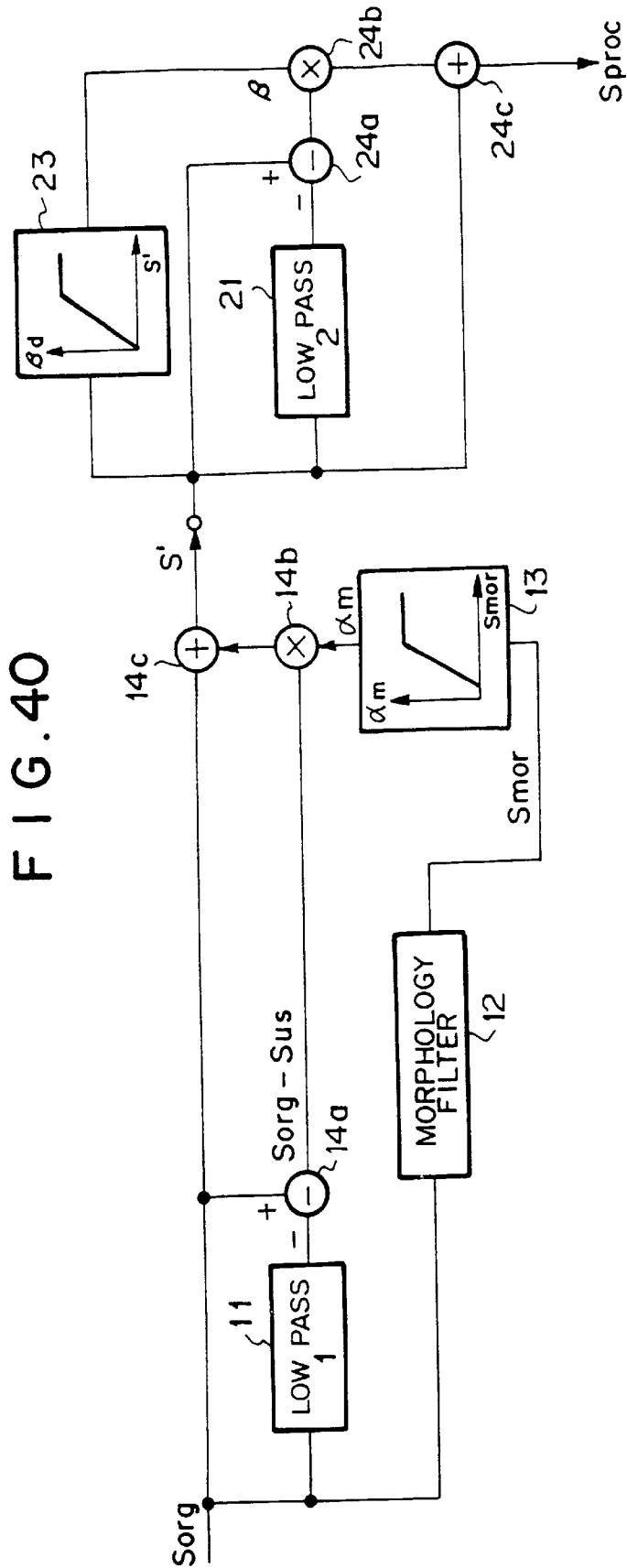
FIG. 40 is a block diagram showing an apparatus for carrying out an eleventh embodiment of the image processing method in accordance with the present invention.

FIG. 40 is a block diagram showing an apparatus for carrying out the eleventh embodiment of the image processing method in accordance with the present invention. With reference to FIG. 40, the image processing apparatus comprises a first low pass filter (represented by "low pass 1" in FIG. 40) 11 for obtaining an unsharp mask signal Sus, which corresponds to super-low frequency, from an original image signal Sorg, which represents an image. The image processing apparatus also comprises a morphology filter 12 for carrying out a morphology operation on the original image signal Sorg by using a structure element Bi and a scale factor λ. A morphology signal Smor is obtained from the morphology filter 12. The morphology signal Smor represents whether a picture element is or is not the one corresponding to an image portion, at which the original image signal Sorg fluctuates in a spatially narrower range than the structure element Bi. The image processing apparatus further comprises a first conversion table 13 for receiving the morphology signal Smor and feeding out information representing an emphasis coefficient αm(Smor), which takes a value in accordance with the morphology signal Smor. The image processing apparatus still further comprises operation elements 14a, 14b, and 14c for carrying out operation processing on the original image signal Sorg by using the emphasis coefficient αm(Smor), which has been obtained from the first conversion table 13. The operation processing is carried out with Formula (24) shown below.

$$S'=Sorg+\alpha m(Smor) \times (Sorg-Sus) \quad (24)$$

From the operation processing carried out by the operation elements 14a, 14b, and 14c, a first processed image signal S' is obtained. In the image represented by the first processed image signal S', the image portion, at which the original image signal Sorg fluctuates in a spatially narrower range than the structure element Bi, has been emphasized. The image processing apparatus also comprises a second low pass filter (represented by "low pass 2" in FIG. 40) 21 for obtaining an unsharp mask signal S'us, which corresponds to super-low frequency, from the first processed image signal S'. The image processing apparatus further comprises a second conversion table 23 for receiving the first processed image signal S' and feeding out information representing an emphasis coefficient βd(S'), which takes a value in accordance with the first processed image signal S'. The image processing apparatus still further comprises operation elements 24a, 24b, and 24c for carrying out operation processing on the first processed image signal S' by using the emphasis coefficient βd(S'), which has been obtained from the second conversion table 23. The operation processing is carried out with Formula (25) shown below, and a second processed image signal Sproc is thereby obtained.

$$Sproc=S'+\beta(S') \times (S'-S'us) \quad (25)$$

By way of example, the original image signal Sorg representing the image may be one which has been detected from a radiation image by a predetermined image read-out apparatus and has then been stored in a predetermined storage means. Alternatively, the original image signal Sorg may be directly received from the image read-out apparatus.

Also, in the eleventh embodiment, the radiation image is a mammogram. The first low pass filter 11 sets an unsharp mask constituted of a picture element matrix having a size of, for example, 3 columns×3 rows and calculates an unsharp mask signal Sus from the original image signal Sorg. The unsharp mask signal Sus is calculated with Formula (68) (in this example, N=3)

$$Sus=(\Sigma Sorg)/N^2 \quad (68)$$

wherein ΣSorg represents the sum of the image signal values representing the picture elements located within the unsharp mask.

As the unsharp mask signal Sus, the simple mean value of the signal values of the picture elements located within the unsharp mask may be calculated with Formula (68). Alternatively, as illustrated on the right lower side in FIG. 45, the unsharp mask signal Sus may be calculated from the matrix, in which the values of the picture elements located within the unsharp mask are weighted in accordance with the length of distance from the middle picture element.

The morphology filter 12 carries out the operation processing in accordance with the closing processing on the original image signal Sorg by using the structure element B, which is composed of a picture element matrix having a size of, for example, 5 columns×5 rows and the scale factor λ. The operation processing is carried out with Formula (31)

$$Smor=Sorg-min\{(Sorg \oplus \lambda Bi) \ominus \lambda Bi\} \quad (31)$$

i=1, . . . ,n

In this manner, the morphology filter 12 feeds out the morphology signal Smor. The morphology signal Smor takes a large value with respect to an image portion (for example, as for a mammogram, a small calcified pattern indicating a mammary cancer), in which the value of the original image signal Sorg is smaller than the values for the surrounding image areas, and at which the original image signal Sorg fluctuates in a spatially narrower range than the structure element Bi. Also, the morphology signal Smor takes a very small value with respect to an image portion, in which the value of the original image signal Sorg is larger than the values for the surrounding image areas, or at which the original image signal Sorg fluctuates in a spatially wider range than the structure element Bi. The structure element B is set previously in accordance with the shape and the size of the desired small calcified portion, which is to be emphasized.

By way of example, as illustrated in FIG. 41, the first conversion table 13 is set such that its output may be kept to be equal to zero with respect to a region (i.e., a radiation noise region), in which the value of the morphology signal Smor is small. Also, the output of the first conversion table 13 is kept to be equal to the upper limit value of the emphasis coefficient αm(Smor) with respect to a region, in which the value of the morphology signal Smor is large and which corresponds to a desired image portion, such as a calcified pattern. Further, the output of the first conversion table 13 is increased monotonously in accordance with an increase in the value of the morphology signal Smor with respect to the intermediate region between the aforesaid two regions.

The operation element 14a subtracts the output Sus of the first low pass filter 11 from the original image signal Sorg. The operation element 14b carries out the multiplication of the output of the operation element 14a and the output of the first conversion table 13. The operation element 14c carries out the addition of the original image signal Sorg and the output of the operation element 14b.

The second low pass filter 21 sets an unsharp mask constituted of a picture element matrix having a size of, for example, 29 columns×29 rows and calculates the unsharp mask signal S'us from the first processed image signal S'. The unsharp mask signal S'us is calculated with Formula (68), wherein N=29.

By way of example, as illustrated in FIG. 42, the second conversion table 23 is set such that its output may be kept to be equal to the upper limit value of the emphasis coefficient βd(S') with respect to a region, in which the value of the first processed image signal S' is comparatively large. Also, the output of the second conversion table 23 is increased monotonously in accordance with an increase in the value of the first processed image signal S' with respect to a region, in which the value of the first processed image signal S' is small.

The operation element 24a subtracts the output S'us of the second low pass filter 21 from the first processed image signal S'. The operation element 24b carries out the multiplication of the output of the operation element 24a and the output of the second conversion table 23. The operation element 24c carries out the addition of the first processed image signal S' and the output of the operation element 24b.

How the image processing apparatus, in which the eleventh embodiment of the image processing method in accordance with the present invention is employed, operates will be described hereinbelow.

When the original image signal Sorg is fed into the image processing apparatus, the first low pass filter 11 sets the unsharp mask constituted of a picture element matrix having a size of 3 columns×3 rows and calculates the first unsharp mask signal Sus from the original image signal Sorg. The first unsharp mask signal Sus is calculated with Formula (68), wherein N=3. Since the first unsharp mask signal Sus is obtained with the unsharp mask constituted of a picture element matrix having a size of 3 columns×3 rows, the first unsharp mask signal Sus is a comparatively high frequency signal.

The operation element 14a subtracts the first unsharp mask signal Sus, which is the output of the first low pass filter 11, from the original image signal Sorg. Of the original image signal Sorg, only the high frequency components (Sorg−Sus) are fed out from the operation element 14a.

Simultaneously with the operations of the first low pass filter 11 and the operation element 14a, the morphology filter 12 carries out the operation processing on the original image signal Sorg by using the structure element B, which is composed of a picture element matrix having a size of 5 columns×5 rows and the scale factor λ. The operation processing is carried out with Formula (31). In this manner, the morphology filter 12 feeds out the morphology signal Smor, which takes a value in accordance with the characteristic shape of the image portion and the variation of the signal value. Specifically, the morphology signal Smor takes a large value with respect to an image portion, which constitutes a small calcified pattern, i.e., an abnormal pattern. Also, the morphology signal Smor takes a very small value with respect to the other image portions.

The morphology signal Smor having been obtained from the morphology filter 12 is fed into the first conversion table 13. The first conversion table 13 feeds out the information representing the emphasis coefficient αm(Smor) having a value in accordance with the value of the received morphology signal Smor. In this embodiment, as for the small calcified pattern, the emphasis coefficient αm(Smor) takes a value approximately equal to the upper limit value. As for the other image portions, the emphasis coefficient αm(Smor) takes a value approximately equal to zero.

The operation element 14b multiplies the high frequency components (Sorg−Sus), which have been obtained from the operation element 14a, by the emphasis coefficient αm(Smor) having been obtained from the first conversion table 13. In this manner, the high frequency components (Sorg−Sus) are weighted.

Thereafter, the operation element 14c adds the original image signal Sorg and the output of the operation element 14b to each other and feeds out the first processed image signal S'. In the first processed image signal S', of the high frequency components (Sorg−Sus) of the original image signal Sorg, only the components corresponding to the small calcified pattern have been emphasized by the processing described above.

The first processed image signal S', in which only the components corresponding to the small calcified pattern have been emphasized, is fed into the second low pass filter 21. The second low pass filter 21 sets the unsharp mask constituted of a picture element matrix having a size of 29 columns×29 rows and calculates the second unsharp mask signal S'us from the first processed image signal S'. The unsharp mask signal S'us is calculated with Formula (68), wherein N=29. Since the second unsharp mask signal S'us is obtained with the unsharp mask constituted of a comparatively large picture element matrix having a size of 29 columns×29 rows, the second unsharp mask signal S'us is a comparatively low frequency signal.

The operation element 24a subtracts the second unsharp mask signal S'us, which is the output of the second low pass filter 21, from the first processed image signal S'. In this manner, of the first processed image signal S', only the high frequency components (S'−S'us) are fed out from the operation element 24a. The high frequency components (S'−S'us) contain the components ranging up to the frequency components lower than the high frequency components (Sorg−Sus) of the original image signal Sorg.

Simultaneously with the operations of the second low pass filter 21 and the operation element 24a, the first processed image signal S' is fed into the second conversion table 23. The second conversion table 23 feeds out the information representing the emphasis coefficient βd(S'), which takes a value in accordance with the first processed image signal S'.

The operation element 24b multiplies the output (S'−S'us) of the operation element 24a by the output βd(S') of the second conversion table 23 and thereby weights the high frequency components (S'−S'us). Thereafter, the operation element 24c carries out the addition of the first processed image signal S' and the output of the operation element 24b and feeds out the second processed image signal Sproc. In the second processed image signal Sproc, the high frequency components (S'−S'us) of the first processed image signal S' have been emphasized by the processing described above. Particularly, as the value of the first processed image signal S' becomes larger (for example, in the cases of a negative image, as the density becomes higher), the degree of emphasis becomes higher.

Therefore, with the image processing apparatus, in which the eleventh embodiment of the image processing method in accordance with the present invention is employed, the image portion having frequency higher than the second frequency, which corresponds to the size of the unsharp mask having been set in the second low pass filter 21, can be emphasized. Also, of the emphasized frequency band higher than the second frequency, the emphasis of radiation noise falling within the frequency band of the first frequency, which corresponds to the size of the unsharp mask having been set in the first low pass filter 11, (second frequency<first frequency) can be restricted, and the small calcified pattern can be emphasized even further. Therefore, in cases where an image portion to be emphasized (e.g., a pattern of tumor, which is one of morphological characteristics of a mammary cancer) is also present in the intermediate frequency band, which falls between the second frequency and the first frequency and which is outside of the first frequency band, the aforesaid small calcified pattern and the tumor pattern, or the like, can be emphasized independently and to desired degrees of emphasis. Accordingly, the image processing apparatus is very useful for computer aided diagnosis of medical images, or the like.

Figure 43:
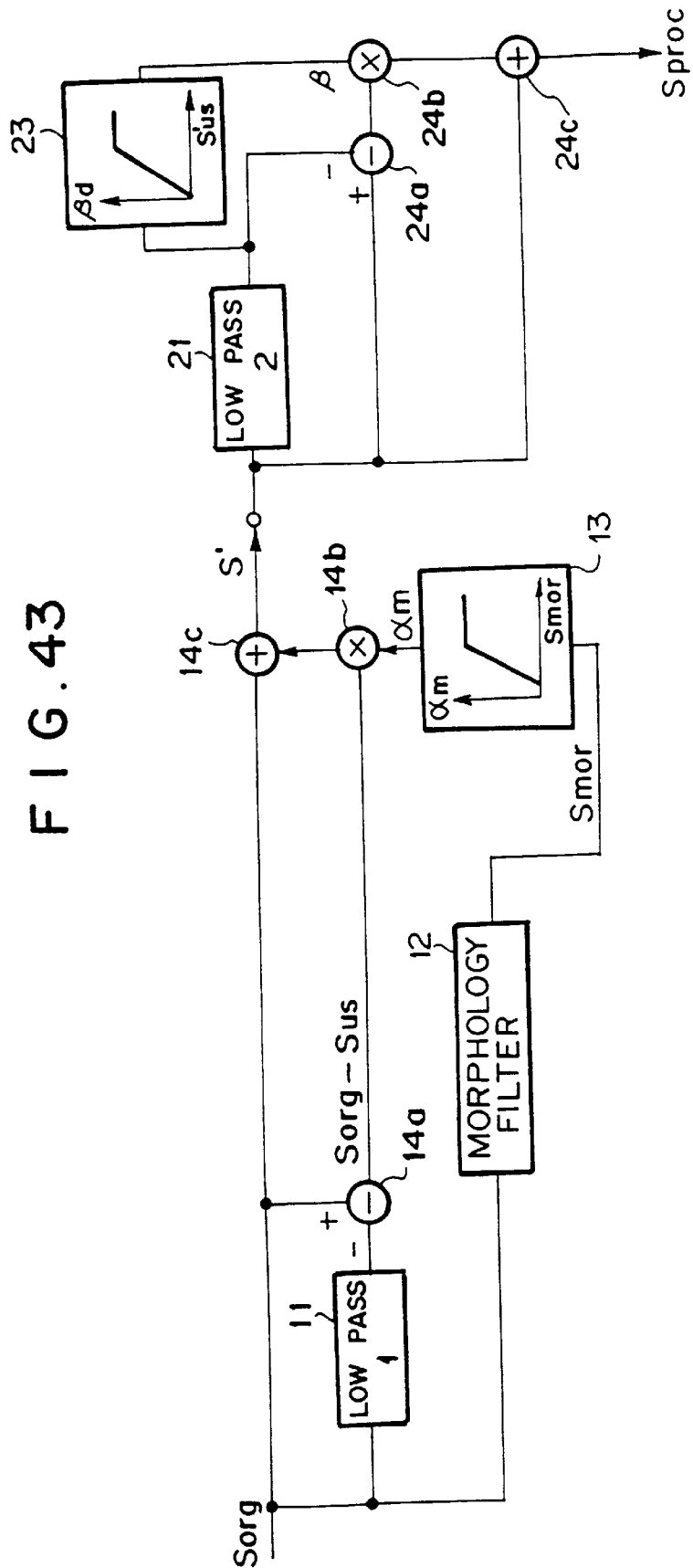
FIG. 43 is a block diagram showing an apparatus for carrying out a twelfth embodiment of the image processing method in accordance with the present invention.

In lieu of the second conversion table 23 in the eleventh embodiment, it is possible to employ a second conversion table 23 for receiving the unsharp mask signal S'us of the first processed image signal S' from the second low pass filter 21 and feeding out an emphasis coefficient βd(S'us), which takes a value in accordance with the unsharp mask signal S'us. In such cases, the same effects as those with the eleventh embodiment can be obtained. In such cases, as in the image processing apparatus for carrying out a twelfth embodiment shown in FIG. 43, instead of the first processed image signal S' being fed into the second conversion table 23, the output of the second low pass filter 21 may be fed into the second conversion table 23.

Figure 44:
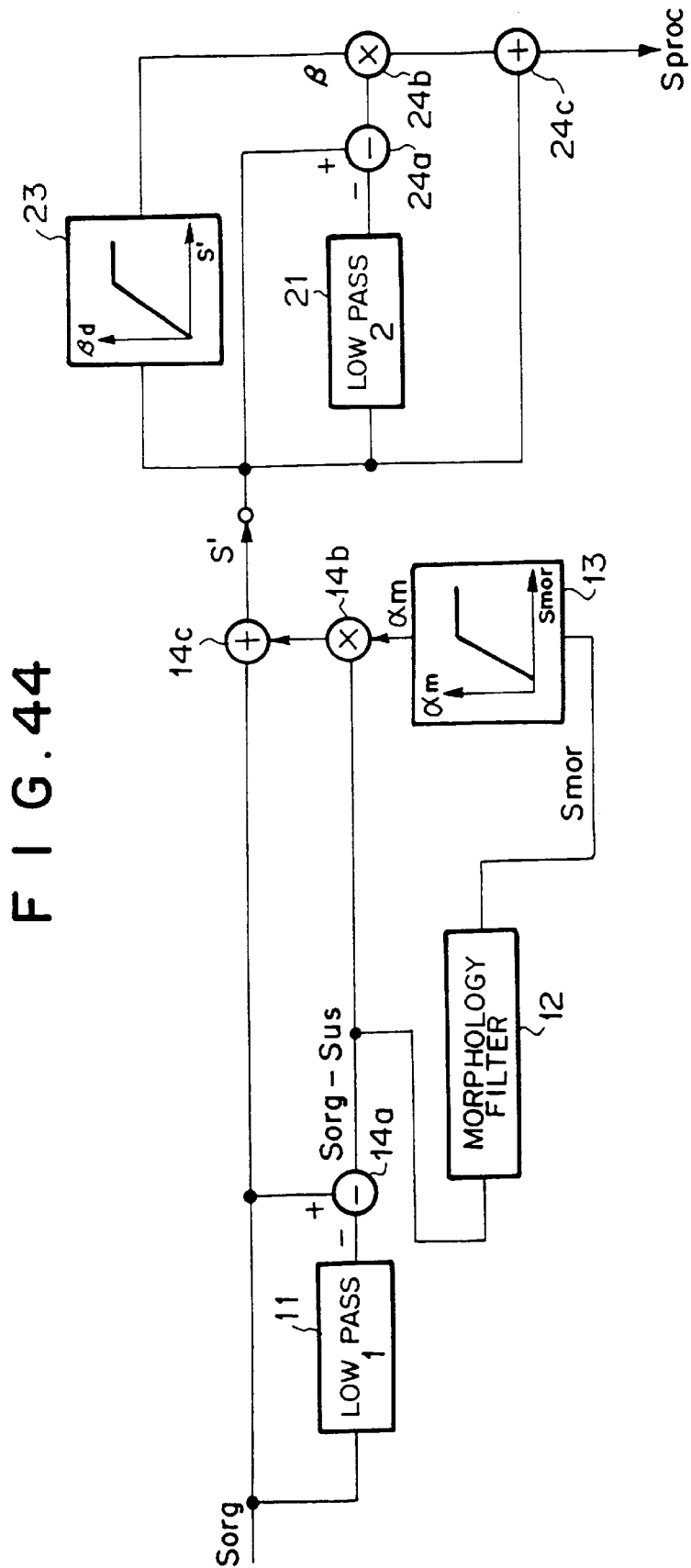
FIG. 44 is a block diagram showing an apparatus for carrying out a thirteenth embodiment of the image processing method in accordance with the present invention.

Also, as the input signal to the morphology filter 12, in lieu of the original image signal Sorg, the difference signal [corresponding to the aforesaid high frequency components (Sorg−Sus)] between the original image signal Sorg and the first unsharp mask signal Sus obtained from the first conversion table 13 may be employed. In such cases, as in the image processing apparatus for carrying out a thirteenth embodiment shown in FIG. 44, the output of the operation element 14a may be fed into the morphology filter 12.

Further, first image emphasis processing for obtaining the first processed image signal S' may be carried out in a plurality of stages for the respective frequency bands.

Figure 45:
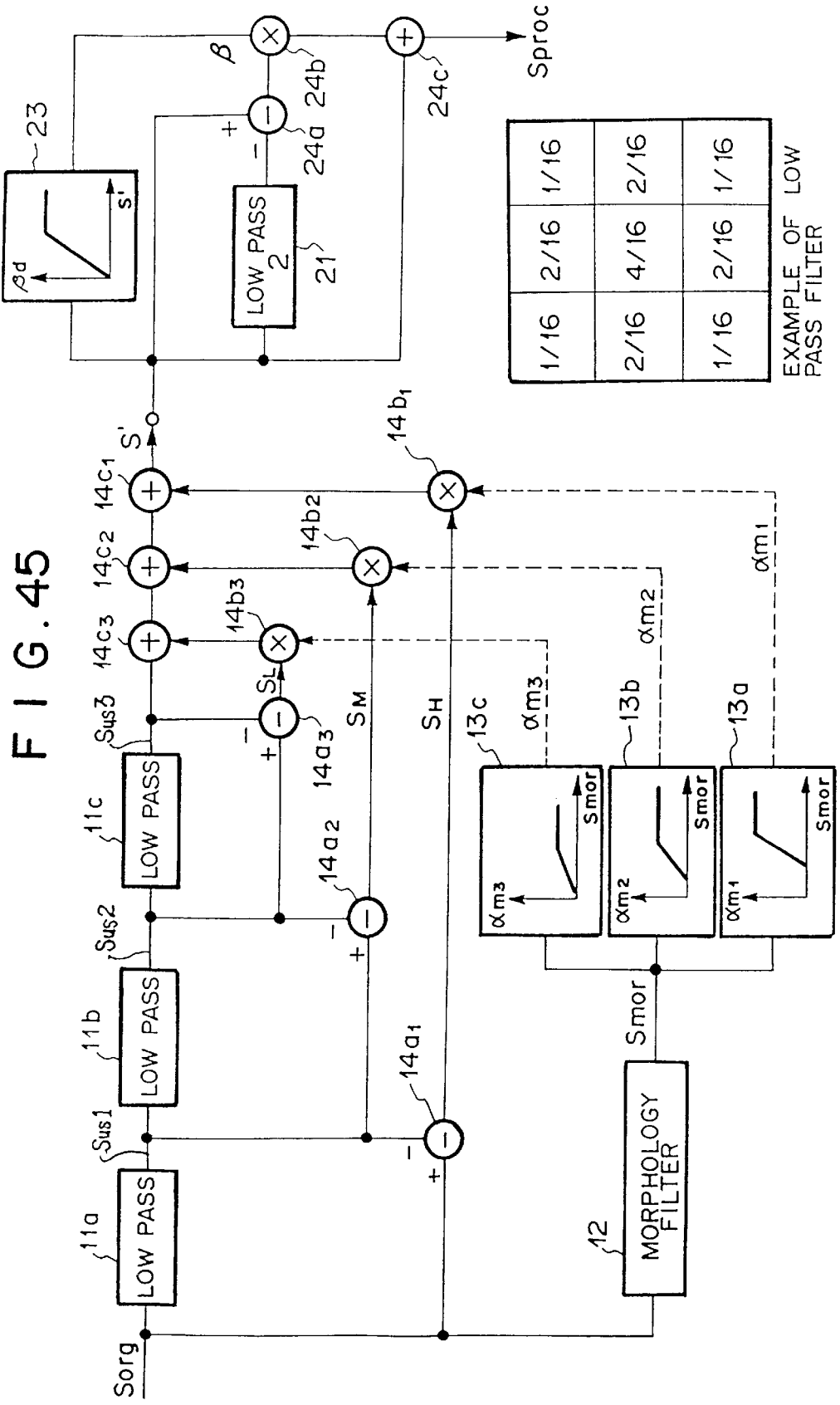
FIG. 45 is a block diagram showing an apparatus for carrying out a fourteenth embodiment of the image processing method in accordance with the present invention.

For example, as in the image processing apparatus for carrying out a fourteenth embodiment shown in FIG. 45, low pass filters 11a, 11b, and 11c, which are of the same kind, are connected in series. An operation element $14a_1$ calculates the difference between the input signal to the low pass filter 11a and the output signal from the low pass filter 11a. An operation element $14a_2$ calculates the difference between the input signal to the low pass filter 11b and the output signal from the low pass filter 11b. Also, an operation element $14a_3$ calculates the difference between the input signal to the low pass filter 11c and the output signal from the low pass filter 11c. Specifically, when an input signal passes through a single low pass filter, an output signal (i.e., an unsharp mask signal), which is constituted of frequency components lower than those of the input signal, is obtained from the low pass filter. Therefore, by the calculation of the difference between the input signal to the low pass filter and the output signal from the low pass filter, the image signal can be divided into different frequency bands at a boundary, which is equal to the maximum frequency contained in the output signal of the low pass filter.

More specifically, as illustrated in FIG. 45, the unsharp mask signal obtained from the low pass filter 11a, through which the original image signal Sorg passes firstly, is represented by Sus1. The unsharp mask signal obtained from the low pass filter 11b, through which the original image signal Sorg passes secondly, is represented by Sus2. The unsharp mask signal obtained from the low pass filter 11c, through which the original image signal Sorg passes thirdly, is represented by Sus3. Also, the operation elements for calculating the differences between the input and output signals of the respective low pass filters are represented by $14a_1$, $14a_2$, and $14a_3$. In such cases, the output signals $S_H$, $S_M$, and $S_L$, which are obtained respectively from the operation elements $14a_1$, $14a_2$, and $14a_3$, are represented by the formulas shown below.

$S_H$=Sorg−Sus1

$S_M$=Sus1−Sus2

$S_L$=Sus2−Sus3

Therefore, in cases where the frequency, which the unsharp mask signal Sus1 contains, is represented by $f_1$, the output signal $S_H$ is constituted of components of a comparatively high frequency band $f_H$ ($f_H$>$f_1$), which are other than the frequency components not higher than the frequency $f_1$. Also, in cases where the frequency, which the unsharp mask signal Sus2 contains, is represented by $f_2$, the output signal $S_M$ is constituted of components of a middle frequency band $f_M$ ($f_1 \geq f_M > f_2$), which are other than the frequency components not higher than the frequency $f_2$ and which are other than the frequency components higher than the frequency $f_1$, that is contained in the unsharp mask signal Sus1. Further, in cases where the frequency, which the unsharp mask signal Sus3 contains, is represented by $f_3$, the output signal $S_L$ is constituted of components of a low frequency band $f_L$ falling within the range of $f_2 \geq f_L > f_3$).

The image processing apparatus for carrying out the fourteenth embodiment shown in FIG. 45 further comprises three first conversion tables 13a, 13b, and 13c for receiving the morphology signal Smor and respectively feeding out information representing emphasis coefficients $\alpha m_1$(Smor), $\alpha m_2$(Smor), and $\alpha m_3$(Smor), which takes values in accordance with the morphology signal Smor and which respectively correspond to the frequency bands $f_H$, $f_M$, and $f_L$. [As an aid in facilitating the explanation, $\alpha m_1$(Smor), $\alpha m_2$(Smor), and $\alpha m_3$(Smor) will hereinbelow be referred to simply as $\alpha m_1$, $\alpha m_2$, and $\alpha m_3$]. The image processing apparatus still further comprises an operation element $14b_1$ for multiplying the high frequency components $S_H$, which have been obtained from the operation element $14a_1$, by the emphasis coefficient $\alpha m_1$, which has been obtained from the conversion table 13a. The image processing apparatus also comprises an operation element $14b_2$ for multiplying the middle frequency components $S_M$, which have been obtained from the operation element $14a_2$, by the emphasis coefficient $\alpha m_2$, which has been obtained from the conversion table 13b. The image processing apparatus further comprises an operation element $14b_3$ for multiplying the low frequency components $S_L$, which have been obtained from the operation element $14a_3$, by the emphasis coefficient $\alpha m_3$, which has been obtained from the conversion table 13c. The image processing apparatus still further comprises operation elements $14c_1$, $14c_2$, and $14c_3$ for adding the outputs, which are obtained from the operation elements $14b_1$, $14b_2$, and $14b_3$, to the output obtained from the low pass filter 11c.

By way of example, as illustrated in FIG. 35A, the first conversion table 13a is constituted of a function having been set such that it may feed out the emphasis coefficient $\alpha m_1$, which takes a value in accordance with the morphology signal Smor, with respect to the high frequency band $f_H$. Also, as illustrated in FIG. 35B, the first conversion table 13b is constituted of a function having been set such that it may feed out the emphasis coefficient $\alpha m_2$, which takes a value in accordance with the morphology signal Smor, with respect to the middle frequency band $f_M$. Further, as illustrated in FIG. 35C, the first conversion table 13c is constituted of a function having been set such that it may feed out the emphasis coefficient $\alpha m_3$, which takes a value in accordance with the morphology signal Smor, with respect to the low frequency band $f_L$. As an aid in facilitating the explanation, the three first conversion tables 13a, 13b, and 13c will hereinbelow be referred to respectively as the conversion table 13a for the high frequency, the conversion table 13b for the middle frequency, the conversion table 13c for the low frequency.

The morphology signal Smor having been obtained from the morphology filter 12 is fed into the three first conversion tables 13a, 13b, and 13c. The conversion table 13a for the high frequency feeds out the information representing the emphasis coefficient $\alpha m_1$, which has a value in accordance with the value of the received morphology signal Smor and which corresponds to the high frequency components $S_H$. The conversion table 13b for the middle frequency feeds out the information representing the emphasis coefficient $\alpha m_2$, which has a value in accordance with the value of the received morphology signal Smor and which corresponds to the middle frequency components $S_M$. Also, the conversion table 13c for the low frequency feeds out the information representing the emphasis coefficient $\alpha m_3$, which has a value in accordance with the value of the received morphology signal Smor and which corresponds to the low frequency components $S_L$.

The emphasis coefficient corresponding to the super-low frequency components $S_{LL}$ (=Sus3) may be represented by $\alpha m_4$, and a conversion table for the super-low frequency, which feeds out the information representing the emphasis coefficient $\alpha m_4$ having a value in accordance with the value of the received morphology signal Smor, may be provided. However, in this embodiment, it is not necessary for the super-low frequency components $S_{LL}$ to be emphasized independently. Therefore, the emphasis coefficient $\alpha m_4$ is set such that $\alpha m_4 = 1$ (a fixed number), and the operation processing with the emphasis coefficient $\alpha m_4$ is omitted. This is because, in cases where a signal is divided into frequency components, which fall within n number of different frequency bands, and the degrees of emphasis for the frequency components, which fall within n−1 number of different frequency bands, are set to be low so as to serve as the degrees of restriction, the degree of emphasis for the frequency components, which fall within the remaining single frequency band, can be controlled relatively.

The emphasis coefficients $\alpha m_1$, $\alpha m_2$, and $\alpha m_3$, which have been obtained from the conversion tables 13a, 13b, and 13c, are respectively fed into the corresponding operation elements $14b_1$, $14b_2$, and $14b_3$. Also, the operation elements $14b_1$, $14b_2$, and $14b_3$ respectively receive the high frequency components $S_H$, the middle frequency components $S_M$, and the low frequency components $S_L$ from the corresponding operation elements $14a_1$, $14a_2$, and $14a_3$. The operation element $14b_1$ multiplies the high frequency components $S_H$ by the emphasis coefficient $\alpha m_1$. The operation element $14b_2$ multiplies the middle frequency components $S_M$ by the emphasis coefficient $\alpha m_2$. Also, the operation element $14b_3$ multiplies the low frequency components $S_L$ by the emphasis coefficient $\alpha m_3$. The products obtained from the operation elements $14b_1$, $14b_2$, and $14b_3$ are respectively fed into the operation elements $14c_1$, $14c_2$, and $14c_3$. This operation is equivalent to the weighting of the frequency components, which fall within the respective frequency bands, in accordance with the morphology signal Smor.

The operation elements $14c_1$, $14c_2$, and $14c_3$ calculate the total sum of the outputs having been obtained from the operation elements $14b_1$, $14b_2$, and $14b_3$ and adds the obtained total sum to the super-low frequency components $S_{LL}$, which has been obtained from the low pass filter 11c. In this manner, the first processed image signal S' is calculated with Formula (70).

$$S'=Sus3+\{\alpha m_1 \times S_H + \alpha m_2 \times S_M + \alpha m_3 \times S_L\} \qquad (70)$$

The first processed image signal S' is obtained by carrying out the image emphasis processing on the frequency components of the original image signal Sorg, which fall within the respective frequency bands, and in accordance with the morphology signal Smor. Only the desired signal components, which fall within each of the frequency bands, can be emphasized selectively and to a desired degree of emphasis by appropriately selecting the size of the structure element B, the size of the unsharp mask, the number of the frequency bands, into which the signal is divided, the shape of the emphasis function of each conversion table, or the like. Therefore, the adjustment of emphasis can be carried out more finely and the efficient and the accuracy of the diagnosis, or the like, can be kept higher than with the conventional image emphasis processing.

The second image emphasis processing for obtaining the second processed image signal Sproc is then carried out on the first processed image signal S' in the same manner as that in the eleventh embodiment described above.

Formula (70) can be expressed as Formula (71) serving as the general formula.

$$S'=\Sigma\{\alpha m_n(Smor_n) \times S_n\} \qquad (71)$$

Specifically, Formula (71) is equivalent to Formula (70), in which the emphasis coefficient, by which the super-low frequency components $S_{LL}$ are to be multiplied, is set to be equal to 1 (a fixed number) and is thus omitted. Therefore, in this embodiment, as described above, the emphasis coefficient in accordance with the morphology signal Smor and corresponding to the super-low frequency components $S_{LL}$ may be set to be, for example, $\alpha m_4$, and the super-low frequency components $S_{LL}$ may be multiplied by the emphasis coefficient $\alpha m_4$.

Figure 39:
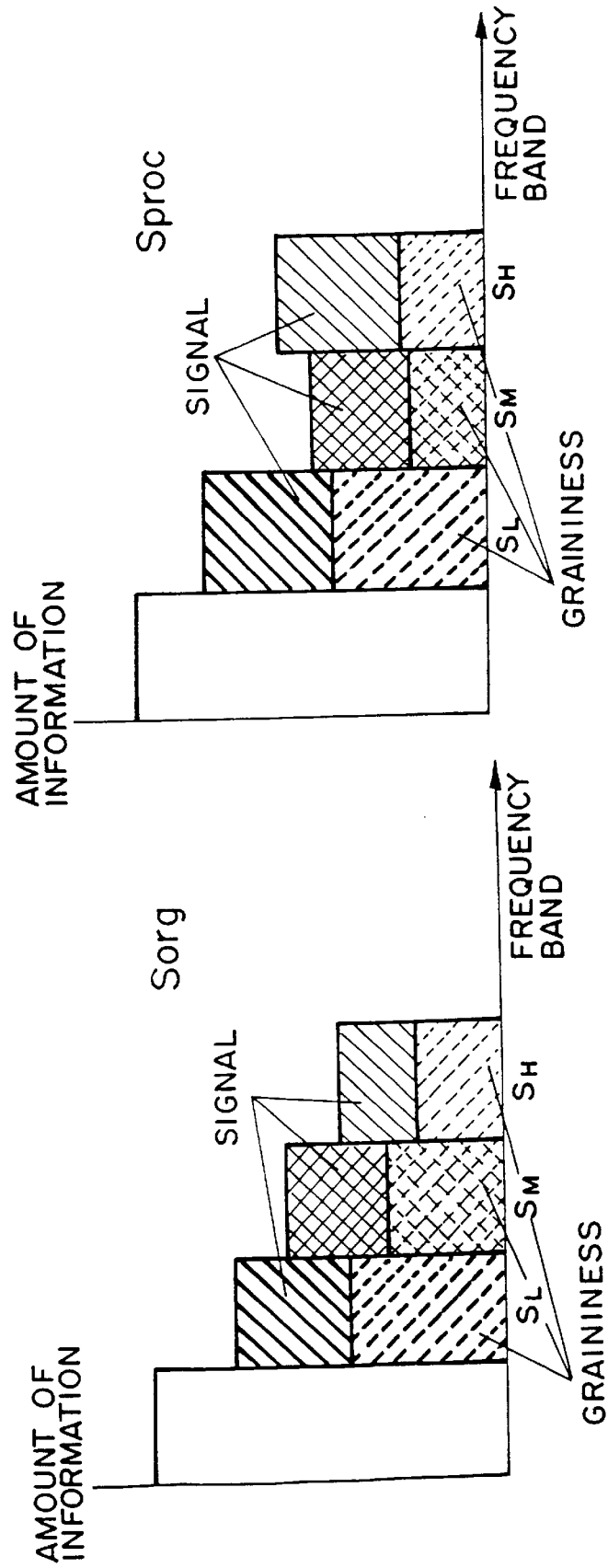
FIGS. 39A and 39B are graphs respectively showing an original image signal and a processed image signal, the graphs serving as an aid in explaining the effects of the seventh, eighth, ninth, and tenth embodiments of the image processing method in accordance with the present invention.

In this manner, as illustrated in FIGS. 39A and 39B, only the signal components among the respective frequency components of the original image signal Sorg shown in FIG. 39A can be emphasized selectively and to desired degrees of emphasis, and the second processed image signal Sproc shown in FIG. 39B, in which only the signal components have been emphasized, can be obtained.

FIG. 46 is a block diagram showing an apparatus for carrying out a fifteenth embodiment of the image processing method in accordance with the present invention. In the image processing apparatus shown in FIG. 46, the image processing apparatus for carrying out the fourteenth embodiment shown in FIG. 45 is modified such that the high frequency components $S_H$, the middle frequency components $S_M$, and the low frequency components $S_L$ of the original image signal Sorg may be emphasized with an emphasis coefficient $\alpha m + \alpha d$, which is obtained by adding the emphasis coefficient $\alpha m$ in accordance with the morphology signal Smor1 and the emphasis coefficient $\alpha d$ in accordance with the original image signal Sorg to each other.

The image processing apparatus shown in FIG. 46 has the same constitution as that of the image processing apparatus for carrying out the fourteenth embodiment shown in FIG. 45, except that the image processing apparatus shown in FIG. 46 is further provided with a third conversion table 16 depending upon the original image signal Sorg, three amplifiers 15a, 15b, and 15c, and operation elements $14d_1$, $14d_2$, and $14d_3$. The third conversion table 16 receives the original image signal Sorg and feeds out the information representing an emphasis coefficient $\alpha d(\text{Sorg})$, the value of which is increased monotonously in accordance with the original image signal Sorg. The amplifiers 15a, 15b, and 15c amplify the emphasis coefficient $\alpha d(\text{Sorg})$, which takes a value in accordance with the original image signal Sorg which has been obtained from the third conversion table 16, to different amplification degrees. The operation element $14d_1$ adds an output $\alpha d_1(\text{Sorg})$ of the amplifier 15a and the emphasis coefficient $\alpha m_1(\text{Smor})$, which is in accordance with the morphology signal Smor obtained from the morphology filter 12 and which corresponds to the high frequency components $S_H$, to each other. The operation element $14d_2$ adds an output $\alpha d_2(\text{Sorg})$ of the amplifier 15b and the emphasis coefficient $\alpha m_2(\text{Smor})$, which is in accordance with the morphology signal Smor obtained from the morphology filter 12 and which corresponds to the middle frequency components $S_M$, to each other. The operation element $14d_3$ adds an output $\alpha d_3(\text{Sorg})$ of the amplifier 15c and the emphasis coefficient $\alpha m_3(\text{Smor})$, which is in accordance with the morphology signal Smor obtained from the morphology filter 12 and which corresponds to the low frequency components $S_L$, to each other.

The amplifiers 15a, 15b, and 15c are set such that, when the same input value $\alpha d(\text{Sorg})$ is received, the amplifier 15a may output the largest emphasis coefficient $\alpha d_1(\text{Sorg})$, the amplifier 15c may output the smallest emphasis coefficient $\alpha d_3(\text{Sorg})$, and the amplifier 15b may output the middle emphasis coefficient $\alpha d_2(\text{Sorg})$, which takes a value between the values of $\alpha d_1(\text{Sorg})$ and $\alpha d_3(\text{Sorg})$.

With the image processing apparatus for carrying out the fifteenth embodiment of the image processing method in accordance with the present invention, the high frequency components $S_H$ are emphasized with an emphasis coefficient $\alpha_1$ in accordance with the sum of the emphasis coefficient $\alpha m_1(\text{Smor})$, which is in accordance with the morphology signal Smor, and the emphasis coefficient $\alpha d_1(\text{Sorg})$, which is in accordance with the original image signal Sorg. Also, the middle frequency components $S_M$ are emphasized with an emphasis coefficient $\alpha_2$ in accordance with the sum of the emphasis coefficient $\alpha m_2(\text{Smor})$, which is in accordance with the morphology signal Smor, and the emphasis coefficient $\alpha d_2(\text{Sorg})$, which is in accordance with the original image signal Sorg. Further, the low frequency components $S_L$ are emphasized with an emphasis coefficient $\alpha_3$ in accordance with the sum of the emphasis coefficient $\alpha m_3(\text{Smor})$, which is in accordance with the morphology signal Smor, and the emphasis coefficient $\alpha d_3(\text{Sorg})$, which is in accordance with the original image signal Sorg.

As described above, with the image processing apparatus for carrying out the fifteenth embodiment of the image processing method in accordance with the present invention, the image emphasis processing in accordance with the morphology signals and the image emphasis processing in accordance with the original image signal Sorg are combined together and carried out. Therefore, excessive emphasis (overshooting or undershooting) can be restricted at an image portion, such as an artificial bone pattern, at which a change in the density is locally sharp.

In the fifteenth embodiment, as a technique for combining the image emphasis processing in accordance with the morphology signal and the image emphasis processing in accordance with the original image signal Sorg with each other, the sums of the emphasis coefficients for the respective image emphasis processing are utilized. Alternatively, new emphasis coefficients $\alpha_n$, which are obtained by multiplying the corresponding emphasis coefficients for the respective image emphasis processing by each other, may be utilized.

Also, as shown in FIG. 46, instead of the operation elements $14c_1$, $14c_2$, and $14c_3$ being located at the positions for the addition to the output signal Sus3 of the low pass filter 11c, the operation elements $14c_1$, $14c_2$, and $14c_3$ may be located at the positions for the addition to the original image signal Sorg. In such cases, in lieu of Formula (70), the first processed image signal S' may be calculated with Formula (72).

$$S'=\text{Sorg}+\{\alpha m_1 \times S_H + \alpha m_2 \times S_M + \alpha m_3 \times S_L\} \quad (72)$$

As in Formula (70), Formula (72) represents that the signal is obtained from the image emphasis processing, which is carried out on the original image signal Sorg and in which the degree of emphasis is changed in accordance with the morphology signal Smor and with respect to each frequency band. The desired image emphasis processing can thus be carried out only on the image portion having a desired size, which is contained in each frequency band, and for each of the desired frequency bands.

In the aforesaid image processing apparatuses for carrying out the fourteenth and fifteenth embodiments, the output obtained from the single morphology filter 12 is fed into three different conversion tables, and the emphasis coefficients for the respective frequency components of the original image signal Sorg are thereby obtained. Alternatively, three different morphology filters corresponding to the different frequency bands, within which the respective frequency components fall, may be employed.

Figure 47:
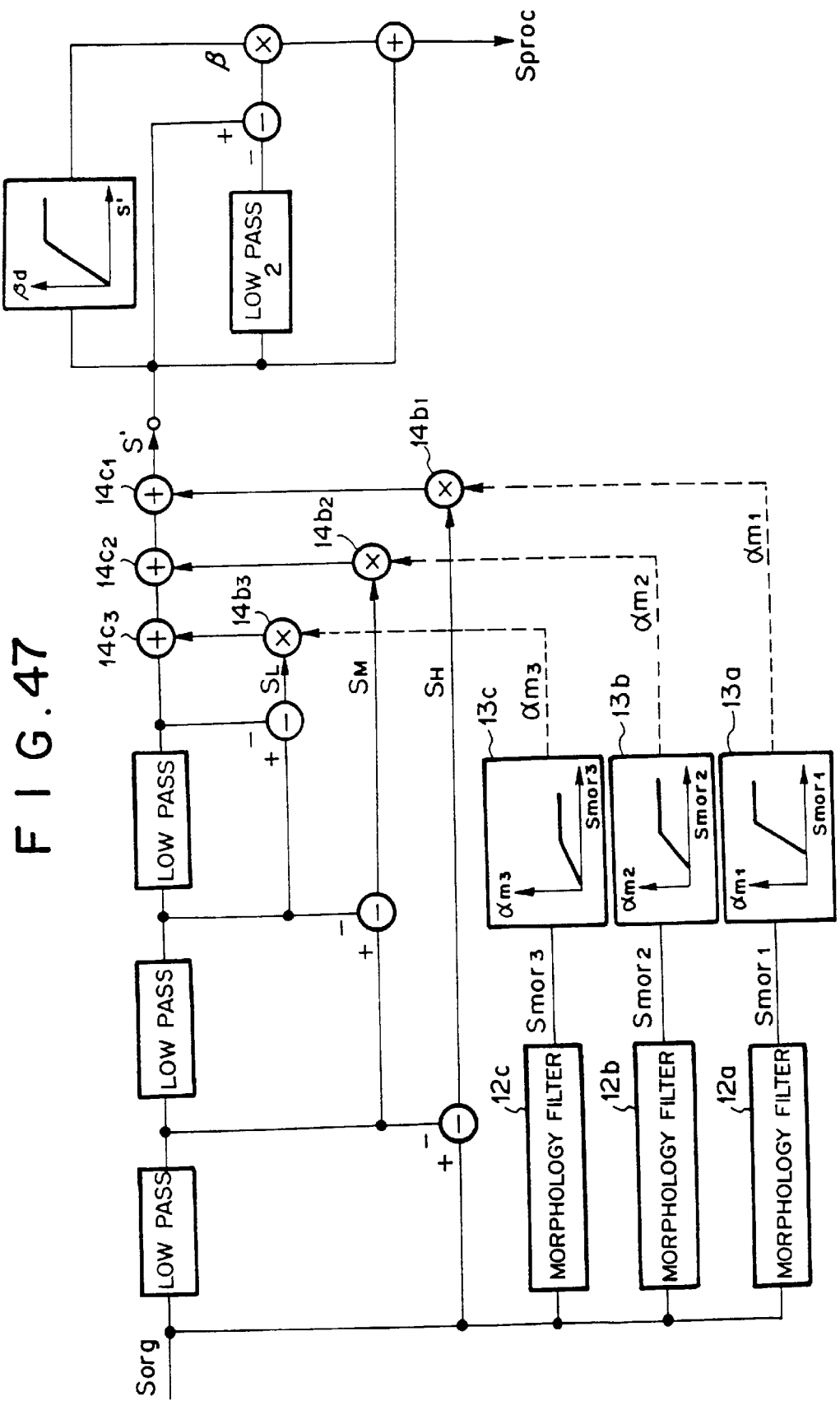
FIG. 47 is a block diagram showing an apparatus for carrying out a sixteenth embodiment of the image processing method in accordance with the present invention.

FIG. 47 is a block diagram showing an apparatus for carrying out such a sixteenth embodiment of the image processing method in accordance with the present invention.

In lieu of the single morphology filter 12 employed in the image processing apparatus shown in FIG. 45, the image processing apparatus shown in FIG. 47 is provided with a first morphology filter 12a, a second morphology filter 12b, and a third morphology filter 12c. The first morphology filter 12a obtains a first morphology signal Smor1 of the original image signal Sorg by using a structure element $B_S$ having a size corresponding to the high frequency components $S_H$ of the original image signal Sorg. The second morphology filter 12b obtains a second morphology signal Smor2 of the original image signal Sorg by using a structure element $B_M$ having a size corresponding to the middle frequency components $S_M$ of the original image signal Sorg. The third morphology filter 12c obtains a third morphology signal Smor3 of the original image signal Sorg by using a structure element $B_L$ having a size corresponding to the low frequency components $S_L$ of the original image signal Sorg. The conversion table 13a for the high frequency receives the first morphology signal Smor1 from the first morphology filter 12a and feeds out the information representing an emphasis coefficient $\alpha m_1(Smor1)$, which takes a value in accordance with the first morphology signal Smor1. The conversion table 13b for the middle frequency receives the second morphology signal Smor2 from the second morphology filter 12b and feeds out the information representing an emphasis coefficient $\alpha m_2(Smor2)$, which takes a value in accordance with the second morphology signal Smor2. Also, the conversion table 13c for the low frequency receives the third morphology signal Smor3 from the third morphology filter 12c and feeds out the information representing an emphasis coefficient $\alpha m_3(Smor3)$, which takes a value in accordance with the third morphology signal Smor3.

The structure element $B_L$ has the largest size, the structure element $B_S$ has the smallest size, and the structure element $B_M$ has a middle size between the sizes of the structure elements $B_L$ and $B_S$.

The sizes of the structure elements $B_S$, $B_M$, and $B_L$ are set in the manner described above. As a result, the morphology filters 12a, 12b, and 12c feed out the morphology signals Smor1, Smor2, and Smor3, which take a characteristic value with respect to an image portion having the corresponding size. In accordance with the morphology signals Smor1, Smor2, and Smor3 obtained from the morphology filters 12a, 12b, and 12c, the corresponding conversion tables 13a, 13b, and 13c feed out the information representing the emphasis coefficients $\alpha m_1(Smor1)$, $\alpha m_2(Smor2)$, and $\alpha m_3(Smor3)$.

The operation element $14b_1$ multiplies the high frequency components $S_H$ by the emphasis coefficient $\alpha m_1(Smor1)$. The operation element $14b_2$ multiplies the middle frequency components $S_M$ by the emphasis coefficient $\alpha m_2(Smor2)$. The operation element $14b_3$ multiplies the low frequency components $S_L$ by the emphasis coefficient $\alpha m_3(Smor3)$. In this manner, image portions corresponding to the sizes of the structure elements $B_S$, $B_M$, and $B_L$ can be emphasized independently and to degrees of emphasis in accordance with the emphasis coefficients $\alpha m_1(Smor1)$, $\alpha m_2(Smor2)$, and $\alpha m_3(Smor3)$. The other operations and effects are the same as those in the eleventh embodiment described above.

The image processing apparatus for carrying out the sixteenth embodiment may be modified in the same manner as that in the image processing apparatus of FIG. 46. Specifically, as in the image processing apparatus for carrying out a seventeenth embodiment shown in FIG. 48, the frequency components of the original image signal Sorg falling within the respective frequency bands may be subjected to the combination of the image emphasis processing in accordance with the morphology signal and the image emphasis processing in accordance with the original image signal Sorg.

Figure 48:
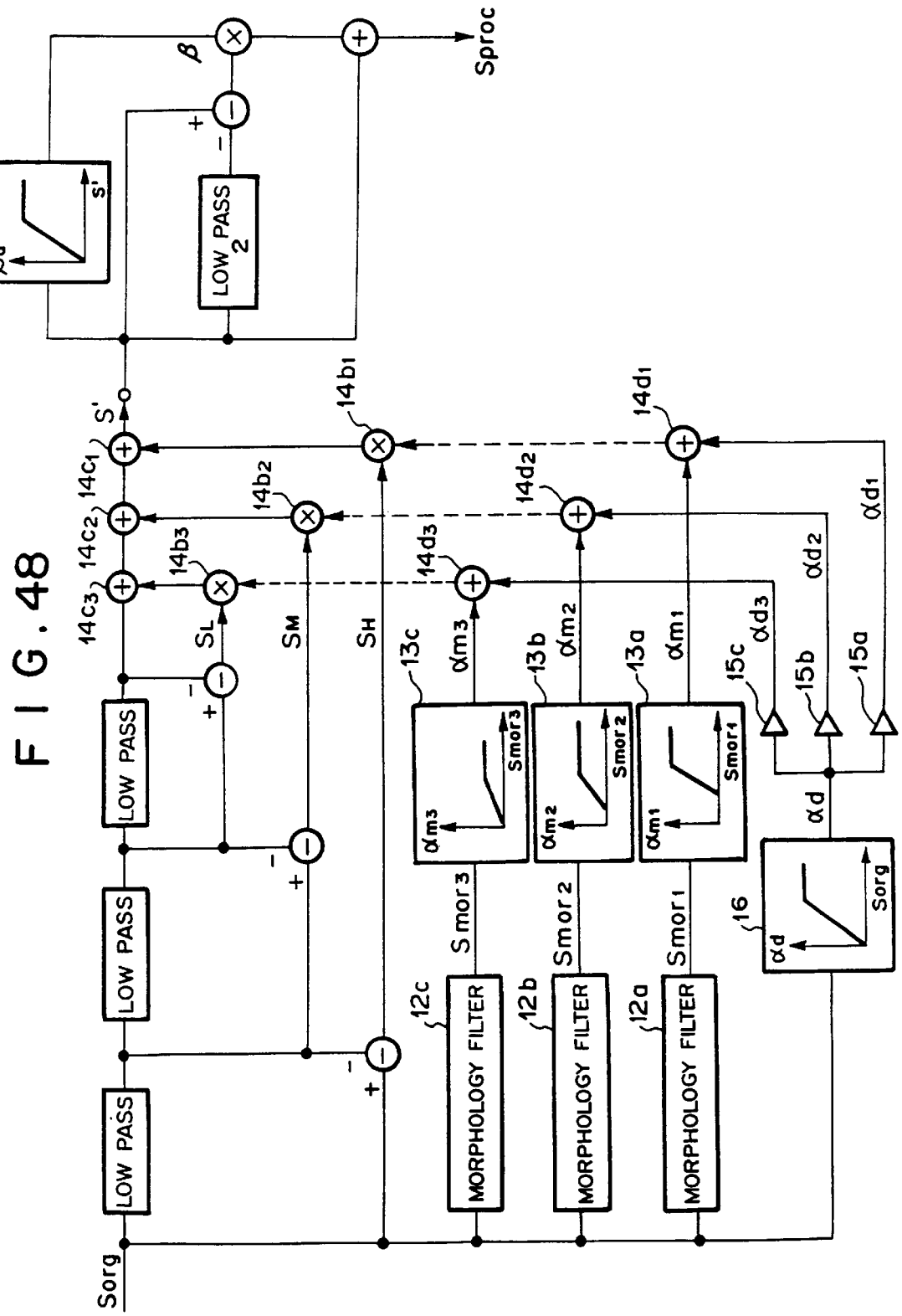
FIG. 48 is a block diagram showing an apparatus for carrying out a seventeenth embodiment of the image processing method in accordance with the present invention.

Further, the image processing apparatuses shown in FIGS. 47 and 48, wherein a plurality of the morphology filters are employed, may be modified such that only a single first conversion table may be provided. In such cases, conversely to the constitution of the image processing apparatus shown in FIG. 45, a plurality of the morphology filters and a single first conversion table are utilized, and the emphasis coefficients corresponding to the frequency components falling within the respective frequency bands are thereby adjusted.

What is claimed is:

1. An image processing method for providing a processed image signal Dproc from an original image signal Dorg, comprising the steps of:

i) carrying out a morphology operation on said original image signal Dorg, which represents an image, by using a multiply structure element Bi and a scale factor λ, a morphology signal Dmor being thereby obtained, said morphology signal Dmor representing, for each of said picture elements, whether said each picture element corresponds to an image portion at which said original image signal Dorg fluctuates in a spatially narrower range than said multiply structure element Bi;

ii) calculating an unsharp mask signal Dus, which corresponds to super-low frequency, from said original image signal Dorg;

iii) subtracting from said original image signal Dorg the super-low frequency components Dus thereof to provide a difference signal (Dorg−Dus) representing comparatively high frequency components;

iv) emphasizing ones of said picture elements corresponding to said image portion by emphasizing said comparatively high frequency components with an emphasis coefficient β(Dmor), wherein said emphasis coefficient β(Dmor) is based on said morphology signal Dmor, and wherein said emphasis coefficient β(Dmor) has:

for ones of said picture elements not corresponding to said image portion, a respective de-emphasizing value, and for ones of said picture elements corresponding to said image portion, a respective emphasizing value; and v) performing the subtracting and emphasizing steps with respect to said original image signal and said processed image signal according to Formula (9)

Dproc=Dorg+β(Dmor)×f(Dorg−Dus)  (9).

2. A method as defined in claim 1 wherein said morphology operation is carried out with Formula (7), and the value of said original image signal Dorg corresponding to said image portion is larger than the image signal values corresponding to the image areas surrounding said image portion:

Dmor=Dorg−max{(Dorg⊖λBi)⊕λBi}  (7)

i=1, . . . ,n wherein the expression Dorg⊖λBi represents that λ times of calculations for finding the Minkowski difference are carried out with the structure element Bi on the image signal Dorg, and the expression (Dorg⊖λBi)⊕λBi represents that λ times of calculations for finding the Minkowski sum are carried out with the structure element Bi on (Dorg⊖λBi).

3. A method as defined in claim 1 wherein said morphology operation is carried out with Formula (8), and the value of said original image signal Dorg corresponding to said image portion is smaller than the image signal values corresponding to the image areas surrounding said image portion:

$$Dmor = Dorg - \min\{(Dorg \oplus \lambda Bi) \ominus \lambda Bi\} \quad (8)$$

i=1, . . . ,n wherein the expression $Dorg \oplus \lambda Bi$ represents that $\lambda$ times of calculations for finding the Minkowski sum are carried out with the structure element Bi on the image signal Dorg, and the expression $(Dorg \oplus \lambda Bi) \ominus \lambda Bi$ represents that $\lambda$ times of calculations for finding the Minkowski difference are carried out with the structure element Bi on $(Dorg \oplus \lambda Bi)$.

4. A method as defined in claim 1 wherein said morphology operation is carried out with Formula (10), and the value of said original image signal Dorg corresponding to said image portion is larger than the image signal values corresponding to the image areas surrounding said image portion:

$$Dmor = Dorg - \max(Dorg \ominus \lambda Bi) \quad (10)$$

i=1, . . . ,n wherein the expression $(Dorg \ominus \lambda Bi)$ represents that $\lambda$ times of calculations for finding the Minkowski difference are carried out with the structure element Bi on Dorg.

5. A method as defined in claim 1 wherein said morphology operation is carried out with Formula (11), and the value of said original image signal Dorg corresponding to said image portion is smaller than the image signal values corresponding to the image areas surrounding said image portion:

$$Dmor = Dorg - \min(Dorg \oplus \lambda Bi) \quad (11)$$

i=1, . . . ,n wherein the expression $Dorg \oplus \lambda Bi$ represents that $\lambda$ times of calculations for finding the Minkowski sum are carried out with the structure element Bi on Dorg.

6. A method as defined in claim 1 wherein said morphology operation is carried out with Formula (12), and the value of said original image signal Dorg corresponding to said image portion is larger than the image signal values corresponding to the image areas surrounding said image portion:

$$Dmor = \bigcup_{\lambda=0}^{N} \left\{ \max_{i=1,\ldots,n} (Dorg \ominus \lambda Bi) - \max_{i=1,\ldots,n} (Dorg \ominus \lambda Bi)_B \right\} \quad (12)$$

wherein the expression $(Dorg \ominus \lambda Bi)$ represents that $\lambda$ times of calculations for finding the Minkowski difference are carried out with the structure element Bi on Dorg, the expression $(Dorg \ominus \lambda Bi)_B$ represents that the opening operation with the structure element Bi is carried out on the image signal $(Dorg \ominus \lambda Bi)$, and $$\bigcup_{\lambda=0}^{N}$$

represents the sum of sets of $\lambda = 0, 1, \ldots, N$.

7. A method as defined in claim 1 wherein said morphology operation is carried out with Formula (13), and the value of said original image signal Dorg corresponding to said image portion is smaller than the image signal values corresponding to the image areas surrounding said image portion:

$$Dmor = \bigcup_{\lambda=0}^{N} \left\{ \min_{i=1,\ldots,n} (Dorg \oplus \lambda Bi) - \min_{i=1,\ldots,n} (Dorg \oplus \lambda Bi)^B \right\} \quad (13)$$

wherein the expression $Dorg \oplus \lambda Bi$ represents that $\lambda$ times of calculations for finding the Minkowski sum are carried out with the structure element Bi on Dorg, the expression $(Dorg \oplus \lambda Bi)^B$ represents that the closing operation with the structure element Bi is carried out on $Dorg \oplus \lambda Bi$, and $$\bigcup_{\lambda=0}^{N}$$

represents the sum of sets of $\lambda = 0, 1, \ldots, N$.

8. A method as defined in claim 1 wherein said morphology operation is carried out with Formula (14)

$$Dmor = |\min(Dorg \oplus \lambda Bi)$$

i=1, . . . ,n $$-\max(Dorg \ominus \lambda Bi)| \quad (14)$$

i=1, . . . ,n wherein the expression $Dorg \oplus \lambda Bi$ represents that $\lambda$ times of calculations for finding the Minkowski sum are carried out with the structure element Bi on Dorg, and the expression $(Dorg \ominus \lambda Bi)$ represents that $\lambda$ times of calculations for finding the Minkowski difference are carried out with the structure element Bi on $(Dorg \ominus \lambda Bi)$.

9. A method as defined in claim 1 wherein said image is a radiation image.

10. A method defined in claim 9 wherein said radiation image is a medical image.

* * * * *